United States Patent
Aizaki et al.

(10) Patent No.: US 9,407,794 B2
(45) Date of Patent: Aug. 2, 2016

(54) IMAGE PROCESSING APPARATUS AND IMAGE PROCESSING SYSTEM

(71) Applicants: Tomoyasu Aizaki, Kanagawa (JP); Satoshi Nakamura, Kanagawa (JP)

(72) Inventors: Tomoyasu Aizaki, Kanagawa (JP); Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 14/533,157

(22) Filed: Nov. 5, 2014

(65) Prior Publication Data
US 2015/0130829 A1 May 14, 2015

(30) Foreign Application Priority Data

Nov. 8, 2013 (JP) .................. 2013-232382
Feb. 10, 2014 (JP) .................. 2014-023273

(51) Int. Cl.
*H04N 1/60* (2006.01)
*H04N 1/387* (2006.01)
*H04N 1/50* (2006.01)
*H04N 1/64* (2006.01)

(52) U.S. Cl.
CPC ............... *H04N 1/603* (2013.01); *H04N 1/387* (2013.01); *H04N 1/50* (2013.01); *H04N 1/6075* (2013.01); *H04N 1/644* (2013.01); *H04N 2201/0081* (2013.01); *H04N 2201/0082* (2013.01); *H04N 2201/0089* (2013.01)

(58) Field of Classification Search
CPC .................. G06T 7/003; G06T 2207/10016; G06T 5/50; G06T 2207/10028; G06T 7/0024; G06T 7/408; G06T 11/60; G06K 9/6202; G06K 2009/00932; H04N 5/23238; H04N 13/0239
See application file for complete search history.

(56) References Cited

U.S. PATENT DOCUMENTS

| | | | | |
|---|---|---|---|---|
| 8,681,379 B2* | 3/2014 | Nakamura | ........... | H04N 1/6055 358/1.15 |
| 2008/0304087 A1* | 12/2008 | Shin | ........... | G06T 5/009 358/1.6 |
| 2013/0021628 A1* | 1/2013 | Nakamura | ........... | H04N 1/6052 358/1.9 |
| 2013/0135635 A1* | 5/2013 | Nakamura | ........... | H04N 1/6052 358/1.9 |
| 2013/0272606 A1* | 10/2013 | Nakamura | ........... | G06K 9/4652 382/167 |

FOREIGN PATENT DOCUMENTS

| | | |
|---|---|---|
| EP | 2549737 | 1/2013 |
| JP | 2013-030996 | 2/2013 |
| JP | 2013-110696 | 6/2013 |

OTHER PUBLICATIONS

Extended European Search Report dated Mar. 26, 2015.

\* cited by examiner

*Primary Examiner* — Maurice L McDowell, Jr.
*Assistant Examiner* — Raffi Isanians
(74) *Attorney, Agent, or Firm* — IPUSA, PLLC

(57) ABSTRACT

An image processing apparatus includes a parameter estimation unit that estimates a first parameter for aligning first output image data with original image data and a second parameter for aligning second output image data with the original image data, a pixel value mapping unit that generates first pixel value mapping data associating color components of a pixel of the first output image data with color components of a corresponding pixel of the original image data and second pixel value mapping data associating color components of a pixel of the second output image data with color components of a corresponding pixel of the original image data, a map estimation unit that obtains a first map and a second map based on the first and second pixel value mapping data, and a conversion unit that converts a pixel value of the original image data based on the first and second maps.

14 Claims, 33 Drawing Sheets

FIG.8

| $R_{in}$ | $G_{in}$ | $B_{in}$ | $R_{out1}$ | $G_{out1}$ | $B_{out1}$ |
|---|---|---|---|---|---|
| 7 | 161 | 3 | 6 | 154 | 7 |
| 10 | 185 | 63 | 11 | 190 | 66 |
| 17 | 218 | 228 | 20 | 220 | 221 |
| 28 | 169 | 64 | 27 | 171 | 58 |
| 36 | 116 | 93 | 31 | 109 | 99 |
| . | . | . | . | . | . |
| . | . | . | . | . | . |
| . | . | . | . | . | . |
| . | . | . | . | . | . |
| 199 | 127 | 117 | 200 | 120 | 121 |
| 207 | 47 | 251 | 211 | 41 | 247 |
| 220 | 211 | 158 | 225 | 211 | 156 |
| 221 | 120 | 36 | 226 | 119 | 39 |
| 233 | 87 | 75 | 229 | 83 | 76 |

FIG.10

| $R_{in}$ | $G_{in}$ | $B_{in}$ | $R_{out2}$ | $G_{out2}$ | $B_{out2}$ |
|---|---|---|---|---|---|
| 7 | 161 | 3 | 13 | 172 | 8 |
| 10 | 185 | 63 | 4 | 198 | 70 |
| 17 | 218 | 228 | 22 | 212 | 237 |
| 28 | 169 | 64 | 28 | 155 | 63 |
| 36 | 116 | 93 | 29 | 104 | 86 |
| . | . | . | . | . | . |
| . | . | . | . | . | . |
| . | . | . | . | . | . |
| . | . | . | . | . | . |
| 199 | 127 | 117 | 186 | 130 | 128 |
| 207 | 47 | 251 | 199 | 51 | 255 |
| 220 | 211 | 158 | 222 | 220 | 172 |
| 221 | 120 | 36 | 219 | 131 | 23 |
| 233 | 87 | 75 | 231 | 92 | 82 |

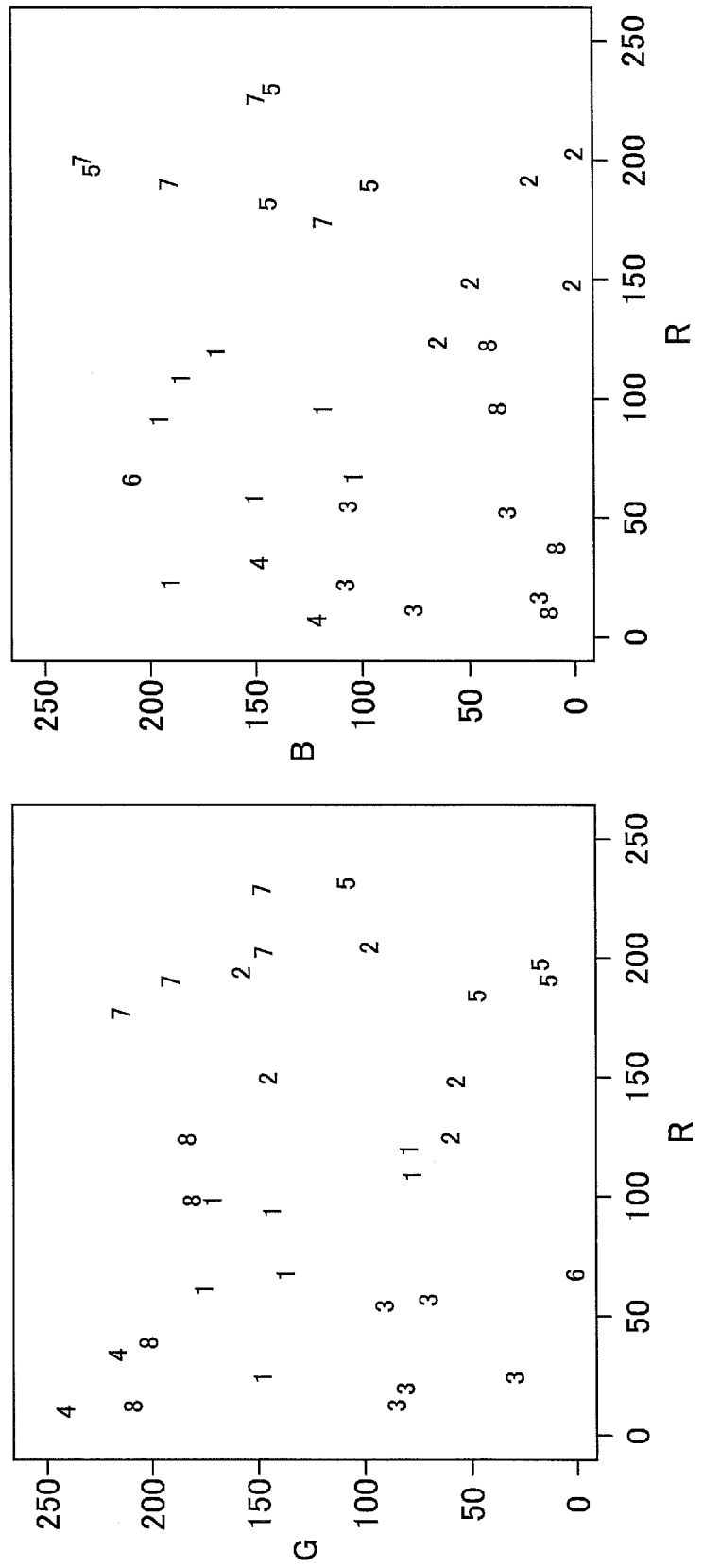

FIG.25

PARTIAL COLOR SPACE (1)

| $R_{in}^{(1)}$ | $G_{in}^{(1)}$ | $B_{in}^{(1)}$ | $R_{out1}^{(1)}$ | $G_{out1}^{(1)}$ | $B_{out1}^{(1)}$ |
|---|---|---|---|---|---|
| 8 | 5 | 16 | 5 | 2 | 11 |
| 10 | 9 | 19 | 9 | 9 | 21 |
| 13 | 12 | 8 | 18 | 15 | 12 |
| 15 | 5 | 20 | 20 | 1 | 18 |
| 16 | 6 | 18 | 16 | 7 | 22 |
| . | . | . | . | . | . |
| . | . | . | . | . | . |
| . | . | . | . | . | . |
| . | . | . | . | . | . |
| 43 | 45 | 53 | 42 | 41 | 50 |
| 44 | 51 | 50 | 39 | 46 | 47 |
| 46 | 55 | 46 | 49 | 59 | 49 |
| 51 | 43 | 49 | 54 | 43 | 49 |
| 54 | 55 | 49 | 50 | 51 | 44 |

.
.
.

PARTIAL COLOR SPACE (m)

| $R_{in}^{(m)}$ | $G_{in}^{(m)}$ | $B_{in}^{(m)}$ | $R_{out1}^{(m)}$ | $G_{out1}^{(m)}$ | $B_{out1}^{(m)}$ |
|---|---|---|---|---|---|
| 210 | 209 | 217 | 209 | 210 | 219 |
| 214 | 217 | 209 | 212 | 214 | 213 |
| 214 | 220 | 219 | 213 | 217 | 216 |
| 215 | 211 | 207 | 217 | 209 | 203 |
| 218 | 219 | 200 | 214 | 221 | 201 |
| . | . | . | . | . | . |
| . | . | . | . | . | . |
| . | . | . | . | . | . |
| . | . | . | . | . | . |
| 240 | 242 | 240 | 243 | 240 | 235 |
| 241 | 248 | 241 | 246 | 252 | 238 |
| 244 | 245 | 250 | 248 | 247 | 248 |
| 244 | 247 | 241 | 239 | 249 | 246 |
| 250 | 243 | 244 | 252 | 239 | 246 |

FIG.27

PARTIAL COLOR SPACE (1)

| $R_{in}^{(1)}$ | $G_{in}^{(1)}$ | $B_{in}^{(1)}$ | $R_{out2}^{(1)}$ | $G_{out2}^{(1)}$ | $B_{out2}^{(1)}$ |
|---|---|---|---|---|---|
| 8 | 5 | 16 | 11 | 1 | 16 |
| 10 | 9 | 19 | 8 | 4 | 21 |
| 13 | 12 | 8 | 18 | 7 | 4 |
| 15 | 5 | 20 | 12 | 4 | 16 |
| 16 | 6 | 18 | 16 | 6 | 17 |
| . | . | . | . | . | . |
| . | . | . | . | . | . |
| . | . | . | . | . | . |
| . | . | . | . | . | . |
| 43 | 45 | 53 | 43 | 48 | 48 |
| 44 | 51 | 50 | 49 | 55 | 52 |
| 46 | 55 | 46 | 51 | 59 | 46 |
| 51 | 43 | 49 | 49 | 40 | 45 |
| 54 | 55 | 49 | 50 | 58 | 52 |

．
．
．

PARTIAL COLOR SPACE (m)

| $R_{in}^{(m)}$ | $G_{in}^{(m)}$ | $B_{in}^{(m)}$ | $R_{out2}^{(m)}$ | $G_{out2}^{(m)}$ | $B_{out2}^{(m)}$ |
|---|---|---|---|---|---|
| 210 | 209 | 217 | 215 | 205 | 218 |
| 214 | 217 | 209 | 214 | 222 | 211 |
| 214 | 220 | 219 | 219 | 217 | 221 |
| 215 | 211 | 207 | 215 | 208 | 206 |
| 218 | 219 | 200 | 216 | 222 | 204 |
| . | . | . | . | . | . |
| . | . | . | . | . | . |
| . | . | . | . | . | . |
| . | . | . | . | . | . |
| 240 | 242 | 240 | 238 | 247 | 236 |
| 241 | 248 | 241 | 241 | 251 | 244 |
| 244 | 245 | 250 | 242 | 240 | 245 |
| 244 | 247 | 241 | 244 | 243 | 245 |
| 250 | 243 | 244 | 248 | 239 | 240 |

IMAGE PROCESSING APPARATUS AND IMAGE PROCESSING SYSTEM

BACKGROUND OF THE INVENTION

1. Field of the Invention

The present invention relates to an image processing apparatus and an image processing system.

2. Description of the Related Art

Techniques are known for updating color profiles of image output devices such as printers and displays without using a color chart (see e.g. Japanese Laid-Open Patent Publication No. 2013-30996).

However, according to conventional techniques, when color matching between two image output devices is performed, for example, adequate color matching accuracy may not be achieved in a case where a color difference between the image output devices is not independent with respect to each color component (i.e. when color component values are interdependent on other color component values).

In light of the above, an aspect of the present invention relates to providing a technique for converting a color of an output result of an image output device based on a plurality of color component values.

SUMMARY OF THE INVENTION

According to one embodiment of the present invention, an image processing apparatus is provided that reproduces a color of a first output result output by a first image output unit in a second output result output by a second image output unit. The first output result corresponds to original image data that is output by the first image output unit, and the second output result corresponds to the original image data that is output by the second image output device. The image processing apparatus includes a geometric transformation parameter estimation unit configured to estimate a first geometric transformation parameter for aligning the original image data with first output image data corresponding to the first output result that is scanned by a scanning device, and estimate a second geometric transformation parameter for aligning the original image data with second output image data corresponding to the second output result that is scanned by the scanning device. The image processing apparatus also includes a pixel value mapping unit configured to generate first pixel value mapping data using the first geometric transformation parameter, and generate second pixel value mapping data using the second geometric transformation parameter. The first pixel value mapping data associates a set of color components of a pixel of the first output image data with a set of color components of a corresponding pixel of the original image data, and the second pixel value mapping data associates a set of color components of a pixel of the second output image data with a set of color components of a corresponding pixel of the original image data. The image processing apparatus further includes a map estimation unit configured to obtain a first map estimating a color of the first output image data from a color of the original image data based on the first pixel value mapping data, and obtain a second map estimating a color of the original image data from a color of the second output image data based on the second pixel value mapping data. The image processing apparatus further includes a conversion unit configured to convert a pixel value of the original image data based on the first map and the second map.

BRIEF DESCRIPTION OF THE DRAWINGS

FIG. 8 illustrates an exemplary configuration of pixel value mapping data recorded in list format;

FIG. 10 illustrates an exemplary configuration of pixel value mapping data recorded in list format;

FIGS. 24A and 24B illustrate an example of dividing a color space using cluster analysis;

FIG. 25 illustrates an exemplary configuration of pixel value mapping data recorded in list format according to the fourth embodiment;

FIG. 27 illustrates an exemplary configuration of pixel value mapping data recorded in list format according to the fourth embodiment;

DESCRIPTION OF THE PREFERRED EMBODIMENTS

In the following, embodiments of the present invention are described with reference to the accompanying drawings.

First Embodiment

In the following, color reproduction characteristics of a first image output device are denoted as $P_1(x)$, color reproduction characteristics of a second image output device are denoted as $P_2(x)$, and color reproduction characteristics of an image scanning device are denoted as $S(x)$, where "x" represents a color or a pixel value. Note that although "pixel value" and "color" do not necessarily represent the same attributes in cases where different color spaces are involved, a pixel value can be regarded as defining a specific color (pixel value=color) within a specific color space. Thus, the terms "pixel value" and "color" may be interchangeably used in the descriptions below. For example, in the RGB color space, x represents three-dimensional data $[R, G, B]^t$. In the CMYK color space, x represents four-dimensional data $[C, M, Y, K]^t$. Further, first color reproduction characteristics are denoted as $S(P_1(x))$, and second color tone reproduction characteristics are denoted as $S(P_2(x))$.

$P_1(x)$ represents a printed color when the first image output device prints a pixel value x, and $S(P_1(x))$ represents a scanned color when the image scanning device scans the color $P_1(x)$. $P_2(x)$ represents a printed color when the second image output device prints the pixel value x, and $S(P_2(x))$ represents a scanned color when the image scanning device scans the color $P_2(x)$.

In a case where the first image output device and the second image output device print the same pixel value x, $S(P_1(x))$ and $S(P_2(x))$ may not be equal because the color reproduction characteristics $P_1(x)$ and $P_2(x)$ of the above two devices may be different from each other. On the other hand, even in a case where a pixel value printed by the first image output device is not equal to another pixel value printed by the second image output device, image data to be printed (corresponding to "original image data" described below) may include a set of colors, "a" and "b", denoted (a, b) hereinafter, that satisfies the condition $S(P_1(a))=S(P_2(b))$. Note that $S(P_1(a))$ and $S(P_2(b))$ do not have to be exactly the same.

An image processing apparatus of the present embodiment obtains at least one set of colors (a, b) that satisfy the condition $S(P_1(a))=S(P_2(b))$. That is, the color $S(P_2(b))$ may be obtained when the second image output device prints the pixel value b. Accordingly, by converting the pixel value "a" of the image data to be printed into "b", the second image output device may print the same color as the first image output device upon printing the pixel value that has been converted from "a" to "b". That is, the second image output device actually prints the pixel value "b" to obtain the color $S(P_2(b))$, which is equal to $S(P_1(a))$.

Figure 1:
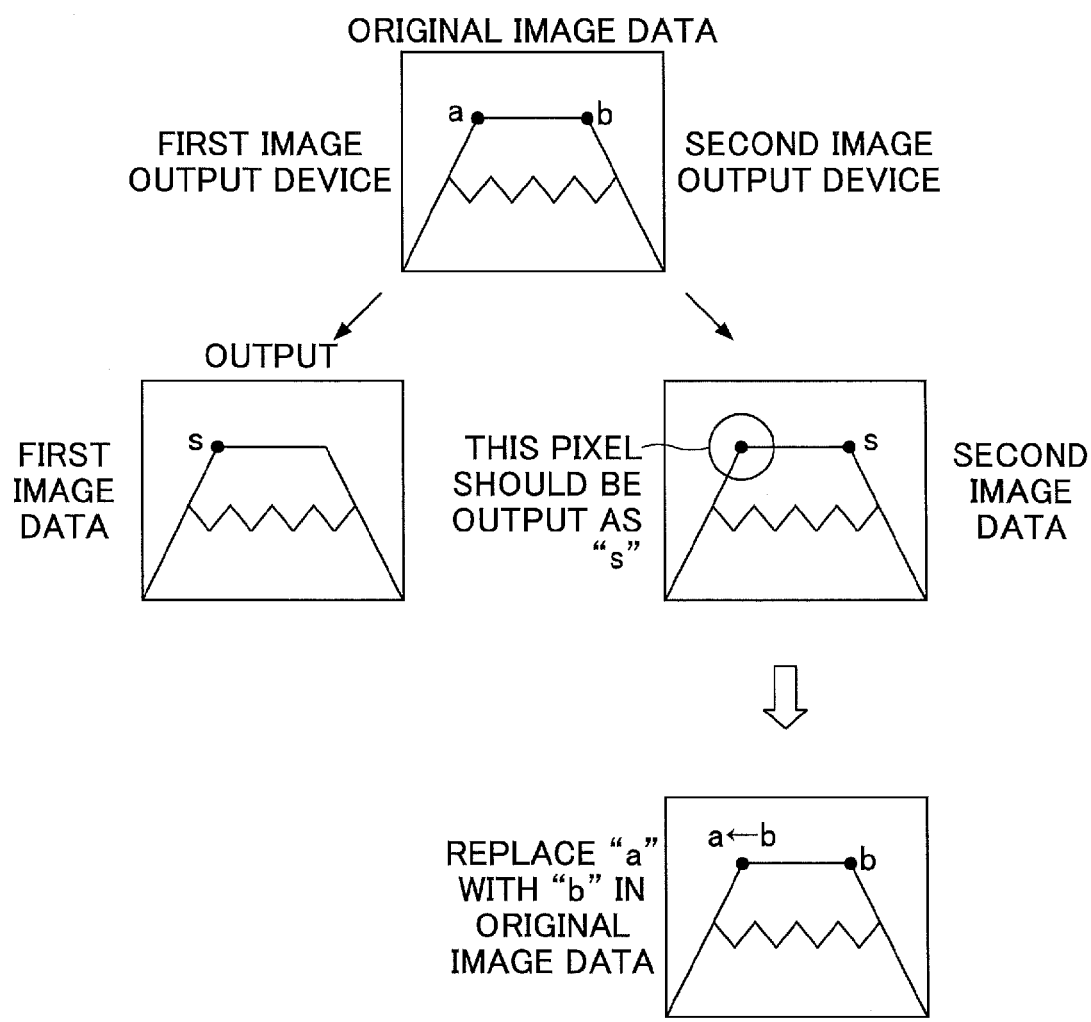
FIG. 1 schematically illustrates a relationship between two pixel values.

FIG. 1 schematically illustrates a relationship between the pixel values "a" and "b". In the illustrated example, the first image output device and the second image output device print out the same image data. Such image data is referred to as "original image data" hereinafter.

The first image output device prints out the original image data including the pixel values "a" and "b" as a first output material. The pixel value "a" printed by the first image output device is scanned by a scanner as color "s". The second image output device prints out the original image data including the pixel values "a" and "b" as a second output material. The pixel value "b" printed by the second image output device is scanned by the scanner as the color "s". When matching the color reproduction characteristics of the second image output device with the color reproduction characteristics of the first image output device, the second image output device needs to print the pixel value "a" of the original image data as the color "s" (i.e. the pixel value "a" printed by the second image output device needs to be scanned as color "s" by the scanner). Accordingly, the second image output device converts the pixel value "a" into "b". By performing such a color conversion, the second image output device may be able to print image data in the same color as the first image output device.

Figure 2:
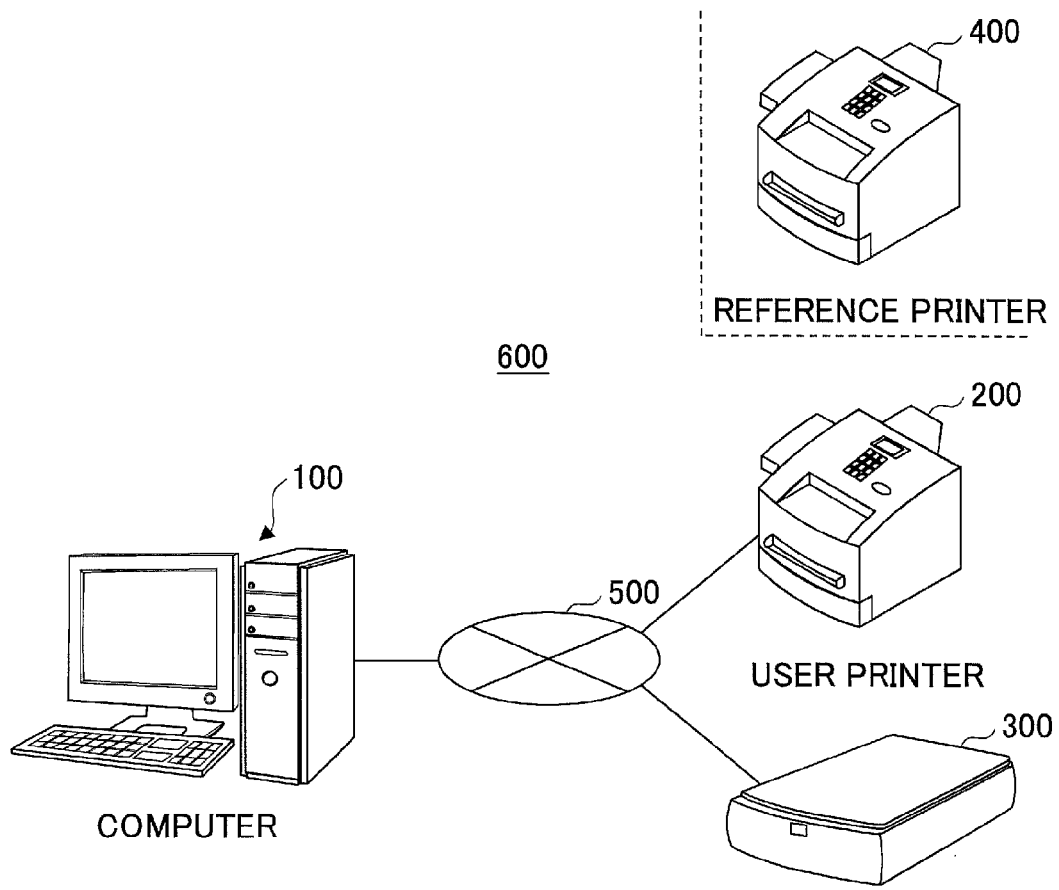
FIG. 2 illustrates an exemplary configuration of an image processing system according to a first embodiment of the present invention.

FIG. 2 illustrates an exemplary configuration of an image processing system 600 according to the present embodiment. In the following, examples of the first image output device, the second image output device, and the image scanning device are described. Note that these devices are used in the processes described below to match the color reproduction characteristics of the first image output device and the second image output device.

First image output device: printer 400 (referred to as "reference printer 400")

Second image output device: printer 200 (referred to as "user printer 200")

Image input device: scanner 300

Also, the terms used in the descriptions below are given the following definitions.

Reference printer: printer corresponding to the first image output device that is used as a color matching target User printer: printer corresponding to the second image output device that is to have color reproduction characteristics adjusted to match the color reproduction characteristics of the reference printer 400

Scanner: corresponds to the image scanning device

Original image data: image data used by the printers to output printed materials Reference printed material: printed material to be used as a color matching target and corresponding to the original image data that is output by the reference printer 400

Reference image data: image data obtained by scanning the reference printed material using the image scanning device User printed material: printed material to be adjusted to match the reference printed material and corresponding to the original image data that is output by the user printer 200

User image data: image data obtained by scanning the user printed material using the image scanning device In the present embodiment, the reference printed material and the user printed material are used and a color conversion is performed on the original image data that is to be used as an input for the user printer 200. In this way, a user printed material with the same color as the reference printed material may be obtained.

Note that the device that executes the color conversion may be the user printer 200 (second image output device), the scanner 300, or a separate device such as a computer 100, for example. In the following, the computer 100 is described as an example of an information processing device that executes color conversion.

The steps for executing color conversion may include the following processes:

(1) Estimation of First Color Reproduction Characteristics

First, reference color reproduction characteristics $S(P_1(x))$ of the reference printer 400 and the scanner 300 are estimated by the following steps (in consideration of the difficulty of extracting the color reproduction characteristics of the reference printer 400 alone). Note that the reference color reproduction characteristics $S(P_1(x))$ corresponds to an example of a first map.

(1-1) Scan the reference printed material with the scanner 300 to obtain the reference image data.

(1-2) Adjust the position, tilt, and size of the original image data and the reference image data.

(1-3) Determine correspondence between a pixel value of a pixel of the original image data and a pixel value a pixel of the reference image data at a corresponding position with respect to each set of color components and store the correspondence between the pixel values of the corresponding pixels.

(1-4) Identify a color in the reference image data that corresponds to a pixel value in the original image data based on pixel value mapping data (using multidimensional data based on a plurality of color component values).

(2) Estimation of Inverse of Second Color Reproduction Characteristics

Then, the inverse $P_2^{-1}(S^{-1}(x))$ of user color reproduction characteristics $S(P_2(x))$ of the user printer 200 and the scanner 300 are estimated by the following steps (in consideration of the difficulty of extracting the inverse of the color reproduction characteristics of the user printer 200 alone). Note that the inverse characteristics $P_2^{-1}(S^{-1}(x))$ is an example of a second map.

Also, note that $S^{-1}(x)$ corresponds to a value (color) acquired by the image scanning device upon scanning the pixel value x. $P_2^{-1}(S^{-1}(x))$ corresponds to a pixel value output by the second image output device as the color $S^{-1}(x)$.

(2-1) Output the original image data with the user printer 200 to obtain the user printed material.

(2-2) Scan the user printed material with the scanner 300 to obtain the user image data.

(2-3) Adjust the position, tilt, and size of the original image data and the user image data.

(2-4) Determine correspondence between a pixel value of a pixel of the original image data and a pixel value of a pixel of the user image data at a corresponding position with respect to each set of color components and store the correspondence between the pixel values of the corresponding pixels.

(2-5) Identify a color in the user image data that corresponds to a pixel value in the original image data (using multidimensional data based on a plurality of color component values).

(3) Color Conversion of Original Image Data

Then, through the following steps, color conversion is performed on the original image data using the estimated reference color reproduction characteristics and the estimated inverse of the user color reproduction characteristics, and the original image data is updated.

(3-1) Based on the reference color reproduction characteristics, obtain the color "s" ($s=S(P_1(a))$) in the reference image data corresponding to the color "a" in the original image data.

(3-2) Based on the user color reproduction characteristics, obtain the color "b" ($b=P_2^{-1}(S^{-1}(x))$) in the original image data corresponding to the color "s" ($s=S(P_2(b))$) in the user image data (i.e. $S(P_1(a))=s=S(P_2(b))$).

(3-3) Convert color "a" of the original image data to color "b".

By performing the above steps (1) to (3), user image data of the color-converted original image data that is printed by the user printer 200 may represent substantially the same color as the reference image data. Note that in a case where the user image data resulting from performing the above steps (1) to (3) only once does not represent substantially the same color as the reference image data, the above steps (1) to (3) may be repeated until the color difference between the reference printed material and the user printed material falls within a predetermined range. In this case, the color-converted original image data may be used as the original image data upon estimating the inverse of the color reproduction characteristics of the user printer 200.

Note that when performing color conversion in the above step (3), a color conversion process is typically performed independently with respect to each color component under the premise that a color difference between an output result of the first image output device and an output result of the second image output device is independent with respect to each color component. However, in general, a color difference between an output result of the first image output device and an output result of the second image output device is not necessarily independent with respect to each color component.

For example, assuming there is a set of pixel values (a, a') that satisfies the condition $S(P_1(a))=2=S(P_2(a'))$ and a set of pixel values (b, b') that satisfies the condition $S(P_1(b))=2=S(P_2(b'))$, color matching between the first image output device and the second image output device may presumably be achieved by converting the pixel value "a" of the original image data to "a'" and converting the pixel value "b" of the original image data to "b'". A case is considered below in which the above pixel values "a", "a'", "b", and "b'" represent the following values in the 256-level RGC color space.

a=(128, 74, 153)
a'=(138, 79, 159)
b=(128, 23, 24)
b'=(118, 19, 36)

In this case, although the pixel value "a" and the pixel value "b" have different combinations of color components, they have the same value 128 as the R component value. On the other hand, the pixel value "a'" associated with the pixel value "a" has an R component value of 138 (a value greater than the R component value of the pixel values "a" and "b"), and the pixel value "b'" associated with the pixel value "b" has a R component value of 118 (a value less than the R component value of the pixel values "a" and In such case, when color conversion processes are performed independently with respect to each color component, the same color conversion process may be applied to the R component values of the pixel values "a" and "b", and as a result, optimal color conversions may not be performed on the pixel values "a" and "b". Thus, the accuracy of color matching between the first image output device and the second image output device may be degraded.

Accordingly, in the present embodiment, when mapping a pixel value of a pixel of the original image data to a pixel value of a pixel at a corresponding position in the reference image data or the user image data, the correspondence between the pixel values is mapped and stored with respect to each set of color components. Also, when estimating the reference color reproduction characteristics and the inverse of the user color reproduction characteristics, color component values are estimated from an input of multidimensional data based on a plurality of color component values (i.e. the estimation is performed taking into account the combination of color components).

<System Configuration>

The image processing system 600 illustrated in FIG. 2 includes the computer 100, the user printer 200, and the scanner 300 that are interconnected via a network 500. Note that in some embodiments, an offset printer or a rotogravure printer may be used instead of the scanner 300, for example. Also, a spectrophotometer or a camera may be used instead of the scanner 300, for example. In the illustrated example, it is assumed that the reference printer 400 is not provided within the user environment of the image processing system 600 and is therefore not connected to the network 500. However, the reference printer 500 may alternatively be connected to the network 500. Also, it is assumed that a user of the image processing system 600 already has, or is able to obtain the reference printed material corresponding to the reference image data output by the reference printer 400.

The network 500 may include a local area network (LAN) in a company, a wide area network (WAN), an IP-Virtual Private Network (IP-VPN), and the Internet, for example. The network 500 may combine two or more of the above networks to enable communication between the computer 100, the user printer 200, and the scanner 300, for example. The network 500 may also include wired or wireless telephone lines, for example. The computer 100, the user printer 200 and the scanner 300 can communicate through the network.

Note that the reference printer 400 and the user printer 200 do not necessarily have to be different devices. For example, in a case of performing color matching between past colors and present colors of a single printer, the reference printer 400 and the user printer 200 may correspond to the same device. Also, in addition to having printing functions, the reference printer 400 and the user printer 200 may have one or more other functions such as scanning, FAX, and/or copying. Similarly, in addition to having a scanning function, the scanner 300 may have one or more other functions such as printing, FAX, or copying. Note that a device with multiple functions may be referred to as an MFP (multifunction peripheral).

The computer 100 estimates the reference color reproduction characteristics and the inverse of the user color reproduction characteristics from three sets of image data including the original image data used by the reference printer 400 upon printing the reference printed material, the reference image data obtained by the scanner 300 upon scanning the reference printed material, and the user image data obtained by the scanner 300 upon scanning the user printed material corresponding to the original image data printed by the user printer 200. The original image data may be stored in the user printer 200 beforehand, or obtained from the reference printer 400, for example. Note that in some embodiments, the computer 100, the user printer 200, and the scanner 300 may be integrated into a single MFP, for example.

<Hardware Configuration>

Figure 3:
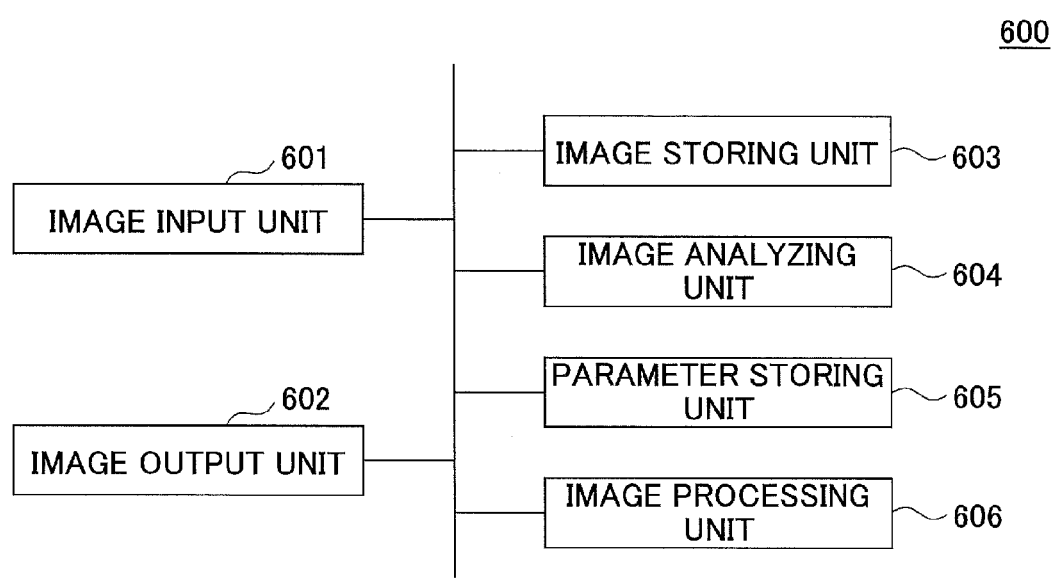
FIG. 3 illustrates an exemplary hardware configuration of the image processing system.

FIG. 3 illustrates an exemplary hardware configuration of the image processing system 600. The image processing system 600 includes an image input unit 601, an image output unit 602, an image storing unit 603, an image analyzing unit 604, a parameter storing unit 605, and an image processing unit 606.

The image input unit 601 inputs an image output by an image output device. The image input unit 601 may correspond to the scanner 300 of FIG. 2. The image storing unit 603 stores the image data obtained by the image input unit 601. The image storing unit 603 may be implemented by the computer 100 of FIG. 2. The image analyzing unit 604 analyzes the reference image data, the user image data, and the original image data to estimate the reference color reproduction characteristics and the inverse of the user color reproduction characteristics. The image analyzing unit 604 may be implemented by the computer 100 of FIG. 2. The parameter storing unit 605 stores the reference color reproduction characteristics and the inverse of the user color reproduction characteristics obtained by analyzing the image data. The parameter storing unit 605 may be implemented by the computer 100 of FIG. 2. The image processing unit 606 executes color conversion based on the obtained reference color reproduction characteristics and the inverse of the user color reproduction characteristics. The image processing unit 606 may correspond to the user printer 200 of FIG. 2. The image output unit 602 outputs the color-converted image, and may correspond to the user printer 200 of FIG. 2.

Figure 4:
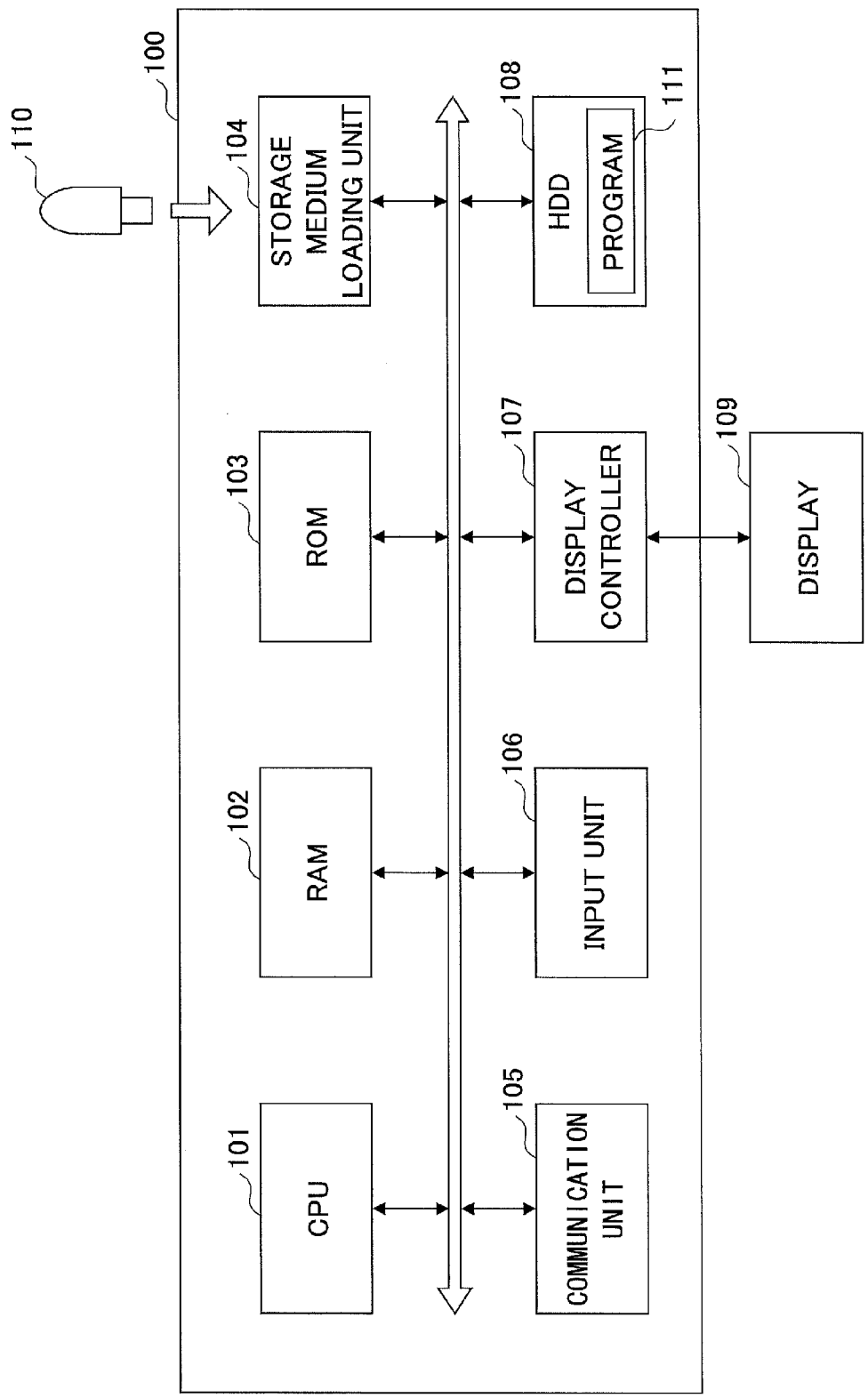
FIG. 4 illustrates an exemplary hardware configuration of a computer according to the first embodiment.

FIG. 4 illustrates an exemplary hardware configuration of the computer 100. The computer 100 includes a central processing unit (CPU) 101, a random access memory (RAM) 102, a read only memory (ROM) 103, a storage medium loading unit 104, a communication unit 105, an input unit 106, a display controller 107, and a hard disk drive (HDD) 108 that are interconnected via a bus. The CPU 101 reads operating system (OS) programs or other programs from the HDD 108 and executes these programs to implement various functions. The CPU 101 also performs a process of estimating the reference color reproduction characteristics and the inverse of user color reproduction characteristics.

The RAM 102 may be used as a working memory (main memory) for temporarily storing data required by the CPU 101 to execute a program. The ROM 103 stores static data and programs such as a basic input output system (BIOS) and programs for starting up the OS, for example.

A storage medium 110 may be loaded into or unloaded from the storage medium loading unit 104. The storage medium loading unit 104 reads data recorded on the storage medium 110 and stores the data in the HDD 108. The storage medium loading unit 104 may also write data stored in the HDD 108 into the storage media 110. The storage medium 110 may be a USB memory device, an SD card, or some other memory device, for example. A program 111 may be stored in the storage media 110 and distributed in such a state, or the program 111 may be downloaded from a server (not shown), for example.

The input unit 106 may include a keyboard, a mouse, a trackball, and the like. The input unit 106 receives various user commands to be supplied to the computer 100.

The HDD 108 may be replaced with non-volatile storage devices such as a solid state drive (SSDs). The HDD 108 stores the OS, programs, and various data including image data.

The communication unit 105 is a network interface card (NIC) such as an Ethernet card.

The display controller 107 generates and displays screen images on a display 109 by interpreting graphic commands stored in a graphic memory. The graphic commands are stored by the CPU 101 upon executing the program 111.

Figure 5:
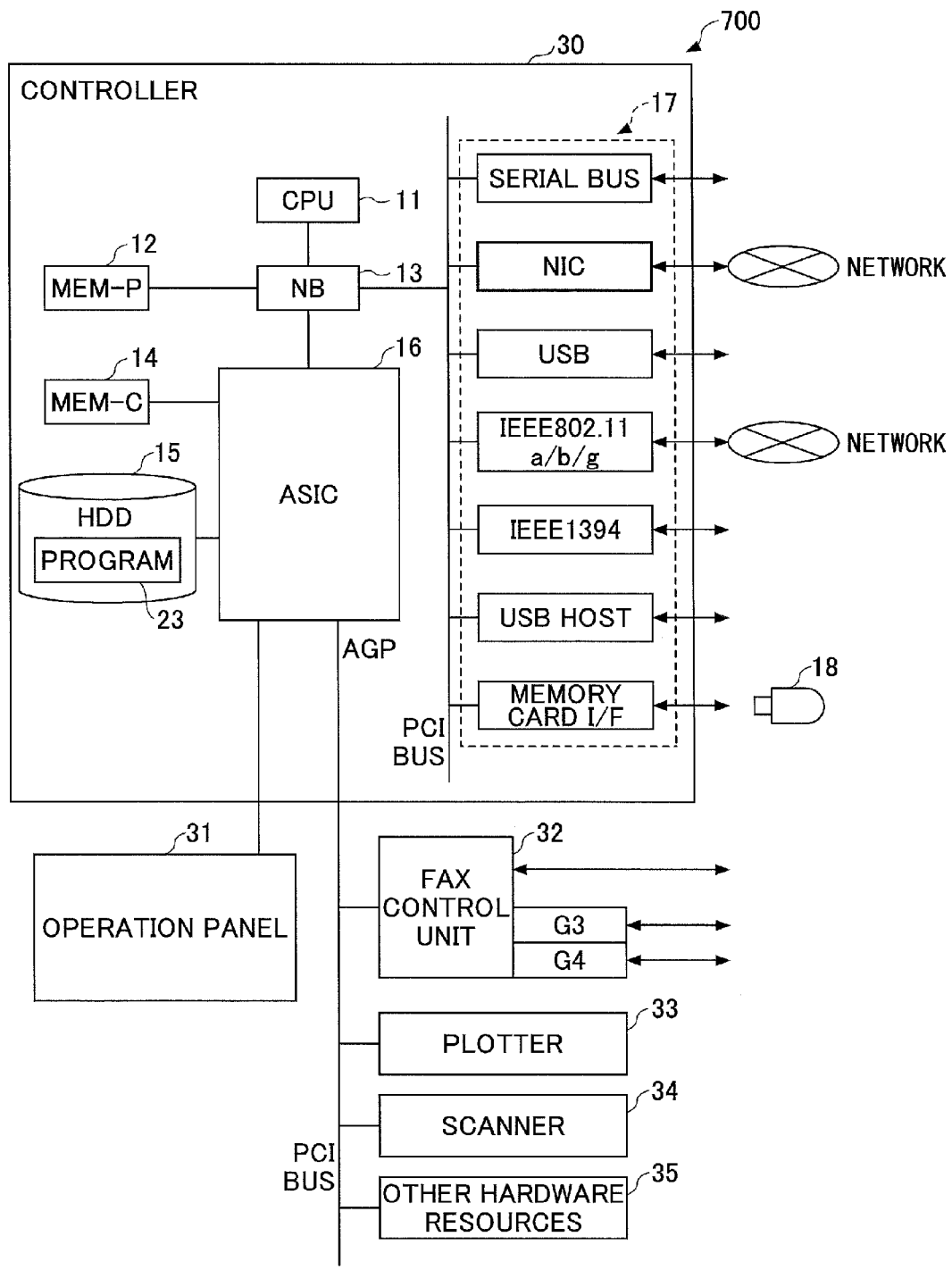
FIG. 5 illustrates an exemplary hardware configuration of a multifunction peripheral according to the first embodiment.

FIG. 5 illustrates an exemplary hardware configuration of a multifunction peripheral (MFP) 700 corresponding to an embodiment in which the elements of the image processing system 600 are integrated into a single device. The MFP 700 includes a controller 30, an operation panel 31, a FAX control unit 32, a plotter 33, a scanner 34, and other hardware resources 35. The controller 30 includes a CPU 11, a system memory (MEM-P) 12, a north bridge (NB) 13, an application specific integrated circuit (ASIC) 16, a local memory (MEM-C) 14, a hard disk drive (HDD) 15, and peripheral devices 17 that are connected to the NB 13 via a peripheral component interconnect (PCI) bus.

In the controller 30, the ASIC 16 is connected to the MEM-C 14, the HDD 15, and the NB 13. The NB 13 is connected to the CPU 11 and the MEM-P 12. The NB 13 is one chip of the CPU chipset and corresponds to a bridge for interconnecting the CPU 11, the MEM-P 12, the ASIC 16, and peripheral devices 17.

The ASIC 16 is an integrated circuit (IC) for executing various types of image processing. The ASIC 16 also acts as a bridge for interconnecting an accelerated graphics port (AGP), the HDD 15, and the MEM-C 14. The CPU 11 performs overall control of the MFP 700 and activates and executes various programs installed in the MFP 700.

The MEM-P 12 is a system memory used by the system of the MFP 700, and the MEM-C 14 is a local memory used as buffer while processing the image data.

The HDD 15 is a large capacity storage device, and may be replaced by a SSD (solid state drive), for example. The HDD 15 stores the OS, various application programs, and various data including font data, for example. The HDD 15 also stores a program 23 for performing color conversion. The program 23 may be stored in a storage medium 18 and distributed in such a state, or the program 23 may be downloaded from a server (not shown), for example.

The peripheral devices 17 include a serial bus, a network interface card (NIC), a universal serial bus (USB) host, IEEE802.11a/b/g/n, IEEE1394, and a memory card interface (I/F). The serial bus may be connected to a Centronics cable. The NIC controls communication via a network. The USB host is connected to a USB device via a USB cable. IEEE802.11a/b/g/n are interfaces for wireless LAN that control wireless communication. IEEE1394 is an interface for controlling high-speed serial communication. Various types of memory cards may be loaded into the memory card I/F, and the memory card I/F reads/writes data from/to the memory cards loaded therein. Memory cards may include, for example, SD cards, multimedia cards, xD cards, and the like.

The operation panel 31 includes hardware such as a keyboard and a display device such as an LCD display. The operation panel 31 receives input operations from a user, and displays various information on the screen. The operation panel 31 may include a touch panel, which may be used as a software keyboard for inputting user operations.

The FAX control unit 32 is connected to a public communication network via a network control unit (NCU). The FAX control unit 32 may send/receive facsimile according to communication protocols for G3/G4 compliant facsimile. The FAX control unit 32 may apply signal processing such as data compression or modulation to send image data, or may apply signal processing such as data expansion or error correction on the received data to recover the image data.

The plotter 33 may be, for example, a monochrome or color electrophotographic plotter that forms and transfers pages of image data onto paper according to the data to be printed or the data scanned by the scanner 34. For example, the plotter 33 may adopt an electrophotographic process using a laser beam. In this case, the plotter 33 may form a toner image on a photoconductive drum, transfer the toner image onto paper, and fix the image by applying heat and pressure to the toner image using a fixing device. In another example, the plotter 33 may apply ink droplets on a printing medium to print an image.

The scanner 34 optically scans an image of an original document that is placed on a contact glass, applies analog/digital (A/D) conversion on reflected light, and executes publicly known image processing techniques to obtain digitally-converted image data with a prescribed resolution.

Note that the scanner 34 of the MFP 700 of FIG. 5 may correspond to the image input unit 601 of FIG. 2, the plotter 33 may correspond to the image input unit 602, the HDD 15 may correspond to the image storing unit 603, the CPU 11 may correspond to the image analyzing unit 604, the HDD 15 may correspond to the parameter storing unit 605, and the ASIC 16 may correspond to the image processing unit 606, for example.

<Functional Configuration>

Figure 6:
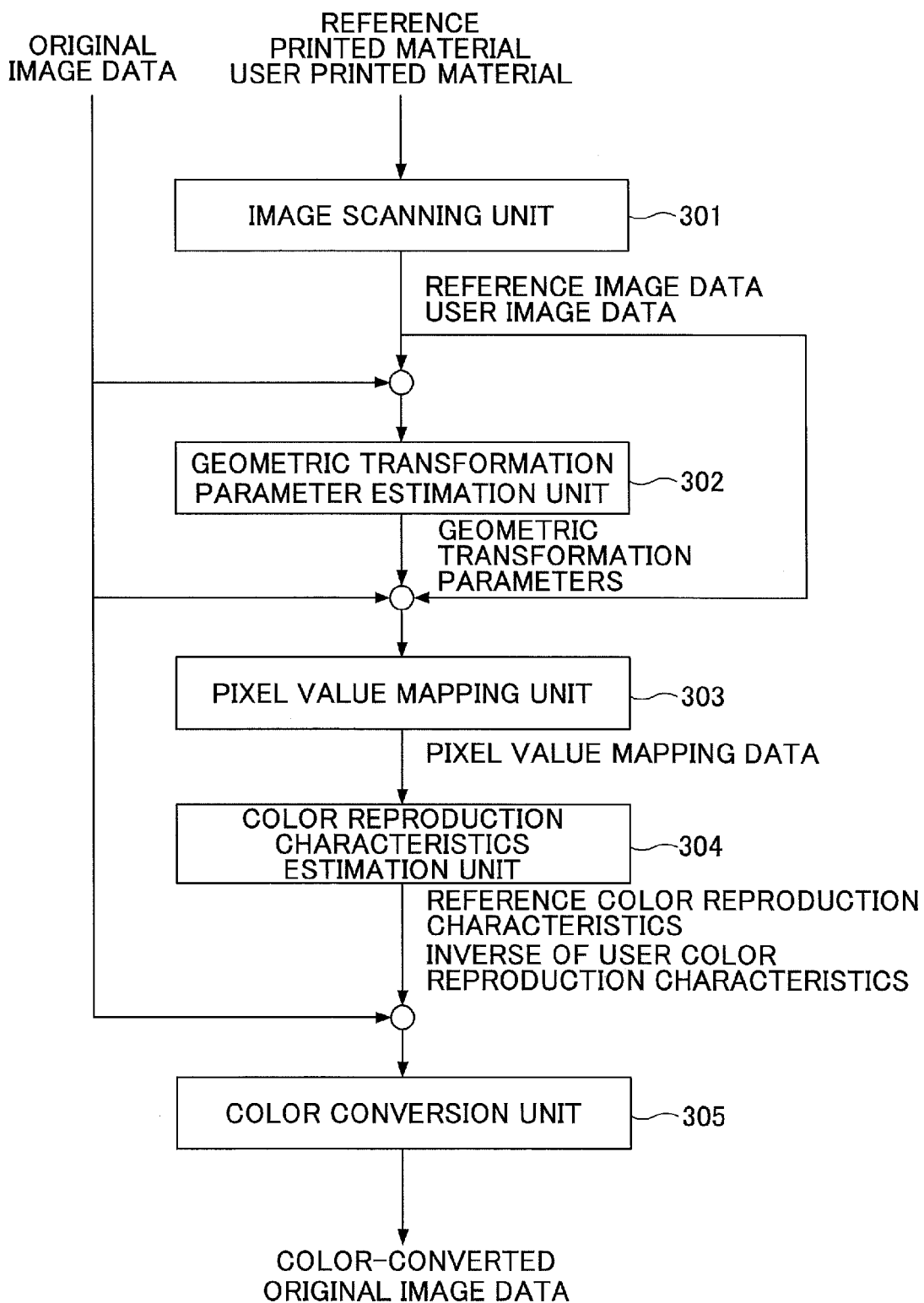
FIG. 6 is a block diagram illustrating an exemplary functional configuration of the image processing system or the multifunction peripheral according to the first embodiment.

FIG. 6 illustrates an exemplary functional configuration of the image processing system 600 or the MFP 700. The image processing system 600 or the MFP 700 includes an image scanning unit 301, a geometric transformation parameter estimation unit 302, a pixel value mapping unit 303, a color reproduction characteristics estimation unit 304, and a color conversion unit 305.

The image scanning unit 301 scans the reference printed material and the user printed material corresponding to output results of the original image data, and generates the reference image data and the user image data.

The geometric transformation parameter estimation unit 302 estimates geometric transformation parameters between the original image data and the reference image data, or between the original image data and the user image data.

The pixel value mapping unit 303 uses the geometric transformation parameters to identify a pixel in the original image data and a corresponding pixel in the reference image data at a corresponding position, and generates pixel value mapping data associating the pixel values of the corresponding pixels with respect to each combination of color components of the pixels. Similarly, the pixel value mapping unit 303 uses the geometric transformation parameters to identify a pixel in the original image data and a corresponding pixel in the user image data at a corresponding position, and generates pixel value mapping data associating the pixel values of the corresponding pixels with respect to each combination of color components of the pixels.

The color reproduction characteristics estimation unit 304 uses the pixel value mapping data to estimate the reference color reproduction characteristics and the inverse of the user color reproduction characteristics.

The color conversion unit 305 uses the reference color reproduction characteristics and the inverse of the user color reproduction characteristics to perform color conversion on the original image data.

<Process>

In the following, exemplary processes that may be executed by the image processing system 600 or the MFP 700 of the present embodiment are described.

<<Reference Color Reproduction Characteristics Estimation Process>>

Figure 7:
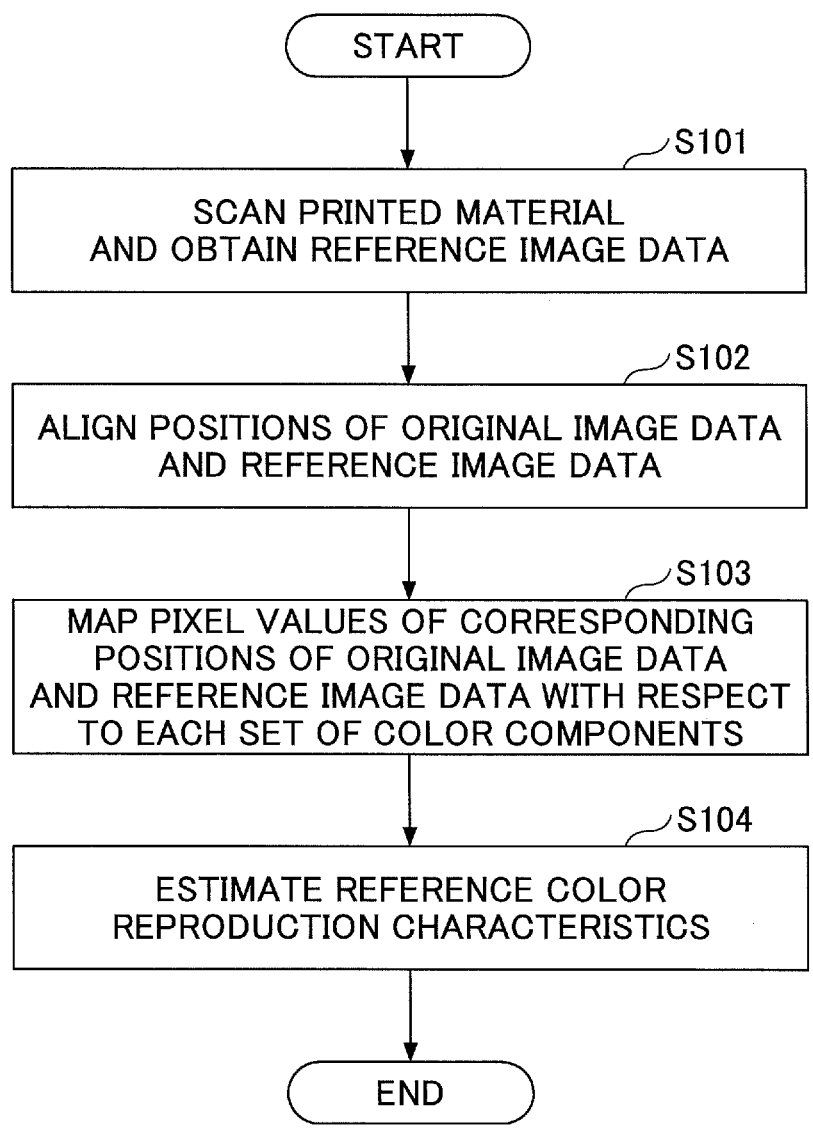
FIG. 7 is a flowchart illustrating an exemplary process of estimating reference color reproduction characteristics.

FIG. 7 is a flowchart illustrating an exemplary reference color reproduction characteristics estimation process. FIG. 7 illustrates a process from when the image scanning unit 301 scans the reference printed material until the color reproduction characteristics estimation unit 304 estimates the reference color reproduction characteristics.

In step S101, the image scanning unit 301 scans the reference printed material and generates the reference image data.

In step S102, the geometric transformation parameter estimation unit 42 aligns positions of the original image data and the reference image data.

Before aligning positions of the two images corresponding to the original image data and the reference image data, the geometric transformation parameter estimation unit 302 determines geometric transformation parameters of the reference image data using the original image data as a reference. Examples of geometric transformation parameters include displacement, rotation angle, and magnification. Geometric transformation parameters may be estimated with publicly known techniques including methods using markers, or methods which do not use markers such as pattern matching methods or phase only correlation methods.

a) Method Using Markers

Markers referred to as "registry guides" may be arranged at the four corners and/or the center of each side of the original image data upon being output as the reference printed material. Upon obtaining the reference image data by scanning the reference printed material, misalignments of the registry guides may be detected and used to determine the displacement, the rotation angle, and/or the magnification of the reference image data with respect to the original image data.

b) Pattern Matching Method

A pattern matching method referred to as "template matching method" may be used in a case where only the displacement needs to be estimated. The template matching method takes one of the images as a template, shifts the position of the template gradually while calculating the degree of coincidence with another image, and searches for the optimal position where the degree of coincidence takes the maximal value. Note that when geometric transformation parameters other than the displacement are required, a method for estimating the rotation angle such as the Hough transform, or a method for estimating the magnification such as the multi-scale analysis may be used in conjunction with the template matching method.

A pattern matching method applying the template matching method that is referred to as "block matching method" involves dividing one of the images into blocks. The block matching method estimates the displacement of each block by searching for the optimal position where the degree of coincidence with another image takes the maximal value. The block matching method may be used to estimate the rotation angle or the magnification based on the estimated displacement of each block.

c) Phase Only Correlation Method

Examples of methods that may be used to estimate the displacement, the rotation angle, and the magnification with high accuracy include the so-called "phase only correlation method" (POC) and the "rotation invariant phase only correlation method" (RIPOC). The POC uses phase images obtained by applying discrete Fourier transformation to images. The POC estimates the displacement of an image with respect to another image by obtaining phase images of the two images, and searching for a position where the correlation between the two phase images takes the highest value. The RIPOC, which is a variation of the POC, uses phase images transformed into log-polar coordinates from which the rotation angle and the magnification are estimated as the displacement in the transformed coordinates.

After obtaining the geometric transformation parameters in the manner described above, the geometric transformation parameter estimation unit 302 applies geometric transformation to the reference image data. In a case where the pixels do not have a one-to-one correspondence before and after the transformation due to sub-pixel level shifts, or some sort of rotation or magnification, in-between pixel values may be properly obtained with interpolation such as bilinear interpolation or bicubic interpolation, for example.

Note that the geometric transformation does not necessarily have to be applied in step S102. For example, in the next step, when obtaining pixels of the same position in the original image data and the reference image data, coordinate transformation may be executed using the geometric transformation parameters instead of determining whether the pixels are at the same position. In other words, two pixels in different images are treated as having the same position even if they have different coordinates in their respective coordinate systems according to the origins of the respective image, as long as they have the same coordinates after applying the geometric transformation to the images.

Note that in some cases, a printed material obtained by outputting the original image data may have margins around the output image. Because the height and width of the margins are included in the displacement of the geometric transformation parameters, the margins generally do not have to be taken into account. However, in some embodiments these margins may be removed from the output image data in order to match the positions of the origins of the original image data and the output image data, for example.

Next, in step S103, the pixel value mapping unit 303 performs pixel value mapping of a pixel in the original image data and a pixel in the reference image data at the same position with respect to each set of color components. That is, after aligning the positions of the original image data and the reference image data, the pixel value mapping unit 303 obtains the pixel values of the corresponding pixels of the original image data and the reference image data, and identifies the correspondence between the pixel values with respect to each set of color components to generate the pixel value mapping data. Note that in the case where geometric transformation is applied to align the original image data and the reference image data, the "corresponding pixels" may be the "pixels at the same position". On the other hand, in the case where geometric transformation is not applied when aligning the original image data and the reference image data, positions having the same coordinate values after coordinate transformation is applied to the image data may be regarded as the "same position", and the pixels located at such positions may be regarded as "corresponding pixels".

Pixel value mapping data may be recorded in several ways including, for example, recording the pixel value mapping data in list format. In the following, it is assumed that both the original image data and the reference image data correspond to RGB image data including a 256-level value for each color component. For example, pixel values may be recorded in list format in the following manner.

1) Prepare one list.

2) Select a set of coordinates specifying a pixel in the original image data.

3) Bundle together pixel values of the original image data and the reference image data including an R component value ($R_{in}$), a G component value ($G_{in}$), and a B component value ($B_{in}$) of the pixel of the original image data selected in the above step 2), and an R component value ($R_{out1}$) a G component value ($G_{out1}$), and a B component value ($B_{out1}$) of a corresponding pixel of the reference image data, and add the bundled pixel values to the list.

4) Repeat the above steps 1) to 3) with respect to all coordinates (pixels) of the original image data.

Note that the pixel values recorded in the list may be rearranged in ascending order or descending order as is necessary, for example. Also, instead of repeating the above steps 1) to 3) with respect to all the coordinates of the original image data, in some embodiments, the steps may be performed with respect to a specified range of the original image data, or the coordinates may be selected at certain intervals in order to simplify the process of recording the pixel values, for example.

FIG. 8 illustrates an exemplary configuration of pixel value mapping data stored in list format. In the list of FIG. 8, the color component values ($R_{in}$, $G_{in}$, $B_{in}$) of pixels of the original image data are recorded at the left side, and the color component values ($R_{out1}$, $G_{out1}$, $B_{out1}$) of the corresponding pixels of the reference image data are recorded at the right side.

Note that when generating the pixel value mapping data, contours of the image data (including the original image data and the reference image data) are preferably removed. Such a measure is preferably implemented in view of the difficulty of completely matching the contours upon aligning the image data and the potential errors that may be created in the pixel value mapping. When errors are created in the pixel value mapping, the estimation accuracy of the color reproduction characteristics may be degraded.

Exemplary methods for detecting the contours of the image data include a method using binarization and a method using edge detection.

An example of the method using binarization may involve converting image data into binary data (black & white) using a predetermined threshold value, and determining a boundary between a white region and a black region as the contour.

An example of the method using edge detection may involve generating an edge image from the image data using the Sobel method, for example, binarizing the edge image using a predetermined threshold value, and determining pixels that are greater than or equal to a threshold value as the contour.

Note that there are alternative methods for suppressing the degradation of the estimation accuracy without removing the contours. For example, the image data may be smoothed (blurred) so that color differences at the contour portions of the image may be reduced. In this case, conventional techniques such as that using an average filter or a low pass filter may be used to smooth the image data, for example.

Next, in step S104, the color reproduction characteristics estimation unit 304 estimates the reference color reproduction characteristics. That is, the color reproduction characteristics estimation unit 304 uses the pixel value mapping data generated in step S103 to determine the correspondence between a pixel value of the original image data and a pixel value of the reference image data. In the following, it is assumed that, as in step S103, both the original image data and the reference image data correspond to RGB image data having a 256-level value for each color component.

Estimation of the reference color reproduction characteristics refers to estimating color conversion characteristics that represent a correlation between color component values ($R_{in}$, $G_{in}$, $B_{in}$) of the original image data and color component values ($R_{out1}$, $G_{out1}$, $B_{out1}$) of the reference image data upon converting the color component values ($R_{in}$, $G_{in}$, $B_{in}$) into the color component values ($R_{out1}$, $G_{out1}$, $B_{out1}$) using the pixel value mapping data.

For example, the reference color reproduction characteristics may be estimated using the following polynomial approximation formula.

$$\hat{Y} = M_S f(X) \cong Y$$

Note that in the above formula, X represents the color component values $[R_{in}, G_{in}, B_{in}]^t$ of the original image data, Y represents color component values $[R_{out1}, G_{out1}, B_{out1}]^t$ of the reference image data, $M_S$ represents a correction coefficient matrix, and f represents a correction function. For example, the correction function f(X) may be expressed as follows:

$$f(X) = [R_{in}, G_{in}, B_{in}, R_{in}^2, G_{in}^2, B_{in}^2, R_{in}G_{in}, G_{in}B_{in}, B_{in}R_{in},$$
$$R_{in}^3, G_{in}^3, B_{in}^3, R_{in}^2G_{in}, G_{in}^2B_{in}, B_{in}^2R_{in}, \ldots, 1]^t$$

Note that when there is a linear distortion between the original image data and the reference image data, the color reproduction characteristics may be estimated by applying a linear conversion manipulating the 3×3 correction coefficient matrix $M_S$ to the three terms of the correction function f(X)= $[R_{in}, G_{in}, B_{in}]^t$, for example. However, when there is a more complicated non-linear distortion between the original image data and the reference image data, high accuracy color reproduction characteristics estimation may have to be performed using a higher order function, for example.

The correction coefficient $M_S$ may be obtained, for example, by the least squares method. Using a number N of color component values X(n) (where n=1~N) of the original image data corresponding to the color component values Y(n) (where n=1~N) of the reference image data stored in the pixel value mapping data, and using the minimum mean square error of the mean square error $E[e^2]$ given by the equation $$E[e^2] = \frac{1}{N}\left[\sum_{n=1}^{N} \|Y(n) - M_S f(X(n))\|^2\right]$$

the correction coefficient $M_S$ may be obtained by the following formula:

$$M_S = [Y_N f'(X_N)][f(X_N)f'(X_N)]^{-1}$$

Note that in the above formula, $Y_N$ and $X_N$ represent the pixel value mapping data matrices of N pixels. That is, $Y_N$ represents a color component value matrix of the reference image data, and $X_N$ represents a color component value matrix of the original image data as indicated below.

$$Y_N = \begin{bmatrix} R_{out1}(1), & R_{out1}(2), & \ldots, & R_{out1}(n) \\ G_{out1}(1), & G_{out1}(1), & \ldots, & G_{out1}(n) \\ B_{out1}(1), & B_{out1}(1), & \ldots, & B_{out1}(n) \end{bmatrix}$$

$$X_N = \begin{bmatrix} R_{in}(1), & R_{in}(2), & \ldots, & R_{in}(n) \\ G_{in}(1), & G_{in}(2), & \ldots, & G_{in}(n) \\ B_{in}(1), & B_{in}(2), & \ldots, & B_{in}(n) \end{bmatrix}$$

Note that $R_{out1}(n)$ represents the R component value of the $n^{th}$ reference image data pixel registered in the pixel value mapping data, and $R_{in}(n)$ represents the R component value of the $n^{th}$ original image data pixel registered in the pixel value mapping data (similarly, $G_{out1}(n)$, $B_{out1}(n)$, $G_{in}(n)$, and $B_{in}(n)$ represent corresponding color component values of the $n^{th}$ pixel of the reference image data and the original image data).

Also, note that $f(X_N)$ represents a functional argument matrix of the color component values of the original image data. For example, in a case where the matrix corresponds to a quadratic function, $f(X_N)$ may be represented by a 10×N matrix as follows:

$$f(X_N) = \begin{bmatrix} R_{in}(1), & R_{in}(2), & \ldots, & R_{in}(N), \\ G_{in}(1), & G_{in}(2), & \ldots, & G_{in}(N), \\ B_{in}(1), & B_{in}(2), & \ldots, & B_{in}(N), \\ R_{in}(1)^2, & R_{in}(2)^2, & \ldots, & R_{in}(N)^2, \\ G_{in}(1)^2, & G_{in}(2)^2, & \ldots, & G_{in}(N)^2, \\ B_{in}(1)^2, & B_{in}(2)^2, & \ldots, & B_{in}(N)^2, \\ R_{in}(1)G_{in}(1), & R_{in}(2)G_{in}(2), & \ldots, & R_{in}(N)G_{in}(N), \\ G_{in}(1)B_{in}(1), & G_{in}(2)B_{in}(2), & \ldots, & G_{in}(N)B_{in}(N), \\ B_{in}(1)R_{in}(1), & B_{in}(2)R_{in}(2), & \ldots, & B_{in}(N)R_{in}(N), \\ 1, & 1, & \ldots, & 1, \end{bmatrix}$$

Note that the present invention is not limited to using the functional argument matrix as described above to estimate the reference color reproduction characteristics as long as multidimensional data based on a plurality of color components is used. Also, note that although polynomial approximation is described above as an exemplary method used for estimating the reference color reproduction characteristics, the present invention is not limited to such an example. In other examples, the pixel value mapping data may be used as training data for a neural network to estimate the reference color reproduction characteristics. Also, note that in the case where the correspondence between pixel values is recorded with respect to all the coordinates of the original image data in the pixel value mapping data generated in step S103, the generated pixel value mapping data may be used as the reference color reproduction characteristics as is.

<<User Color Reproduction Characteristics Estimation Process>>

Figure 9:
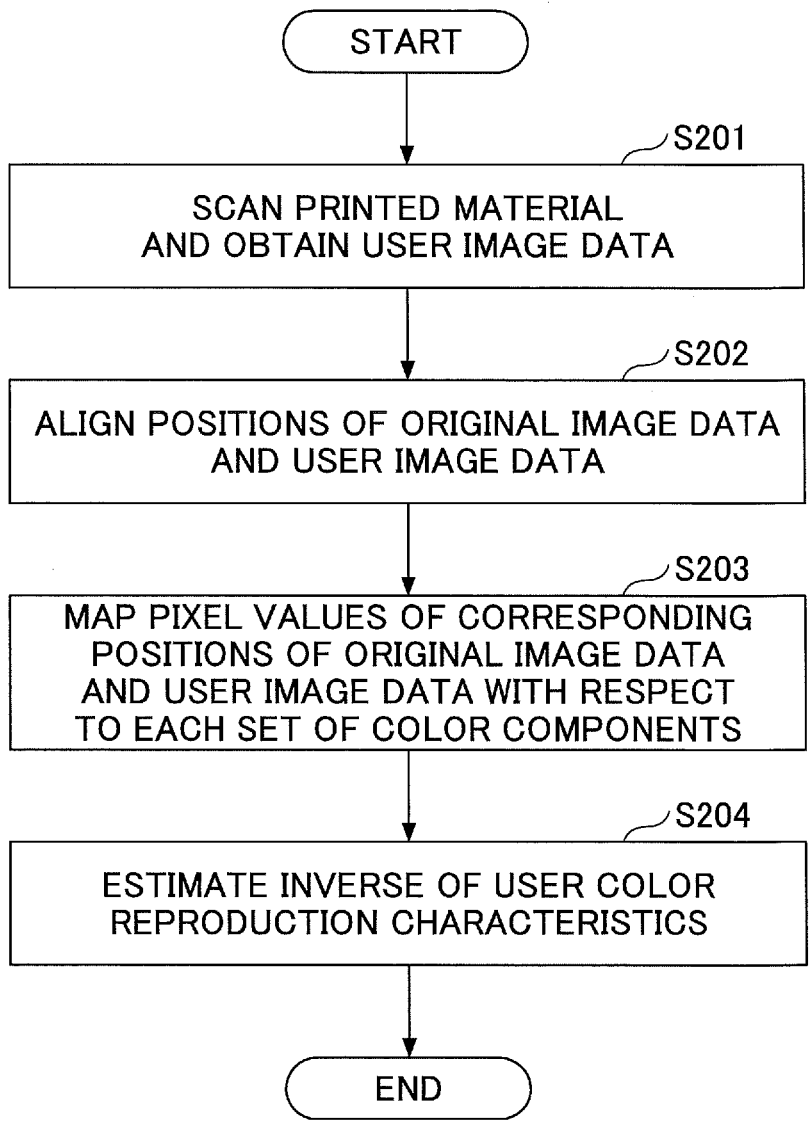
FIG. 9 is a flowchart illustrating an exemplary process of estimating user color reproduction characteristics.

FIG. 9 is a flowchart illustrating an exemplary process of estimating user color reproduction characteristics. FIG. 9 illustrates a process from when the image scanning unit 301 scans the user printed material until the color reproduction characteristics estimation unit 304 estimates the user color reproduction characteristics.

Note that steps S201-S203 of FIG. 9 may be substantially identical to steps S101-S103 of FIG. 7 by replacing the term "reference image data" with the term "user image data". Accordingly, descriptions of steps S201-S203 are omitted below.

FIG. 10 illustrates an exemplary configuration of pixel value mapping data recorded in list format in step S203. In FIG. 10, color component values ($R_{in}$, $G_{in}$, $B_{in}$) of pixels of the original image data are recorded at the left side, and color component values ($R_{out2}$, $G_{out2}$, $B_{out2}$) of pixels of the user image data are recorded at the right side.

Next, in step S204, the color reproduction characteristics estimation unit 304 estimates the inverse of the user color reproduction characteristics. That is, the color reproduction characteristic estimation unit 304 uses the pixel value mapping data generated in step S203 to determine a correspondence between a pixel value of the original image data and a pixel value of the user image data. In the following, as with the description of step S103 of FIG. 7, it is assumed that both the user image data and the original image data correspond to RGB image data with a 256-level value for each color component.

Estimating the inverse of the user color reproduction characteristics refers to estimating color reproduction characteristics representing a correspondence between the user image data color component values ($R_{out2}$, $G_{out2}$, $B_{out2}$) and the original image data color component values ($R_{in}$, $G_{in}$, $B_{in}$) upon converting the user image data color component values ($R_{out2}$, $G_{out2}$, $B_{out2}$) into the original image data color component values ($R_{in}$, $G_{in}$, $B_{in}$) using the pixel value mapping data.

For example, the inverse of the user color reproduction characteristics may be estimated using the following polynomial approximation formula.

$$\hat{Y} = M_S f(X) \cong Y$$

Note that in the above formula, X represents the color component values $[R_{out2}, G_{out2}, B_{out2}]^t$ of the user image data, Y represents color component values $[R_{in}, G_{in}, B_{in}]^t$ of the original image data, $M_S$ represents a correction coefficient matrix, and f represents a correction function. For example, the correction function f(X) may be expressed as follows:

$$f(X) = [R_{out2}, G_{out2}, B_{out2}, R_{out2}^2, G_{out2}^2, B_{out2}^2, R_{out2}G_{out2}, G_{out2}B_{out2}, B_{out2}R_{out2}, R_{out2}^3, G_{out2}^3, B_{out2}^3, R_{out2}^2 G_{out2}, G_{out2}^2 B_{out2}, B_{out2}^2 R_{out2}, \ldots, 1]^t$$

Note that when there is a linear distortion between the original image data and the user image data, the color reproduction characteristics may be estimated by applying a linear conversion manipulating the 3×3 correction coefficient matrix $M_S$ to the three terms of the correction function f(X)= $[R_{out2}, G_{out2}, B_{out2}]^t$, for example. However, when there is a more complicated non-linear distortion between the original image data and the user image data, high accuracy color reproduction characteristics estimation may have to be performed using a higher order function, for example.

The correction coefficient $M_S$ may be obtained, for example, by the least squares method. Using a number N of color component values X(n) (where n=1~N) of the original image data corresponding to the color component values Y(n) (where n=1~N) of the reference image data stored in the pixel value mapping data, and using the minimum mean square error of the mean square error $E[e^2]$ given by the equation $$E[e^2] = \frac{1}{N}\left[\sum_{n=1}^{N} \|Y(n) - M_S f(X(n))\|^2\right]$$

the correction coefficient $M_S$ may be obtained by the following formula:

$$M_S = [Y_N f^t(X_N)][f(X_N)f^t(X_N)]^{-1}$$

Note that in the above formula, $Y_N$ and $X_N$ represent the pixel value mapping data matrices of N pixels. That is, $Y_N$ represents a color component value matrix of the original image data, and $X_N$ represents a color component value matrix of the user image data as indicated below.

$$Y_N = \begin{bmatrix} R_{in}(1), & R_{in}(2), & \ldots, & R_{in}(n) \\ G_{in}(1), & G_{in}(2), & \ldots, & G_{in}(n) \\ B_{in}(1), & B_{in}(2), & \ldots, & B_{in}(n) \end{bmatrix}$$

$$X_N = \begin{bmatrix} R_{out2}(1), & R_{out2}(2), & \ldots, & R_{out2}(n) \\ G_{out2}(1), & G_{out2}(2), & \ldots, & G_{out2}(n) \\ B_{out2}(1), & B_{out2}(2), & \ldots, & B_{out2}(n) \end{bmatrix}$$

Note that $R_{out2}(n)$ represents the R component value of the $n^{th}$ user image data pixel registered in the pixel value mapping data, and $R_{in}(n)$ represents the R component value of the $n^{th}$ original image data pixel registered in the pixel value mapping data (similarly, $G_{out2}(n)$, $B_{out2}(n)$, $G_{in}(n)$, and $B_{in}(n)$ represent corresponding color component values of the $n^{th}$ pixel of the user image data and the original image data).

Also, note that f($X_N$) represents a functional argument matrix of the color component values of the original image data. For example, in a case where the matrix corresponds to a quadratic function, f($X_N$) may be represented by a 10×N matrix as follows:

$$f(X_N) = \begin{bmatrix} R_{out2}(1), & R_{out2}(2), & \ldots, & R_{out2}(N), \\ G_{out2}(1), & G_{out2}(2), & \ldots, & G_{out2}(N), \\ B_{out2}(1), & B_{out2}(2), & \ldots, & B_{out2}(N), \\ R_{out2}(1)^2, & R_{out2}(2)^2, & \ldots, & R_{out2}(N)^2, \\ G_{out2}(1)^2, & G_{out2}(2)^2, & \ldots, & G_{out2}(N)^2, \\ B_{out2}(1)^2, & B_{out2}(2)^2, & \ldots, & B_{out2}(N)^2, \\ R_{out2}(1)G_{out2}(1), & R_{out2}(2)G_{out2}(2), & \ldots, & R_{out2}(N)G_{out2}(N), \\ G_{out2}(1)B_{out2}(1), & G_{out2}(2)B_{out2}(2), & \ldots, & G_{out2}(N)B_{out2}(N), \\ B_{out2}(1)R_{out2}(1), & B_{out2}(2)R_{out2}(2), & \ldots, & B_{out2}(N)R_{out2}(N), \\ 1, & 1, & \ldots, & 1 \end{bmatrix}$$

Note that the present invention is not limited to using the functional argument matrix as described above to estimate the inverse of the user color reproduction characteristics as long as multidimensional data based on a plurality of color components is used. Also, note that although polynomial approximation is described above as an exemplary method used for estimating the inverse of the user color reproduction characteristics, the present invention is not limited to such an example. In other examples, the pixel value mapping data may be used as training data for a neural network to estimate the inverse of the user color reproduction characteristics. However, unlike step S104 of FIG. 7, the pixel value mapping data generated in step S203 may not be directly used as the inverse of the user color reproduction characteristics. This is because a set of color components of a pixel value in the reference image data may not necessarily be included in the user image data, but estimation also has to be performed with respect to such a set of color components of a pixel value that is not included in the pixel value mapping data generated in step S203.

<<Color Conversion Process>>

Figure 11:
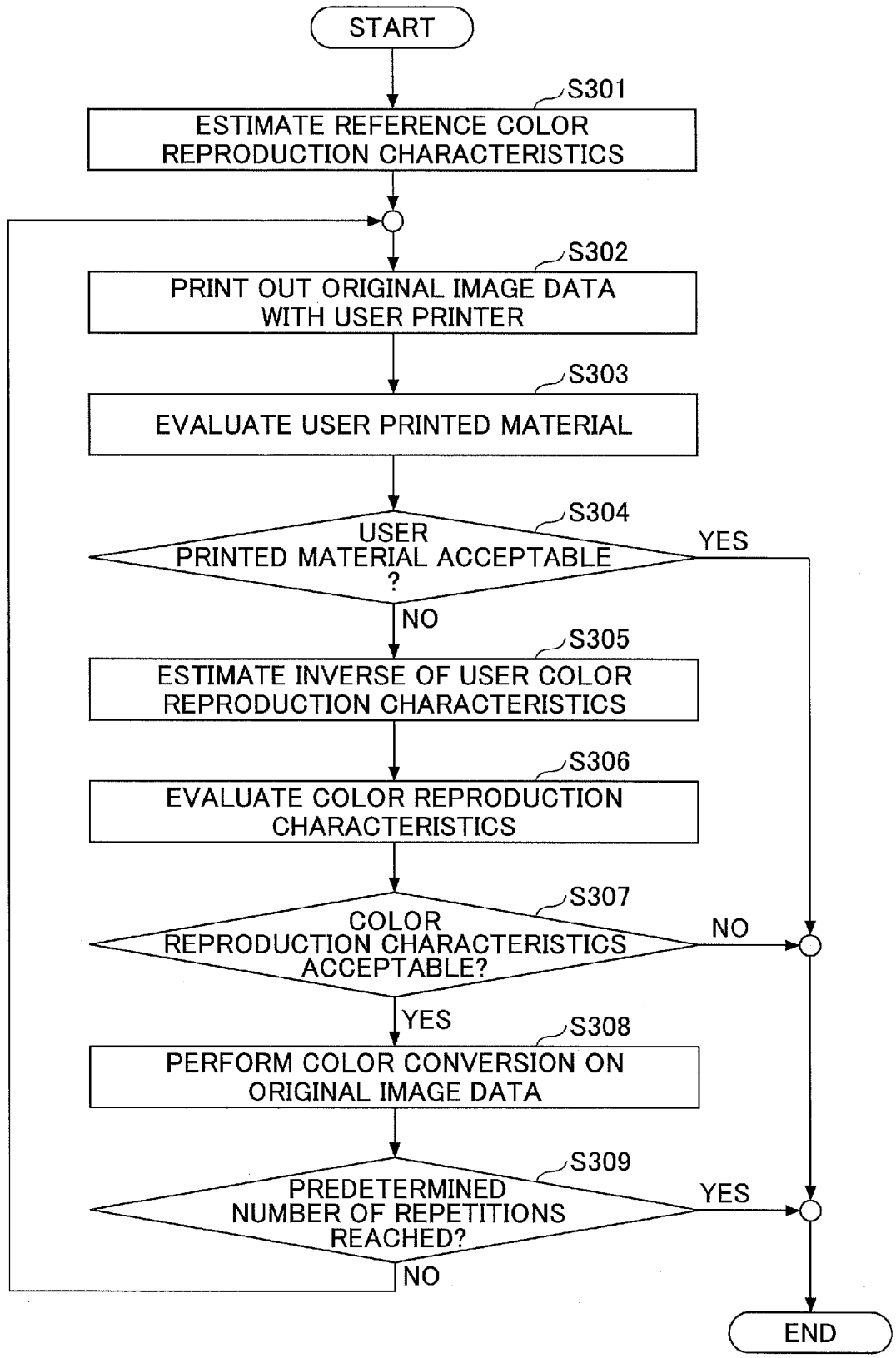
FIG. 11 is a flowchart illustrating an exemplary color conversion process.

In the following, the color conversion process is described in greater detail. FIG. 11 is a flowchart illustrating an exemplary color conversion process.

First, in step S301, the color reproduction characteristics estimation unit 304 estimates the reference color reproduction characteristics. That is, the reference color reproduction characteristics estimation process described above with reference to FIG. 7 may be executed in this step, for example. Note that step S301 may only need to be executed once. In the case where step S301 is to be performed multiple times, precaution needs to be taken to ensure that the initial version of the original image data is being used in this step rather than a color-converted version of the original image data.

Next, in step S302, for example, a user may print the original image data with the user printer 200. By printing the original image data with the user printer 200, the user printed material may be obtained.

Next, in step S303, the color conversion unit 305 evaluates the user printed material. That is, the color conversion unit 305 compares the user printed material and the reference printed material to evaluate the quality of the user printed material.

If the quality of the user printed material is deemed acceptable (step S304, YES), the process is ended. Otherwise (step S304, NO), the process proceeds to step S305.

Exemplary methods for evaluating the quality of the user printed material may include a method using a color difference with respect to the reference printed material, a method using a hue difference, and a method using the absolute value of the difference of each color component.

a) Evaluation Method Using Color Difference

A color difference is the distance between two colors in the L*a*b* color space or the L*u*v* color space. Because the present embodiment uses printers as image output devices, an example using the L*a*b* color space is described below.

The color difference $\Delta E^*_{ab}$ in the L*a*b* color space is defined by the following formula:

$$\Delta E^*_{ab} = \sqrt{(\Delta L^*)^2 + (\Delta a^*)^2 + (\Delta b^*)^2}$$

where ($\Delta L^*$, $\Delta a^*$, $\Delta b^*$) represent chromaticity differences between two colors in the L*a*b* color space.

In the following, process steps for obtaining the color difference between the reference printed material and the user printed material are described.

(1) Scan the reference printed material with the scanner 300 and obtain the reference image data.

(2) Scan the user printed material with the same scanner 300 and obtain the user image data.

(3) Convert the reference image data and the user image data into a device independent color space, such as XYZ color space, using a color profile of the scanner 300.

(4) Convert the reference image data and the user image data converted into the device independent color space into the L*a*b* color space.

(5) Obtain the color difference of each pixel using the above formula.

Note that although the same scanner 300 is used to scan the reference printed material and the user printed material in the above example, in other examples, two different scanners 300 may be used to scan the reference image data and the user image data under the condition that the data can be converted into a device independent color space using the color profile of scanners 300.

In the case of using a single scanner 300, it may not be necessary to convert the reference image data and the user image data into a device independent color space using the color profile of the scanner 300. In the case of quantitatively evaluating the color difference, conversion into a device independent color space is required because absolute values need to be obtained. On the other hand, in the case of qualitatively evaluating the color difference, conversion into a device independent color space may be omitted as it is sufficient to obtain a relative tendency.

After the color difference of each pixel is obtained, the information may be analyzed statistically to evaluate the quality of the user printed material quantitatively. Examples of analysis methods that may be used include those using the average value, the maximum value, the distribution, and the dispersion of color differences.

For example, the determination of whether the quality of the user printed material is acceptable may be made based on the following criteria:

Whether the average value of color differences is within a predetermined range.

Whether the maximum value of color differences is within a predetermined range.

Whether the dispersion of color differences is within a predetermined range.

Note that when evaluating the quality of the user printed material, contours of the image data are preferably removed. This is because large color differences may be obtained at the contours for the following reasons:

It is difficult to align the positions of contours in a subsequent step.

The reproduction of contours may differ from printer to printer (particularly with respect to tint and sharpness).

Note that because the area of contours takes up a very small portion of the entire area of the printed material, the contours may have a limited impact on an overall visual qualitative evaluation of color reproduction characteristics. However, in a quantitative evaluation, large color differences in the contours, or outliers, may degrade the reliability of evaluation results. Therefore, the removal of contours may be desirable in order to produce evaluation results with higher reliability and accuracy, for example.

Examples of methods that may be used for detecting contours include binarization, and edge detection. A method using binarization may involve dividing the image data into black and white areas according to a predetermined threshold value to determine contours where a black area and a white area are adjacently located, for example. A method using edge detection may involve generating edge image data using the Sobel method, for example, then binarizing pixels using a predetermined threshold value, and determining contours where pixels have a pixel value above the threshold value, for example.

Note that there are alternative methods for addressing the above problem without removing contours. For example, a method may be used that involves smoothing the image data including contours in order to reduce the color difference at contours. Smoothing may be done using conventional techniques such as using an average filter or a low-pass filter.

b) Evaluation Method Using Hue Difference

A hue difference $\Delta H^*_{ab}$ in the L*a*b* color space is defined by the following formula:

$$\Delta H^*_{ab} = \sqrt{(\Delta E^*_{ab})^2 - (\Delta L^*)^2 - (\Delta C^*_{ab})^2}$$

where $\Delta E^*_{ab}$ represents the color difference, $(\Delta L^*, \Delta a^*, \Delta b^*)$ represent chromaticity differences between two colors, and $\Delta C^*ab$ represents the chroma difference. Chroma, $C^*_{ab}$, is defined by the following formula:

$$C^*_{ab} = \sqrt{(a^*)^2 + (b^*)^2}$$

Note that process steps for obtaining the hue difference between the reference printed material and the user printed material may be almost the same as the above process steps for obtaining the color difference, except that the hue difference is calculated rather than the color difference. Also, statistical analysis methods and quality evaluation methods as described above may similarly be used in the evaluation process using the hue difference.

c) Evaluation Method Using the Absolute Value of the Difference of Each Color Component This evaluation method involves obtaining the absolute value of the difference of each color component between the reference printed material and the user printed material in a predetermined color space and using the obtained absolute values for evaluating the user printed material. For example, in the case of applying this evaluation method in the RGB color space, the absolute value of a difference in the R-component values, the absolute value of a difference in the G-component values, and the absolute value of a difference in the B-component values of the user image data and the reference image data may be used.

The following steps illustrate an example of obtaining the absolute value of the difference of each color component between the reference printed material and the user printed material.

1) Scan the reference printed material with the scanner 300 and obtain the reference image data.

2) Scan the user printed material with the same scanner 300 and obtain the user image data.

3) Convert the reference image data and the user image data into a device independent color space, such as XYZ color space, using the color profile of the scanner 300.

4) Obtain the absolute value of the difference of each color component in the converted color space.

Note that as in the case of performing evaluation using the color difference, it may not be necessary to convert the reference image data and the user image data into a device independent color space using the color profile of the scanner 300. In some embodiments, the absolute value of the color component value difference may be obtained directly in the device dependent color space of the scanner 300. Also, the statistical analysis methods and quality evaluation methods described above in connection with the evaluation method using the color difference may similarly be used in the evaluation method using the absolute value of the color component value difference.

Next, in step S305, the color reproduction characteristics estimation unit 304 estimates the inverse of the user color reproduction characteristics. That is, the user color reproduction characteristics estimation process described above with reference to FIG. 9 may be executed in step S305, for example.

Next, in step S306, the color conversion unit 305 evaluates the estimated color reproduction characteristics including the reference color reproduction characteristics and the inverse of the user color reproduction characteristics. If the estimated color reproduction characteristics are deemed to be acceptable (step S307, YES), the process proceeds to step S308. If the estimated color reproduction characteristics are not acceptable (step S307, NO), the process is ended.

Note that the determination of whether the color reproduction characteristics are acceptable may be regarded as a convergence test for determining whether it would be meaningful to perform color conversion based on the estimated color reproduction characteristics. Thus, step S307 may be omitted as is appropriate. Examples of cases where it would be meaningless to perform a color conversion may include the following:

a) Case where estimation accuracy of the estimated color reproduction characteristics is extremely low In such a case, color conversion is preferably not performed because color matching with the reference printed material may be impossible even if color conversion were performed.

b) Case where there is no substantial change between image data before conversion and image data after conversion In such a case, performing color conversion may be meaningless because no substantial changes occur as a result of the color conversion.

c) Case where extreme changes occur between image data before conversion and image data after conversion In such a case, color conversion is preferably not performed because the color conversion would result in significant color changes in the user printed material.

In determining the acceptability of the color reproduction characteristics, a determination as to whether a case falls under the above case a) may be made based on the difference between an actual measurement value and an estimation value. For example, with respect to the reference color reproduction characteristics, the difference between a value of the reference image data registered in the pixel value mapping data (actual measurement value) and an estimated value of the reference color reproduction characteristics (estimated value) may be used. The following are examples of measures for determining the extent of deviation of the estimation values from actual measurement values.

- Accumulated sum of the absolute values of the differences between the actual measurement values and the estimation values
- Accumulated sum of the squared values of the differences between the actual measurement value and the estimated values
- Maximum value of the absolute values of the differences between the actual measurement values and the estimation values
- Correlation coefficient between the actual measurement values and the estimation values Also, in determining the acceptability of the color reproduction characteristics, a determination as to whether a case falls under the above case b) or c) may be made based the extent of changes in pixel values resulting from color conversion. For example, with respect to the RGB color space, the difference in the R-component values of the image data before and after conversion, the difference in the G-component values of the image data before and after conversion, and the difference in the B-component values of the image data before and after conversion may be used. The following are examples of measures for determining the extent of changes in the pixel values before and after color conversion.

- Accumulated sum of the absolute values of the differences between the pixel values of the image data before and after conversion
- Accumulated sum of the squared values of the differences between the pixel values of the image data before and after conversion
- Maximum value of the absolute values of the differences between the pixel values of the image data before and after conversion The estimated color reproduction characteristics may be deemed to be acceptable when evaluation values obtained for the above measures fall within predetermined ranges, for example.

Next, in step S308, the color conversion unit 305 performs color conversion on the original image data. That is, the color conversion unit 305 applies color conversion to the original image data using the estimated color reproduction characteristics including the reference color reproduction characteristics and the inverse of the user color reproduction characteristics, and updates the original image data.

In the following, exemplary process steps of applying color conversion to the original image data using the reference color reproduction characteristics $S(P_1(x))$ and the inverse $P_2^{-1}(S^{-1}(x))$ of the user color reproduction characteristics $S(P_2(x))$ are described.

(1) Obtain the color "s" ($s=S(P_1(a))$) of the reference image data corresponding to the color "a" of the original image data based on the reference color reproduction characteristics.

(2) Obtain the color "b" ($b=P_2^{-1}(S^{-1}(s))$) of the original image data corresponding to the color "s" of the user image data based on the inverse of the user color reproduction characteristics. That is, obtain a set of colors (a, b) that satisfies the condition $S(P_1(a))=s=S(P_2(b))$.

(3) Convert the color "a" of the original image data to the color "b".

In this way, a sequence of steps for performing a color conversion process may be completed. Note that in the present embodiment, the color conversion process is repeated a predetermined number of times. Thus, after the number of times the color conversion process is repeated reaches the predetermined number of times (step S309, YES), the process may be ended. Note that although adequate color conversion may presumably be achieved by merely performing the above color conversion process once, higher color matching accuracy may be achieved by repeating the color conversion process multiple times.

In the case where the color conversion process is to be repeated (step S309, NO), the color-converted original image data is used as the input for the user printer 200. That is, the user printer 200 prints out the color-converted (updated) original image data in step S302, and the same process steps are performed thereafter. Note that the original image data used in subsequent loops correspond to the color-converted (updated) original image data obtained in the previous loop.

Note that although there are three process termination conditions in FIG. 11, the color conversion process does not necessarily have to include all of these termination conditions. In some embodiments, one or more of these process termination conditions may be omitted, although at least one of these process termination conditions is preferably included in the color conversion process.

In the present embodiment, the color space that is used when the scanner 300 scans an image (e.g., printed material) is used in subsequent steps. However, because such color space is device dependent, the device dependent color space is preferably converted into a device independent color space using the color profile of the scanner 300. Examples of device independent color spaces include the RGB color space and the XYZ color space. Further, the color space may preferably be converted to a uniform color space such as the L*a*b* color space.

Note that the reference image data and the user image data scanned by the scanner 300 have to be in the same color space. However, the original image data and the reference image data, or the original image data and the user image data do not necessarily have to be in the same color space. For example, the original image data may be in the CMYK color space, and the reference image data and the user image data may be in the RGB color space.

Second Embodiment

In the following, a second embodiment of the present invention is described. In the second embodiment, a display is used as the first image output device, a projector is used as the second image output device, and a digital camera is used as the image scanning unit. Note that because the first and second image output devices of the present embodiment may be handled by a user, color profiles of the above two image output devices may be obtained by displaying a color chart, for example. However, according to an aspect of the present embodiment, color matching may be performed without using such a color chart.

<System Configuration>

Figure 12:
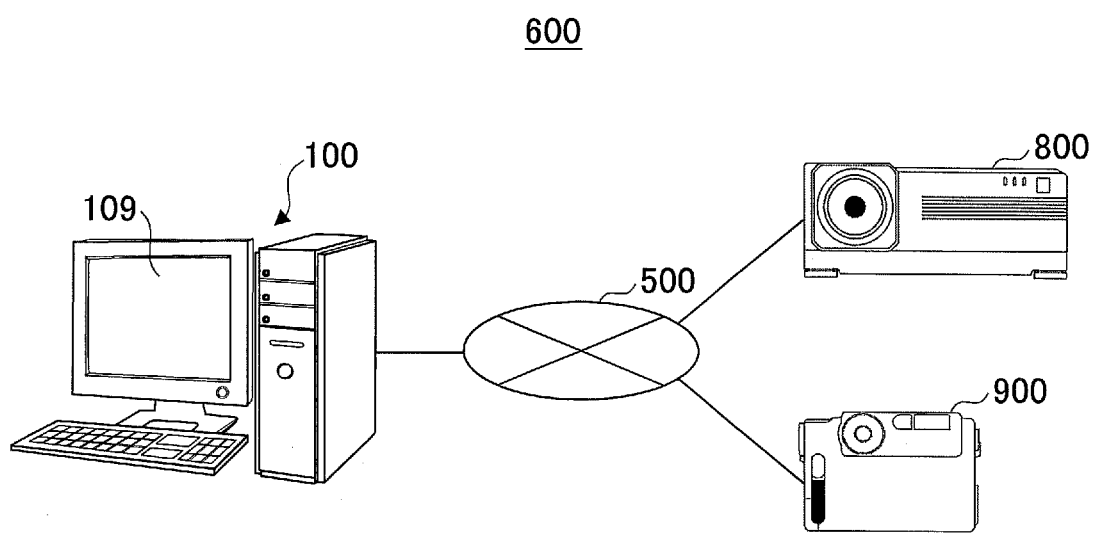
FIG. 12 illustrates an exemplary configuration of an image processing system according to a second embodiment of the present invention.

FIG. 12 illustrates an exemplary system configuration of an image processing system 600 according to the second embodiment. The image processing system 600 of FIG. 12 includes the computer 100 that includes a display 109, a projector 800, and a digital camera 900 that are interconnected by the network 500.

In the following, comparisons are made between features of the image processing system 600 according to the present embodiment and corresponding features of the image processing system 600 according to the first embodiment illustrated in FIG. 2.

a) The display 109 corresponds to the reference printer 400 b) A reference display screen of the display 109 corresponds to the reference printed material c) The projector 800 corresponds to the user printer 200 d) A user display screen projected by the projector 800 corresponds to the user printed material; and e) The digital camera 900 corresponds to the scanner 300.

Also, note that in the first embodiment, printers are used as the first and second image output devices, and as such, the L*a*b* color space is used as a uniform color space. On the other hand, in the second embodiment, the display 109 and the projector 800 are used as the first and second image output devices, and as such, the L*u*v* color space is used as a uniform color space. Note that the functional features of the image processing system 600 according to the present embodiment may be substantially identical to those of the first embodiment such that descriptions thereof are omitted.

<Process>

<<Color Conversion Process>>

Figure 13:
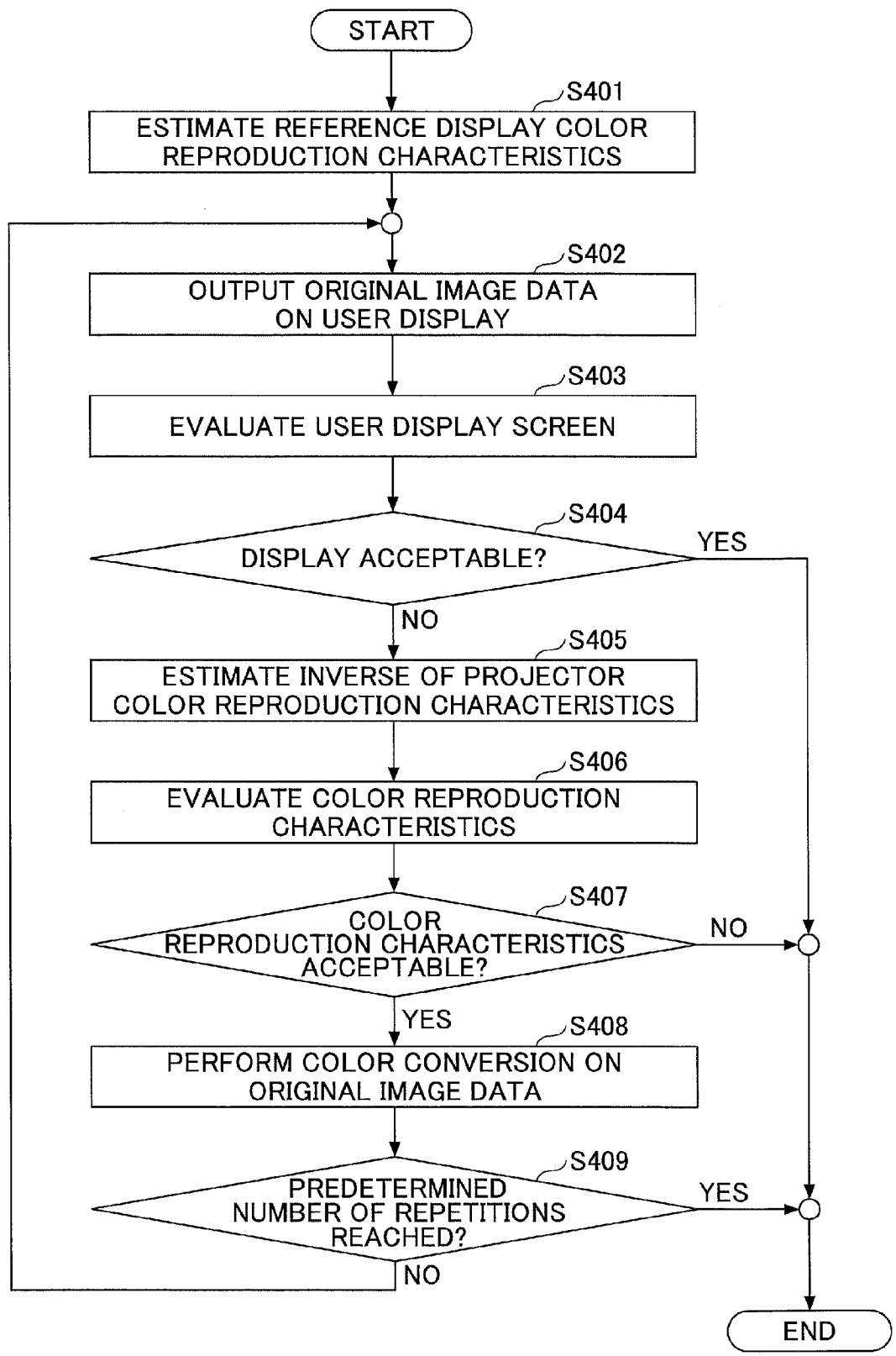
FIG. 13 is a flowchart illustrating an exemplary color conversion process according to the second embodiment.

FIG. 13 is a flowchart illustrating an exemplary color conversion process according to the second embodiment. Note that the process steps of FIG. 13 are substantially identical to those illustrated in FIG. 11 aside from the differences in the types of devices used as the image output device and the image scanning device. Accordingly, descriptions of the process steps of FIG. 13 that are substantially identical to the steps of FIG. 11 are simplified below.

In step S401, the color reproduction characteristics estimation unit 304 estimates the color reproduction characteristics of the display 109. That is, the color reproduction characteristics of the display 109 is estimated based on the reference display screen output by the display 109 and the original image data.

Next, in step S402, a user projects the original image data using the projector 800. By projecting the original image data using the projector 800, the user display screen may be obtained. The user then scans the user display screen using the digital camera 900.

Next, in step S403, the color conversion unit 305 evaluates the user display screen. That is, color conversion unit 305 compares the user display screen and the reference display screen to evaluate the quality of the user display screen. If the quality of the user display screen is deemed acceptable (step S404, YES), the process is ended. Otherwise (step S404, NO), the process proceeds to step S405.

Exemplary methods for evaluating the quality of the user display screen may include a method using a color difference with respect to the reference display screen, a method using a hue difference, and a method using the absolute value of the difference of each color component. Also, in some embodiments, a visual evaluation of the quality of the user display screen may be conducted. Note that the quality evaluation methods that may be used in the present embodiment may be substantially identical to those described above in connection with the first embodiment.

a) Evaluation Method Using Color Difference

A color difference is the distance between two colors in a L*a*b* color space or a L*u*v* color space. Because the present embodiment uses a display as an image output device, the L*u*v* color space is used in the following explanation.

The color difference $\Delta E^*_{uv}$ in the L*u*v* color space is defined by the following formula:

$$\Delta E^*_{uv} = \sqrt{(\Delta L^*)^2 + (\Delta u^*)^2 + (\Delta v^*)^2}$$

where ($\Delta L^*$, $\Delta u^*$, $\Delta v^*$) represent chromaticity differences between two colors in the L*u*v* color space.

In the following, process steps for obtaining the color difference between the reference display screen and the user display screen are described.

(1) Scan the reference display screen using the digital camera 900 and obtain the reference image data.

(2) Scan the user display screen using the same digital camera 900 and obtain the user image data.

(3) Convert the reference image data and the user image data into a device independent color space, such as XYZ color space, using a color profile of the digital camera 900.

(4) Convert the reference image data and the user image data converted into the device independent color space into the L*u*v* color space.

(5) Obtain the color difference of each pixel using the above formula.

Note that although the same digital camera 900 is used to scan the reference display screen and the user display screen in the above example, in other examples, two different digital cameras 900 may be used to scan the reference image data and the user image data under the condition that the data can be converted into a device independent color space using the color profile of digital camera 900.

In the case of using a single digital camera 900, it may not be necessary to convert the reference image data and the user image data into a device independent color space using the color profile of the digital camera 900. In the case of quantitatively evaluating the color difference, conversion into a device independent color space is required because absolute values need to be obtained. On the other hand, in the case of qualitatively evaluating the color difference, conversion into a device independent color space may be omitted as it is sufficient to obtain a relative tendency.

After the color difference of each pixel is obtained, the information may be analyzed statistically to evaluate the quality of the user display screen quantitatively. Examples of analysis methods that may be used include those using the average value, the maximum value, the distribution, and the dispersion of color differences.

For example, the determination of whether the quality of the user printed material is acceptable may be made based on the following criteria:

Whether the average value of color differences is within a predetermined range.

Whether the maximum value of color differences is within a predetermined range.

Whether the dispersion of color differences is within a predetermined range.

Note that when evaluating the quality of the user printed material, contours of the image data are preferably removed. This is because large color differences may be obtained at the contours for the following reasons:

It is difficult to align the positions of contours in a subsequent step.

The reproduction of contours may differ from printer to printer (particularly with respect to tint and sharpness).

Note that because the area of contours takes up a very small portion of the entire area of the display screen, the contours may have a limited impact on an overall visual evaluation of color reproduction characteristics. However, in a quantitative evaluation, large color differences in the contours, or outliers, may degrade the reliability of evaluation results. Therefore, the removal of contours may be desirable in order to produce evaluation results with higher reliability and accuracy, for example.

Examples of methods that may be used for detecting contours include binarization, and edge detection. A method using binarization may involve dividing the image data into black and white areas according to a predetermined threshold value to determine contours where a black area and a white area are adjacently located, for example. A method using edge detection may involve generating edge image data using the Sobel method, for example, then binarizing pixels using a predetermined threshold value, and determining contours where pixels have a pixel value above the threshold value, for example.

Note that there are alternative methods for addressing the above problem without removing contours. For example, a method may be used that involves smoothing the image data including contours in order to reduce the color difference at the contours. Smoothing may be implemented using conventional techniques such as using an average filter or a low-pass filter.

b) Evaluation Method Using Hue Difference

A hue difference $\Delta H^*_{uv}$ in the L*u*v* color space is defined by the following formula:

$$\Delta H^*_{uv} = \sqrt{(\Delta E^*_{uv})^2 - (\Delta L^*)^2 - (\Delta C^*_{uv})^2}$$

where $\Delta E^*_{uv}$ represents the color difference, $(\Delta L^*, \Delta u^*, \Delta v^*)$ represent chromaticity differences between two colors, and $\Delta C^*_{uv}$ represents the chroma difference. Chroma, $C^*_{uv}$, is defined by the following formula:

$$C^*_{uv} = \sqrt{(u^*)^2 + (v^*)^2}$$

Note that process steps for obtaining the hue difference between the reference display screen and the user display screen may be almost the same as the above process steps for obtaining the color difference, except that the hue difference is calculated rather than the color difference. Also, statistical analysis methods and quality evaluation methods as described above may similarly be used in the evaluation process using the hue difference.

c) Evaluation Method Using the Absolute Value of the Difference of Each Color Component This evaluation method involves obtaining the absolute value of the difference of each color component between the reference display screen and the user display screen in a predetermined color space and using the obtained absolute values for evaluating the user display screen. For example, in the case of applying this evaluation method in the RGB color space, the absolute value of a difference in the R-component values, the absolute value of a difference in the G-component values, and the absolute value of a difference in the B-component values of the user image data and the reference image data may be used.

The following steps illustrate an example of obtaining the absolute value of the difference of each color component between the reference display screen and the user display.

1) Scan the reference display screen using the digital camera 900 and obtain the reference image data.

2) Scan the user display screen using the same digital camera 900 and obtain the user image data.

3) Convert the reference image data and the user image data into a device independent color space, such as XYZ color space, using the color profile of the digital camera 900.

4) Obtain the absolute value of the difference of each color component in the converted color space.

Note that as in the case of performing evaluation using the color difference, it may not be necessary to convert the reference image data and the user image data into a device independent color space using the color profile of the digital camera 900. In some embodiments, the absolute value of the color component value difference may be obtained directly in the device dependent color space of the digital camera 900. Also, the statistical analysis methods and quality evaluation methods described above in connection with the evaluation method using the color difference may similarly be used in the evaluation method using the absolute value of the color component value difference.

Next, in step S405, the color reproduction characteristics estimation unit 304 estimates the inverse of the user color reproduction characteristics. That is, the inverse of the color reproduction characteristics of the projector 800 is estimated in step S405.

Next, in step S406, the color conversion unit 305 evaluates the estimated color reproduction characteristics including the reference color reproduction characteristics and the inverse of the user color reproduction characteristics. If the estimated color reproduction characteristics are deemed to be acceptable (step S407, YES), the process proceeds to step S408. If the estimated color reproduction characteristics are not acceptable (step S407, NO), the process is ended.

Note that the determination of whether the color reproduction characteristics are acceptable may be regarded as a convergence test for determining whether it would be meaningful to perform color conversion based on the estimated color reproduction characteristics. Thus, step S407 may be omitted as is appropriate. Examples of cases where it would be meaningless to perform a color conversion may include the following:

a) Case where estimation accuracy of the estimated color reproduction characteristics is extremely low In such a case, color conversion is preferably not performed because color matching with the reference display screen may be impossible even if color conversion were performed.

b) Case where there is no substantial change between image data before conversion and image data after conversion In such a case, performing color conversion may be meaningless because no substantial changes occur as a result of the color conversion.

c) Case where extreme changes occur between image data before conversion and image data after conversion In such a case, color conversion is preferably not performed because the color conversion would result in significant color changes in the user display screen.

In determining the acceptability of the color reproduction characteristics, a determination as to whether a case falls under the above case a) may be made based on the difference between an actual measurement value and an estimation value. For example, with respect to the reference color reproduction characteristics, the difference between a value of the reference image data registered in the pixel value mapping data (actual measurement value) and an estimated value of the reference color reproduction characteristics (estimated value) may be used. The following are examples of measures for determining the extent of deviation of the estimation values from actual measurement values.

Accumulated sum of the absolute values of the differences between the actual measurement values and the estimation values Accumulated sum of the squared values of the differences between the actual measurement value and the estimated values Maximum value of the absolute values of the differences between the actual measurement values and the estimation values Correlation coefficient between the actual measurement values and the estimation values Also, in determining the acceptability of the color reproduction characteristics, a determination as to whether a case falls under the above case b) or c) may be made based the extent of changes in pixel values resulting from color conversion. For example, with respect to the RGB color space, the difference in the R-component values of the image data before and after conversion, the difference in the G-component values of the image data before and after conversion, and the difference in the B-component values of the image data before and after conversion may be used. The following are examples of measures for determining the extent of changes in the pixel values before and after color conversion.

Accumulated sum of the absolute values of the differences between the pixel values of the image data before and after conversion Accumulated sum of the squared values of the differences between the pixel values of the image data before and after conversion Maximum value of the absolute values of the differences between the pixel values of the image data before and after conversion The estimated color reproduction characteristics may be deemed to be acceptable when evaluation values obtained for the above measures fall within predetermined ranges, for example.

Next, in step S408, the color conversion unit 305 performs color conversion on the original image data. That is, the color conversion unit 305 applies color conversion to the original image data using the estimated color reproduction characteristics including the reference color reproduction characteristics and the inverse of the user color reproduction characteristics, and updates the original image data.

In the following, exemplary process steps of applying color conversion to the original image data using the reference color reproduction characteristics $S(P_1(x))$ and the inverse $P_2^{-1}(S^{-1}(x))$ of the user color reproduction characteristics $S(P_2(x))$ are described.

(1) Obtain the color "s" ($s=S(P_1(a))$) of the reference image data corresponding to the color "a" of the original image data based on the reference color reproduction characteristics.

(2) Obtain the color "b" ($b=P_2^{-1}(S^{-1}(s))$) of the original image data corresponding to the color "s" of the user image data based on the inverse of the user color reproduction characteristics. That is, obtain a set of colors (a, b) that satisfies the condition $S(P_1(a))=s=S(P_2(b))$.

(3) Convert the color "a" of the original image data to the color "b".

In this way, a sequence of steps for performing a color conversion process may be completed. Note that in the present embodiment, the color conversion process is repeated a predetermined number of times. Thus, after the number of times the color conversion process is repeated reaches the predetermined number of times (step S409, YES), the process may be ended. Note that although adequate color conversion may presumably be achieved by merely performing the above color conversion process once, higher color matching accuracy may be achieved by repeating the color conversion process multiple times.

In the case where the color conversion process is to be repeated (step S409, NO), the color-converted original image data is used as the input for the projector 800. That is, the projector 800 projects the color-converted (updated) original image data in step S402, and the same process steps are performed thereafter. Note that the original image data used in subsequent loops correspond to the color-converted (updated) original image data obtained in a previous loop.

Note that although there are three process termination conditions in FIG. 13, the color conversion process does not necessarily have to include all of these termination conditions. In some embodiments, one or more of these process termination conditions may be omitted, although at least one of these process termination conditions is preferably included in the color conversion process.

In the present embodiment, the color space that is used when the digital camera 900 scans an image is used in subsequent steps. However, because such color space is device dependent, the device dependent color space is preferably converted into a device independent color space using the color profile of the scanner 300. Examples of device independent color spaces include the RGB color space and the XYZ color space. Further, the color space may preferably be converted to a uniform color space such as the L*u*v* color space.

Note that the reference image data and the user image data scanned by the digital camera 900 have to be in the same color space. However, the original image data and the reference image data, or the original image data and the user image data do not necessarily have to be in the same color space. For example, the original image data may be in the RGB color space, and the reference image data and the user image data may be in the L*u*v* color space.

Third Embodiment

According to a third embodiment of the present invention, upon repeating the color conversion process as described above in connection with the first embodiment, instead of having the user printer 200 print out the color-converted (updated) original image data as the user printed material and having the scanner 300 scan the user printed material to generate user image data each time the color conversion process is to be repeated, the user image data is generated using estimated user color reproduction characteristics and the color-converted original image data. In this way, time and resources (e.g. paper) required for printing and scanning upon repeating the color conversion process may be reduced.

Note that the system configuration of the image processing system 600 according to the third embodiment may be identical to that of the first embodiment. Accordingly, descriptions of the system configuration are omitted.

<Functional Configuration>

Figure 14:
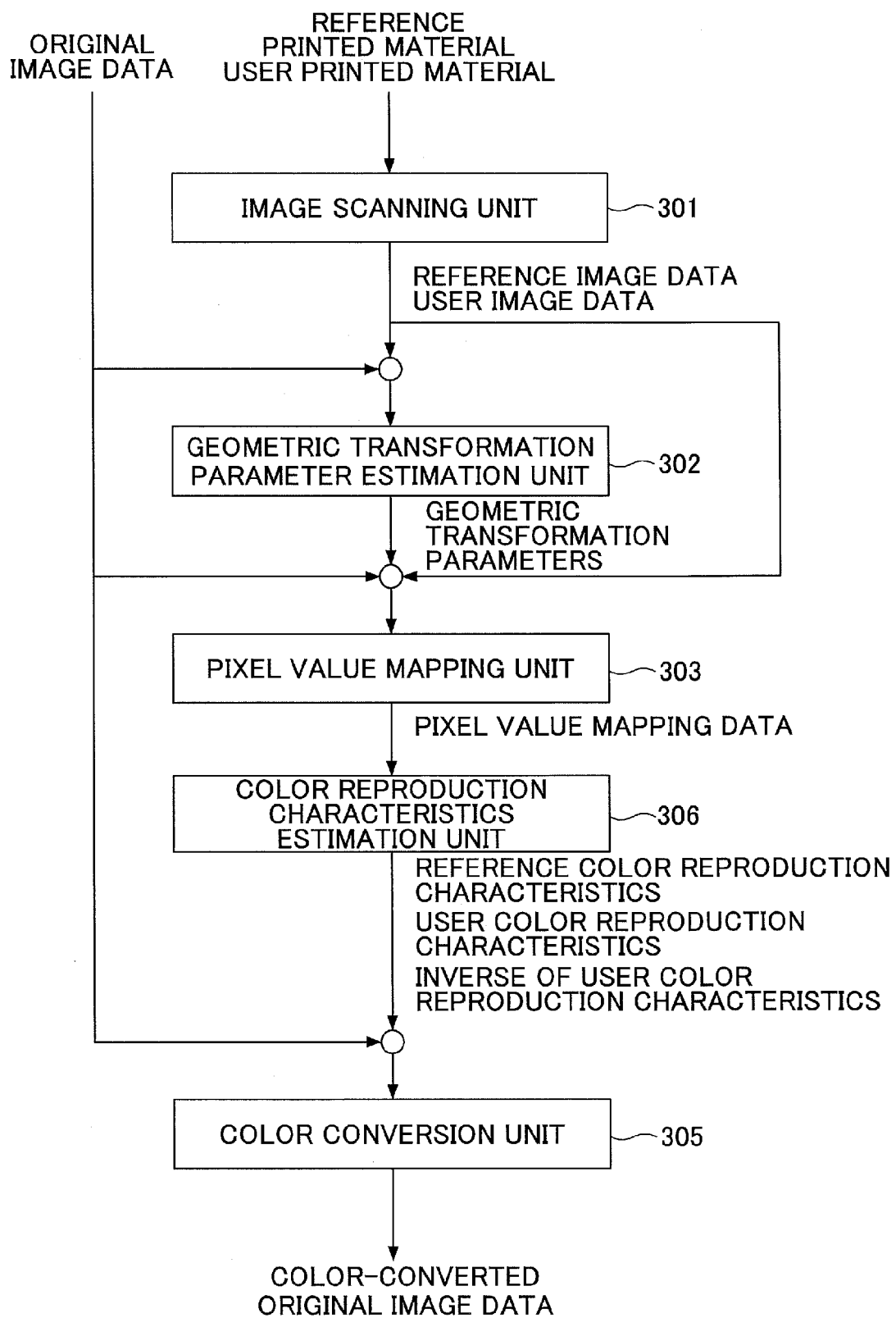
FIG. 14 is a block diagram illustrating an exemplary functional configuration of an image processing system or a multifunctional peripheral according to a third embodiment of the present invention.

FIG. 14 is a block diagram illustrating an exemplary functional configuration of the image processing system 600 or the MFP 700 according to the third embodiment. In comparing FIG. 14 with FIG. 6, it can be appreciated that the color reproduction characteristics estimation unit 306 of FIG. 14 varies from the color reproduction characteristics estimation unit 306 of FIG. 6. Note that in the following, descriptions of functional features that are identical to those of the first embodiment are omitted. That is, the following descriptions relate to the color reproduction characteristics estimation unit 306 according to the present embodiment.

The color reproduction characteristics estimation unit 306 of the present embodiment uses the pixel value mapping data to estimate the reference color reproduction characteristics, the user color reproduction characteristics, and the inverse of the user color reproduction characteristics. That is, as compared with FIG. 6, the present embodiment includes a process of estimating the user color reproduction characteristics in addition to estimating the inverse of the user color reproduction characteristics.

<Process>

<<User Color Reproduction Characteristics Estimation Process>>

Figure 15:
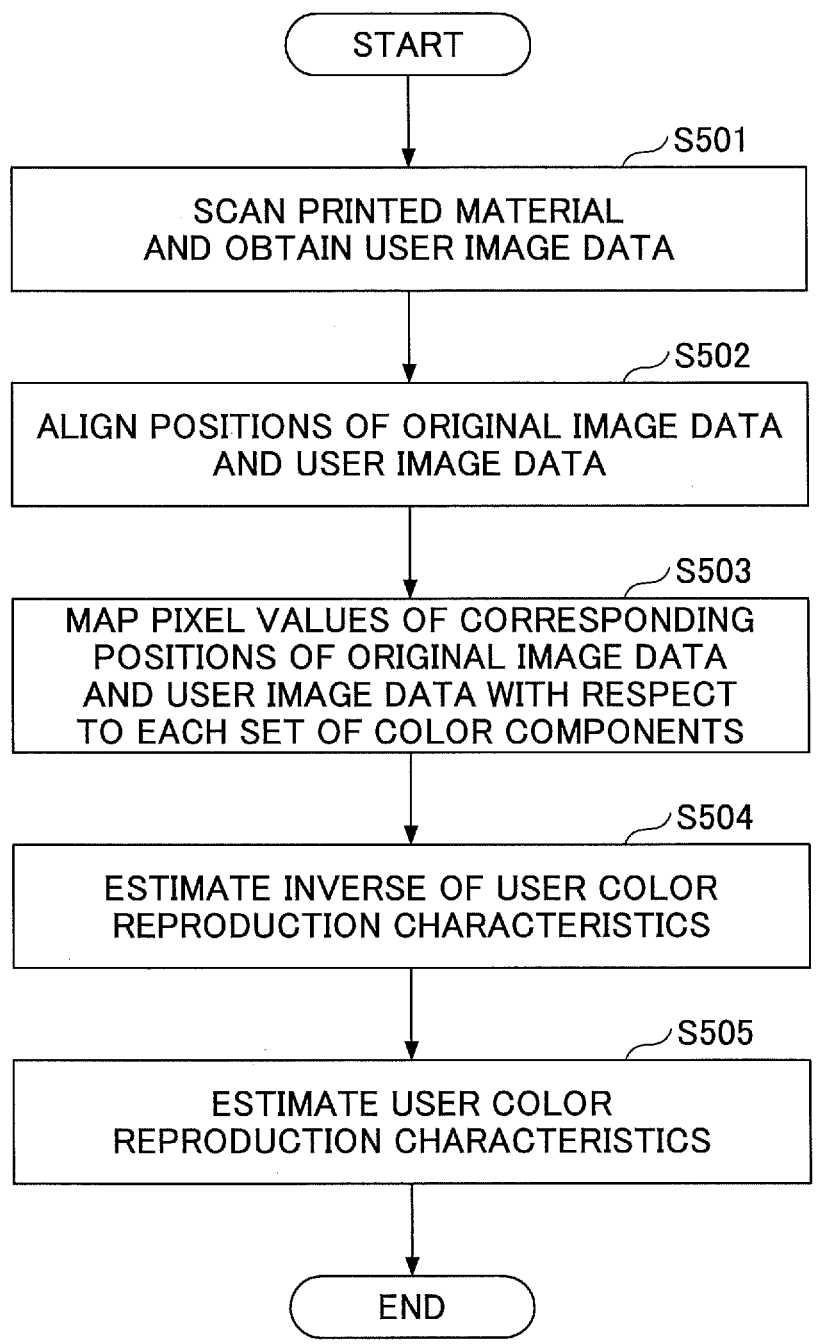
FIG. 15 is a flowchart illustrating an exemplary process of estimating user color reproduction characteristics according to the third embodiment.

FIG. 15 is a flowchart illustrating an exemplary process of estimating the user color reproduction characteristics according to the third embodiment. In comparing the process illustrated in FIG. 15 with the process illustrated in FIG. 9, it can be appreciated that step S505 for estimating the user color reproduction characteristics is added to the process of FIG. 15. Note that steps S501-S504 of FIG. 15 may be substantially identical to steps S201-S204 of FIG. 9, and as such, descriptions thereof are omitted.

In step S505, the color reproduction characteristics estimation unit 306 estimates the user color reproduction characteristics. That is, the color reproduction characteristics estimation unit 306 uses the pixel value mapping data generated in step S503 to determine a correspondence between a pixel value of the original image data and a pixel value of the user image data. In the following descriptions, as with the description of step S203 of FIG. 9, it is assumed that both the original image data and the user image data correspond to RGB image data having a 256-level value for each color component.

Estimating the user color reproduction characteristics refers to estimating color reproduction characteristics representing a correspondence between the original image data color component values ($R_{in}$, $G_{in}$, $B_{in}$) and the user image data color component values ($R_{out2}$, $G_{out2}$, $B_{out2}$) upon converting the original image data color component values ($R_{in}$, $G_{in}$, $B_{in}$) into the user image data color component values ($R_{out2}$, $G_{out2}$, $B_{out2}$) using the pixel value mapping data.

For example, the user color reproduction characteristics may be estimated using the following polynomial approximation formula.

$$\hat{Y} = M_S f(X) \cong Y$$

Note that in the above formula, X represents the original image data color component values $[R_{in}, G_{in}, B_{in}]^t$ and Y represents the user image data color component values $[R_{out2}, G_{out2}, B_{out2}]^t$, $M_S$ represents a correction coefficient matrix, and f represents a correction function. For example, the correction function f(X) may be expressed as follows:

$$f(X) = [R_{in}, G_{in}, B_{in}, R_{in}^2, G_{in}^2, B_{in}^2, R_{in}G_{in}, G_{in}B_{in}, B_{in}R_{in}, R_{in}^3, G_{in}^3, B_{in}^3, R_{in}^2G_{in}, G_{in}^2B_{in}, B_{in}^2R_{in}, \ldots, 1]^t$$

Note that when there is a linear distortion between the original image data and the user image data, the color reproduction characteristics may be estimated by applying a linear conversion manipulating the 3×3 correction coefficient matrix $M_S$ to the three terms of the correction function f(X)= $[R_{in}, G_{in}, B_{in}]^t$, for example. However, when there is a more complicated non-linear distortion between the original image data and the user image data, high accuracy color reproduction characteristics estimation may have to be performed using a higher order function, for example.

The correction coefficient $M_S$ may be obtained, for example, by the least squares method. Using a number N of color component values X(n) (where n=1~N) of the original image data corresponding to the color component values Y(n) (where n=1~N) of the reference image data stored in the pixel value mapping data, and using the minimum mean square error of the mean square error $E[e^2]$ given by the equation $$E[e^2] = \frac{1}{N}\left[\sum_{n=1}^{N} \|Y(n) - M_S f(X(n))\|^2\right]$$

the correction coefficient $M_S$ may be obtained by the following formula:

$$M_S = [Y_N f^t(X_N)][f(X_N)f^t(X_N)]^{-1}$$

Note that in the above formula, $Y_N$ and $X_N$ represent the pixel value mapping data matrices of N pixels. That is, $Y_N$ represents a color component value matrix of the user image data, and $X_N$ represents a color component value matrix of the original image data as indicated below.

$$Y_N = \begin{bmatrix} R_{out2}(1), & R_{out2}(2), & \ldots, & R_{out2}(n) \\ G_{out2}(1), & G_{out2}(2), & \ldots, & G_{out2}(n) \\ B_{out2}(1), & B_{out2}(2), & \ldots, & B_{out2}(n) \end{bmatrix}$$

$$X_N = \begin{bmatrix} R_{in}(1), & R_{in}(2), & \ldots, & R_{in}(n) \\ G_{in}(1), & G_{in}(2), & \ldots, & G_{in}(n) \\ B_{in}(1), & B_{in}(2), & \ldots, & B_{in}(n) \end{bmatrix}$$

Note that $R_{out2}(n)$ represents the R component value of the $n^{th}$ user image data pixel registered in the pixel value mapping data, and $R_{in}(n)$ represents the R component value of the $n^{th}$ original image data pixel registered in the pixel value mapping data (similarly, $G_{out2}(n)$, $B_{out2}(n)$, $G_{in}(n)$, and $B_{in}(n)$ represent corresponding color component values of the $n^{th}$ pixel of the user image data and the original image data).

Also, note that $f(X_N)$ represents a functional argument matrix of the color component values of the original image data. For example, in a case where the matrix corresponds to a quadratic function, $f(X_N)$ may be represented by a 10×N matrix as follows:

$$f(X_N) = \begin{bmatrix} R_{in}(1), & R_{in}(2), & \ldots, & R_{in}(N), \\ G_{in}(1), & G_{in}(2), & \ldots, & G_{in}(N), \\ B_{in}(1), & B_{in}(2), & \ldots, & B_{in}(N), \\ R_{in}(1)^2, & R_{in}(2)^2, & \ldots, & R_{in}(N)^2, \\ G_{in}(1)^2, & G_{in}(2)^2, & \ldots, & G_{in}(N)^2, \\ B_{in}(1)^2, & B_{in}(2)^2, & \ldots, & B_{in}(N)^2, \\ R_{in}(1)G_{in}(1), & R_{in}(2)G_{in}(2), & \ldots, & R_{in}(N)G_{in}(N), \\ G_{in}(1)B_{in}(1), & G_{in}(2)B_{in}(2), & \ldots, & G_{in}(N)B_{in}(N), \\ B_{in}(1)R_{in}(1), & B_{in}(2)R_{in}(2), & \ldots, & B_{in}(N)R_{in}(N), \\ 1, & 1, & \ldots, & 1 \end{bmatrix}$$

Note that the present invention is not limited to using the functional argument matrix as described above to estimate the user color reproduction characteristics as long as multidimensional data based on a plurality of color components is used. Also, note that although polynomial approximation is described above as an exemplary method used for estimating the user color reproduction characteristics, the present invention is not limited to such an example. In other examples, the pixel value mapping data may be used as training data for a neural network to estimate the user color reproduction characteristics. Also, in a case where a correspondence between pixel values with respect to each of the coordinates of the original image data is recorded in the pixel value mapping data generated in step S503, the generated pixel value mapping data may be directly used as the user color reproduction characteristics.

<<Color Conversion Process>>

Figure 16:
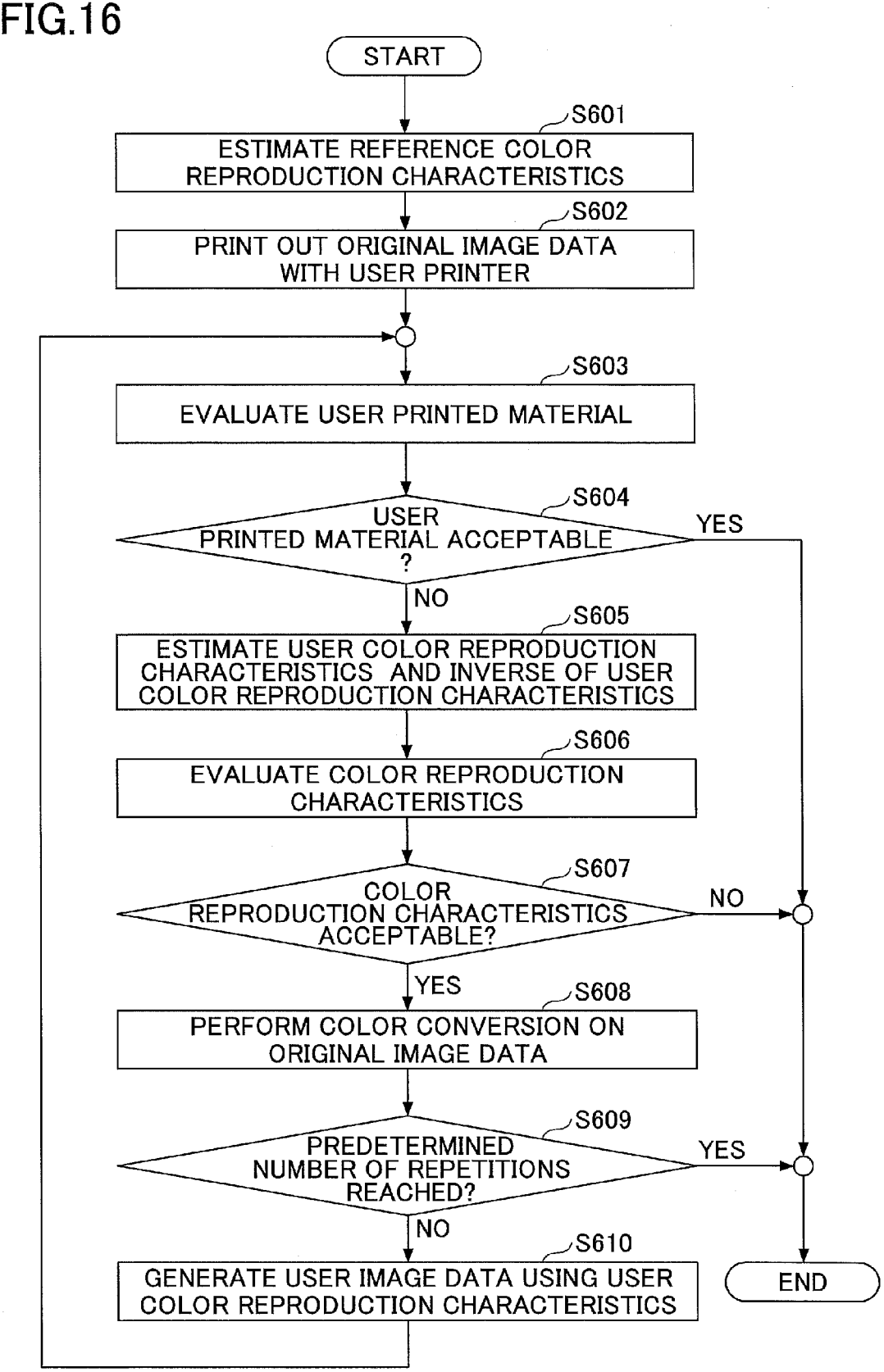
FIG. 16 is a flowchart illustrating an exemplary color conversion process according to the third embodiment.

FIG. 16 is a flowchart illustrating an exemplary color conversion process according to the third embodiment. In comparing FIG. 16 with FIG. 11, it can be appreciated that the color conversion process of FIG. 16 varies from the color conversion process of FIG. 11 in that it includes step S605 for estimating the user color reproduction characteristics and the inverse of the user color reproduction characteristics. The color conversion process of FIG. 16 also includes step S610 for generating user image data to be used upon repeating the color conversion process. Note that steps S601-S604 and steps S606-S609 of FIG. 16 may be substantially identical to steps S301-S304 and steps S306-S309 of FIG. 11, respectively. Accordingly, descriptions of these steps are omitted.

In step S605, the color reproduction characteristics estimation unit 306 estimates the user color reproduction characteristics and the inverse of the user color reproduction characteristics based on the original image data and the user image data. That is, the user color reproduction characteristics estimation process as described above with reference to FIG. 15 may be performed in step S605, for example.

In step S610, the color conversion unit 305 generates the user image data using the estimated user color reproduction characteristics. That is, the color conversion unit 305 may generate the user image data using the color-converted original image data obtained in step S608 and the user color reproduction characteristics estimated in step S605.

User color reproduction characteristics represent a correspondence between a pixel value of the original image data and a pixel value of the user image data. In other words, the user color reproduction characteristics may be regarded as a representing a color conversion of a set of color component values of the original image data into a set of color component values of the user image data.

In the following, process steps for generating the user image data using the estimated user color reproduction characteristics $S(P_2(x))$ are described.

1) Obtain the color "s" ($s=S(P_2(a))$) of the user image data corresponding to the color "a" of the color-converted original image data based on the user color reproduction characteristics.

2) Convert the color "a" of the original image data to the color "s".

After the process of step S610 is completed, the generated user image data is evaluated in step S603, and the subsequent process steps S604-S609 may be repeated. Note that the original image data used in subsequent loops correspond to color-converted original image data obtained in a previous loop.

Note that although there are three process termination conditions in the process illustrated in FIG. 16, the color conversion process does not necessarily have to include all of these process termination conditions. In some embodiments, one or more of the above process termination conditions may be omitted although at least one of the above process termination conditions are preferably included in the color conversion process.

In the present embodiment, the color space that is used when the scanner 300 scans an image is used in subsequent steps. However, because such color space is device dependent, the device dependent color space is preferably converted into a device independent color space using the color profile of the scanner 300. Examples of device independent color spaces include the RGB color space and the XYZ color space. Further, the color space may preferably be converted to a uniform color space such as the L*a*b* color space.

Note that the reference image data and the user image data scanned by the scanner 300 have to be in the same color space. However, the original image data and the reference image data, or the original image data and the user image data do not necessarily have to be in the same color space. For example, the original image data may be in the CMYK color space, and the reference image data and the user image data may be in the RGB color space.

According to an aspect of the present embodiment, when repeating the color conversion process, the user image data may be generated without having the user printer 200 print out the color-converted original image data and having the scanner 300 scan the scan the newly printed material. In this way, time and resources (e.g. paper) required for printing and scanning may be reduced, for example.

Fourth Embodiment

In the first through third embodiments described above, processes are uniformly performed with respect to the entire regions of the color space of the original image data upon matching colors of image output devices. In such a case, a desired level of color matching accuracy may not be achieved when the color reproduction characteristics of the image output devices are not uniform across the entire regions of the color space (i.e., when the color reproduction characteristics vary depending on the regions of the color space).

In the present embodiment, the color space of the original image data is subdivided into a plurality of partial color spaces, and color reproduction characteristics of image output devices are estimated with respect to each of the subdivided partial color spaces. In this way, stable and accurate color matching may be performed even in a case where color reproduction characteristics of the image output devices are not uniform across the entire regions of the color space, for example.

Note that the system configuration and the hardware configuration of an image processing system or an MFP according to the fourth embodiment may be identical to those of the first embodiment. Accordingly, descriptions thereof are omitted.

<Functional Configuration>

Figure 17:
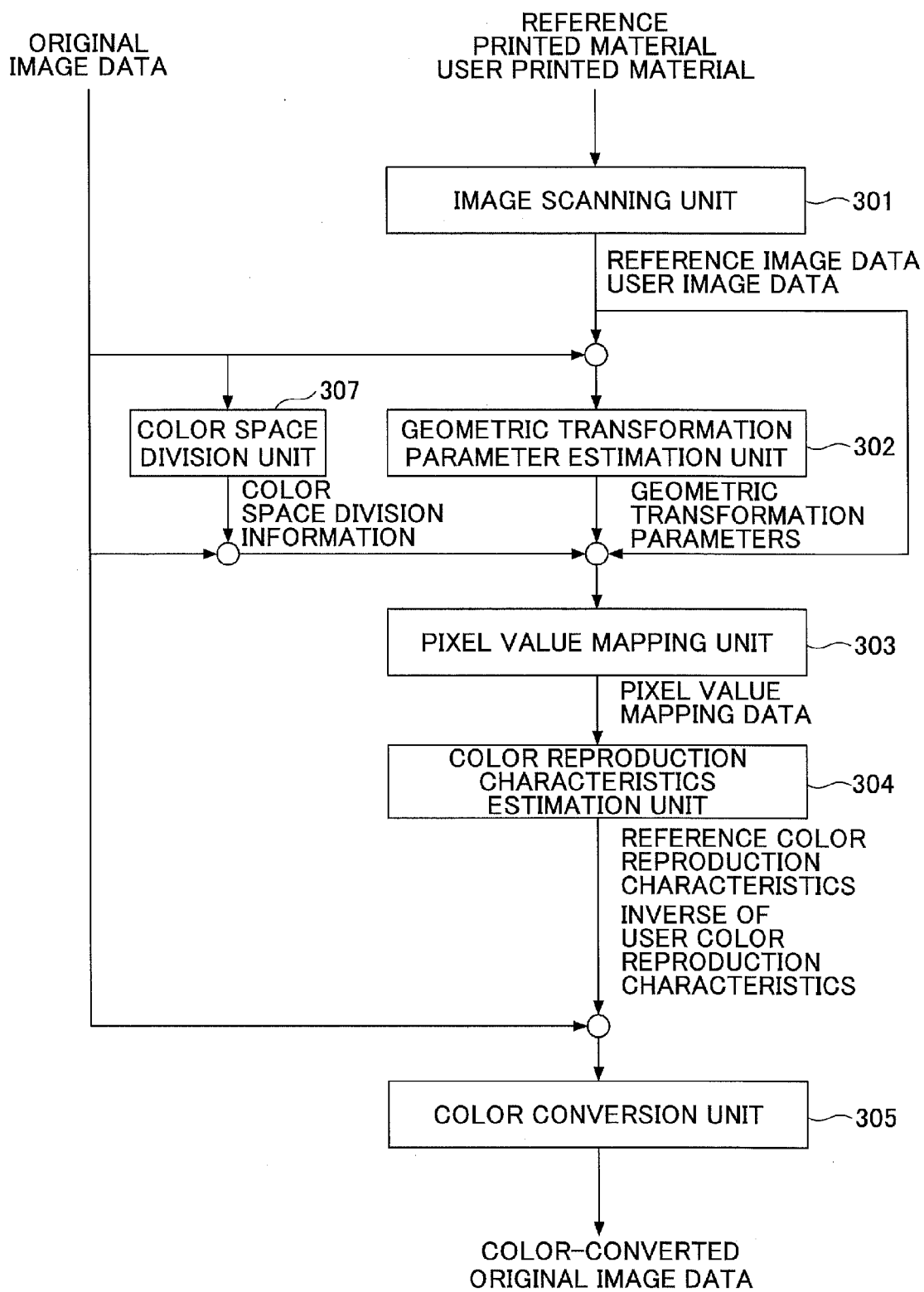
FIG. 17 is a block diagram illustrating an exemplary functional configuration of an image processing system or a multifunctional peripheral according to a fourth embodiment of the present invention.

FIG. 17 illustrates an exemplary functional configuration of the image processing system or the MFP according to the fourth embodiment. In comparing FIG. 17 with FIG. 6, it can be appreciated that the image processing system or MFP according to the present embodiment includes a color space division unit 307. Note that in the following, descriptions of functional features of the present embodiment that are substantially identical to those of the first embodiment are omitted. That is, the following descriptions relate to the color space division unit 307 of the present embodiment.

The color space division unit 307 subdivides the color space of the original image data into predetermined partial color spaces. Note that the results of subdividing the color space of the original image data are conveyed to the pixel value mapping unit 303 as color space division information.

<Process>

<<Reference Color Reproduction Characteristics Estimation Process>>

Figure 18:
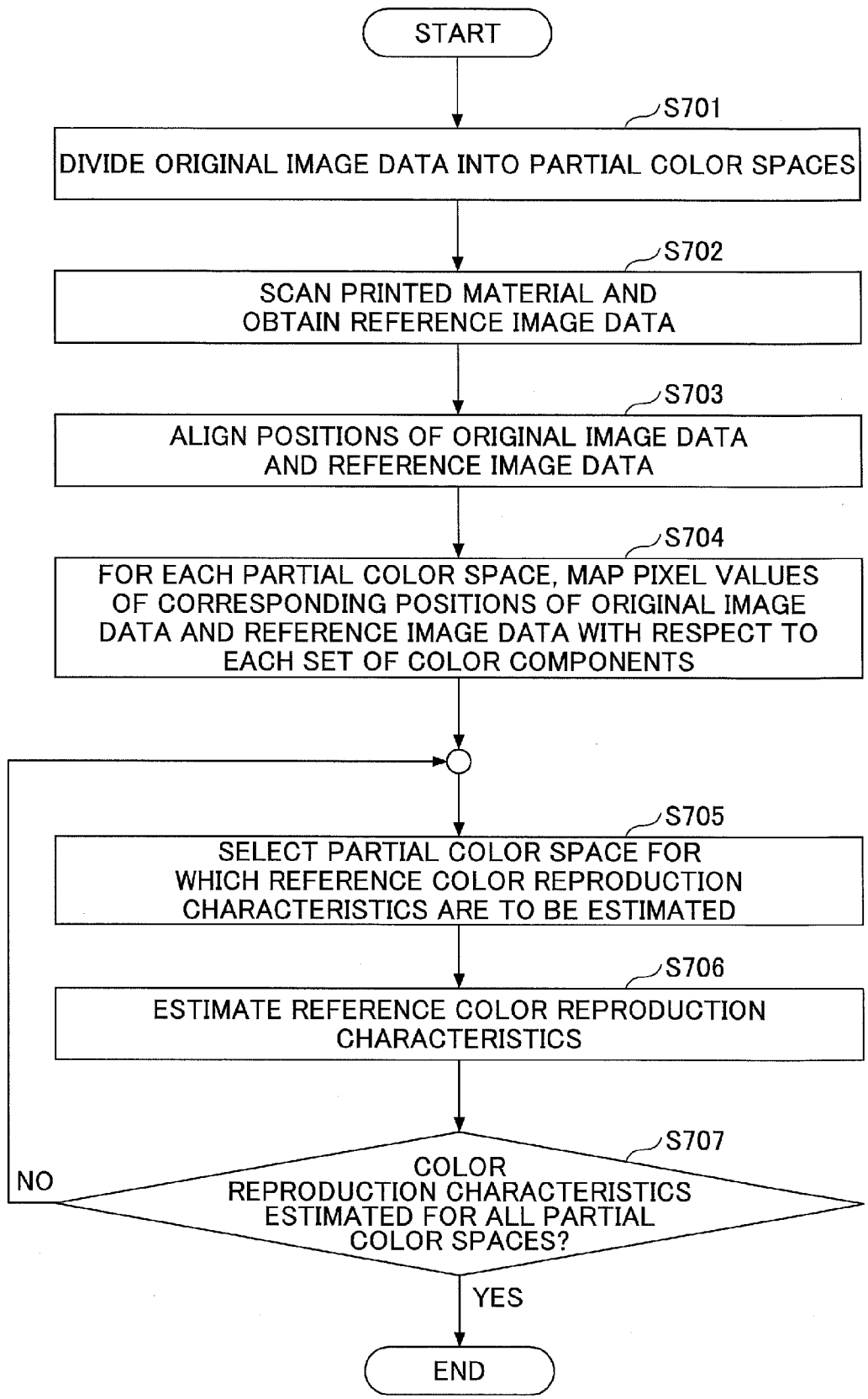
FIG. 18 is a flowchart illustrating an exemplary process of estimating reference color reproduction characteristics according to the fourth embodiment.

FIG. 18 is a flowchart illustrating an exemplary process for estimating the reference color reproduction characteristics according to the present embodiment. FIG. 18 illustrates a process starting from when the color space division unit 307 subdivides the color space of the original image data into partial color spaces until the color reproduction characteristics estimation unit 304 estimates reference color reproduction characteristics of all the partial color spaces.

In step S701, the color space division unit 307 subdivides the color space of the original image data into partial color spaces.

The color space division unit 307 subdivides the color space of the original image data into partial color spaces according to a predetermined standard. The following are examples of standards that may be used to divide the color space. Note that it is assumed in the following examples that the original image data corresponds to RGB image data having a 256-level value for each color component.

a) Equal Division

Figure 19:
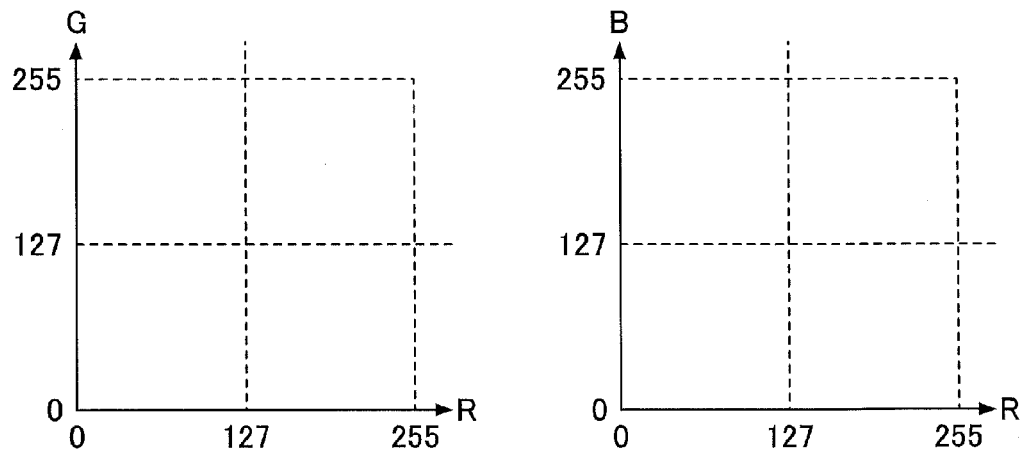
FIG. 19 illustrates an example of dividing a color space into equal spaces.

One division method that may be used in the present embodiment may involve dividing the color space of the original image data into partial color spaces having the same volume by dividing the axes of the color space of the original image data at equal intervals, or equally dividing the color space of the original image data into predetermined division units. FIG. 19 illustrates an example in which the R-axis, the G-axis, and the B-axis of the color space is equally divided into two. Such a division method is relatively simple and is generally used to divide a color space.

b) Unequal Division

Figure 20:
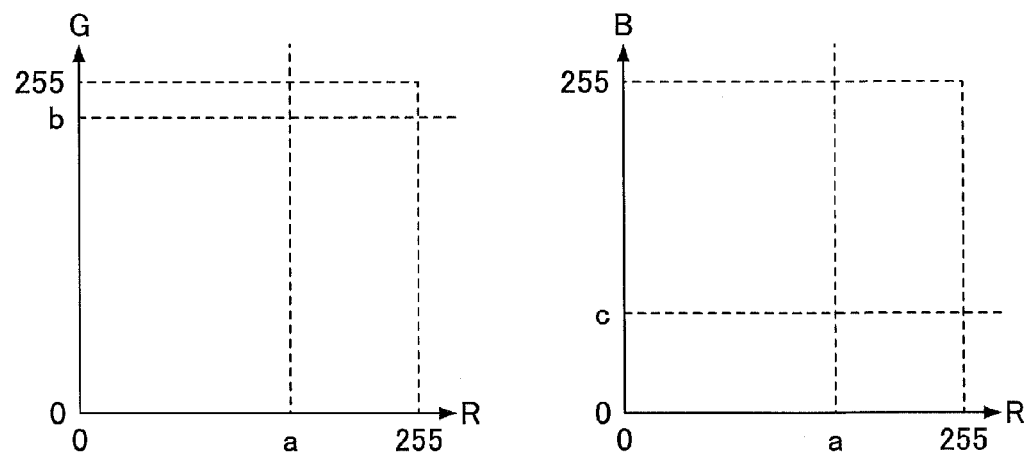
FIG. 20 illustrates an example of dividing a color space into unequal spaces.

Another division method that may be used in the present embodiment may involve adaptably determining a division width based on the number of pixels at each level of each axis of the color space of the original image data such that a predetermined number or a predetermined proportion of pixels may be included each subdivided partial color space, for example. FIG. 20 illustrates an example in which the R-axis, the G-axis, and the B-axis of the color space is unequally divided into two. Examples of methods for unequally dividing the color space may include a method using cumulative frequency of pixels at various levels of each axis, and a method using a frequency distribution of pixels at various levels of each axis.

b-1) Method Using Cumulative Frequency of Pixels at Various Levels of Each Axis

Figure 21:
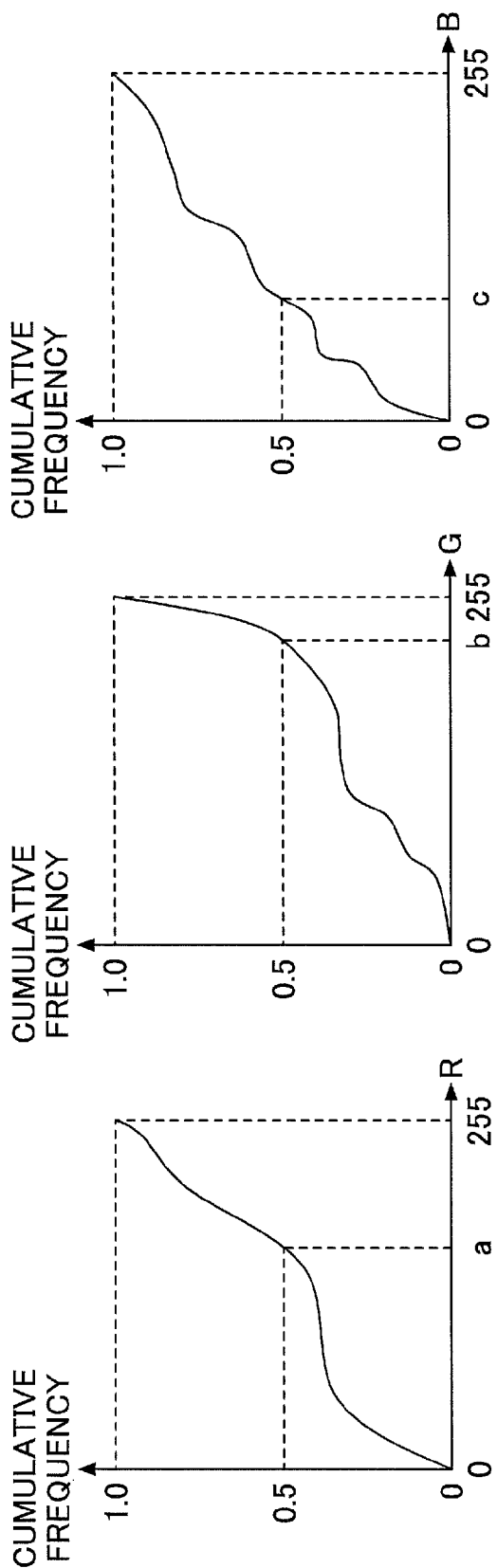
FIG. 21 illustrates an example of dividing a color space using the cumulative frequency of pixels.
Figure 22:
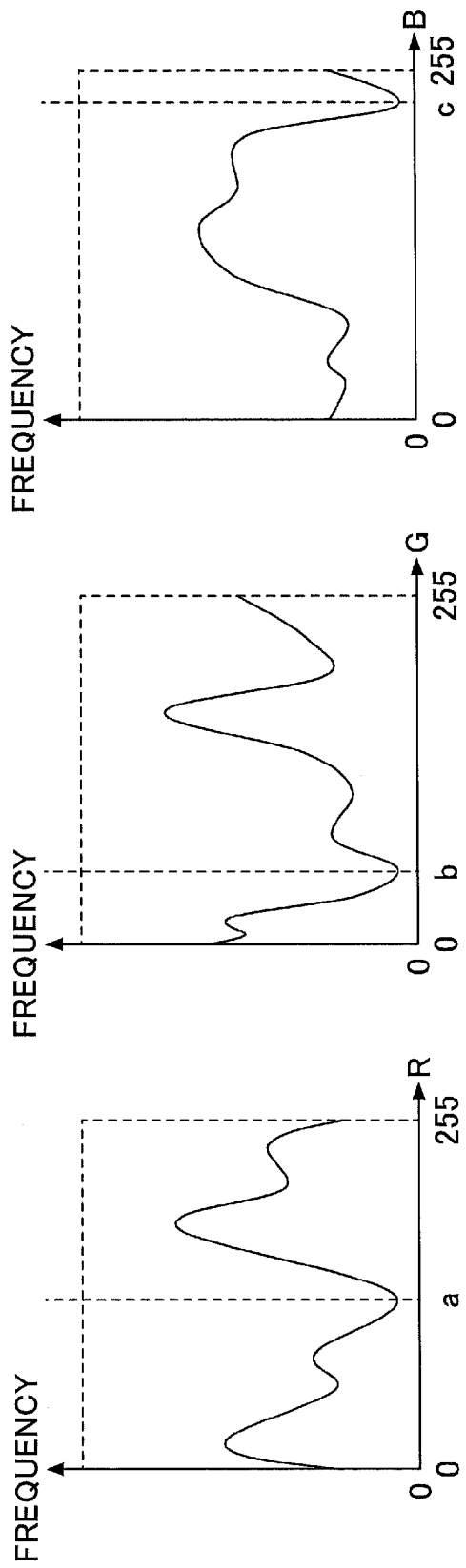
FIG. 22 illustrates an example of dividing a color space using the frequency distribution of pixels.

This method involves equally partitioning the cumulative frequency of pixels at various levels of each axis and dividing the axis at a level corresponding to a partitioning position of the cumulative frequency. FIG. 21 illustrates an example in which the R-axis, the G-axis, and the B-axis, each having a level range from 0 to 255 (256 levels), are unequally divided into two. When the maximum value of the cumulative frequency of the pixels represented by the vertical axis is 1.0, the partitioning position corresponds to a level at which the cumulative frequency of the pixels is equal to 0.5. In this way, the partitioning position may be determined. In the present example, a level "a" of the R-axis corresponding to where the cumulative frequency of the R-axis is equal to 0.5, a level "b" of the B-axis corresponding to where the cumulative frequency of the B-axis is equal to 0.5, and a level "c" of the G-axis corresponding to where the cumulative frequency of the G-axis is equal to 0.5 are obtained as the partitioning positions.

b-2) Method Using Frequency Distribution of Pixels at Various Levels of Each Axis This method involves creating a frequency distribution histogram of pixels at various levels of each axis as illustrated in FIG. 22, and dividing the axis at a level where the frequency distribution is equal to a minimum value. In the illustrated example of FIG. 22, a level "a" of the R-axis occurring at the lowest frequency, a level "b" of the B-axis occurring at the lowest frequency, and a level "c" of the G-axis occurring at the lowest frequency are obtained.

c) Division into Same Number of Colors

Figure 23:
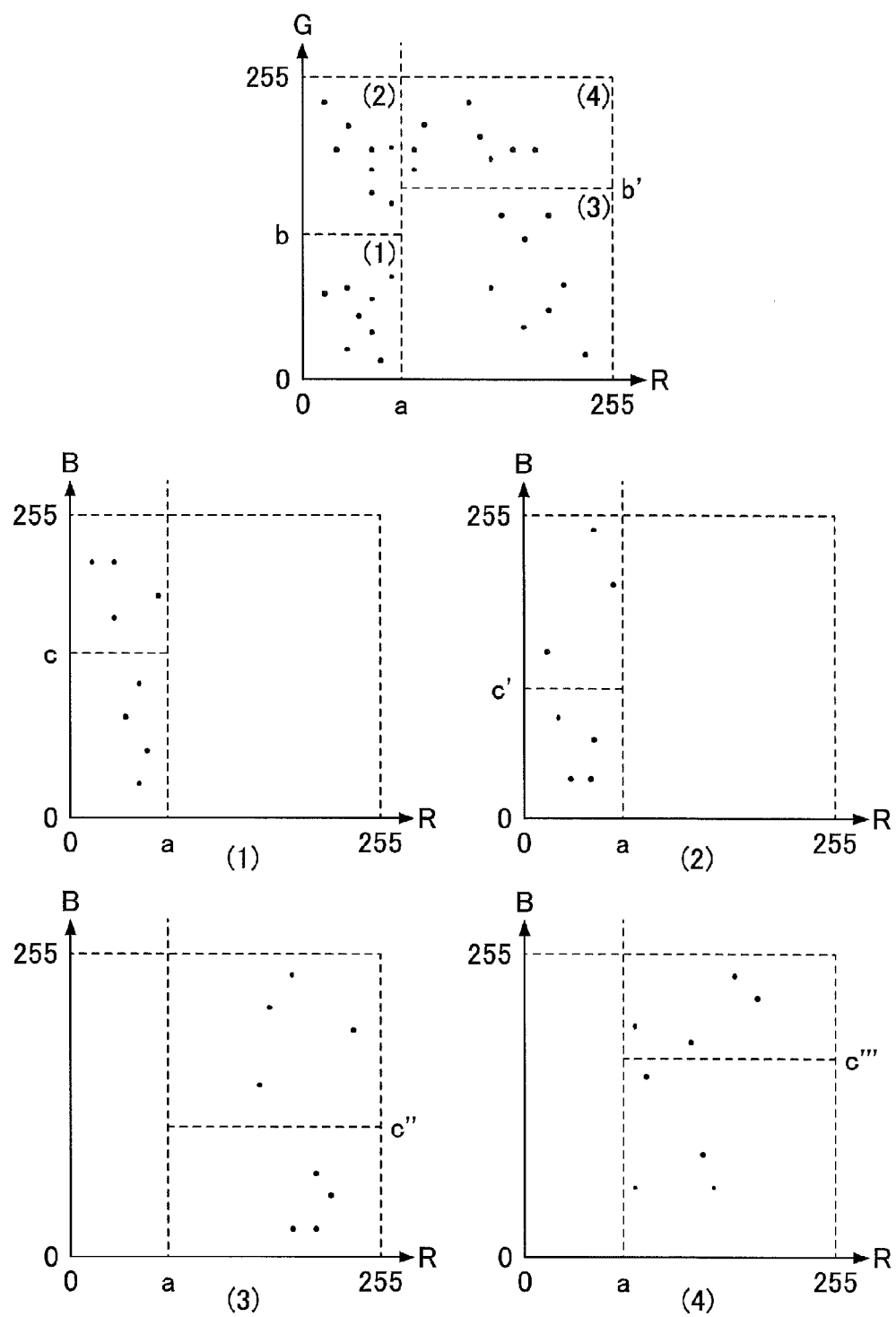
FIG. 23 illustrates an example of dividing a color space such that each partial color space has the same number of colors.

This method involves determining the partial regions of the color space of the original image data such that each partial color space includes the same number of colors. FIG. 23 illustrates an example in which the color space is divided into partial color spaces each including the same number of colors. In the following, exemplary process steps for subdividing the color space into partial color spaces each having the same number of colors are described. Note that in the example described below, it is assumed that the original image data has 32 colors.

Step 1)

Obtain a level "a" of the R-axis at which the number of colors (32) may be divided in half (16).

Step 2)

Obtain a level "b" of the G-axis at which the number of colors (16) within a range of levels 0 to a−1 of the R-axis may be divided in half (8), and obtain a level "b'" of the G-axis at which the number of colors (16) within a range of levels a to 255 of the R-axis may be divided in half (16).

Step 3)

Obtain a level "c" of the B-axis at which the number of colors (8) included within a region (1) (where the level of the R-axis is within a range of 0 to a−1, and the level of the G-axis is within a range of 0 to b−1) may be divided in half (4), obtain a level "c'" of the B-axis at which the number of colors (8) included within a region (2) (where the level of the R-axis is within a range of 0 to a−1, and the level of the G-axis is within a range of b to 255) may be divided in half (4), obtain a level "c''" of the B-axis at which the number of colors (8) included within a region (3) (where the level of the R-axis is within a range of a to 255, and the level of the G-axis is within a range of 0 to b'−1) may be divided in half (4), and obtain a level "c'''" of the B-axis at which the number of colors (8) included within a region (4) (where the level of the R-axis is within a range of a to 255, and the level of the G-axis is within a range of b' to 255) may be divided in half (4).

Note that the axes of the color space do not have to be divided in a particular order (i.e., the division does not have to be performed from the R-axis, the G-axis, and then the B-axis as in the above example). Also, the method used for determining the level at which the number of colors may be divided in half is not limited to the above example. For example, a median value of the levels before division may alternatively be used.

d) Division Using Cluster Analysis

Another method of dividing the color space of the original image data may involve determining the partial color spaces of the color space by applying cluster analysis to the pixels included in the original image data. For example, a K-means algorithm may be used to perform the clustering process. The K-means algorithm is a clustering technique that involves randomly choosing a predetermined number K of clusters and cluster centers for the K clusters, calculating the distance between the K cluster centers and a sample point, and assigning the sample point to the nearest cluster. The clustering process involves iteratively calculating the center of sample points belonging to the same cluster and updating the cluster center until the cluster center updating processes converge. Note that the division number for the color space (the number of clusters K) may be predetermined or empirically determined based on the number of pixels, for example.

Figure 24B:
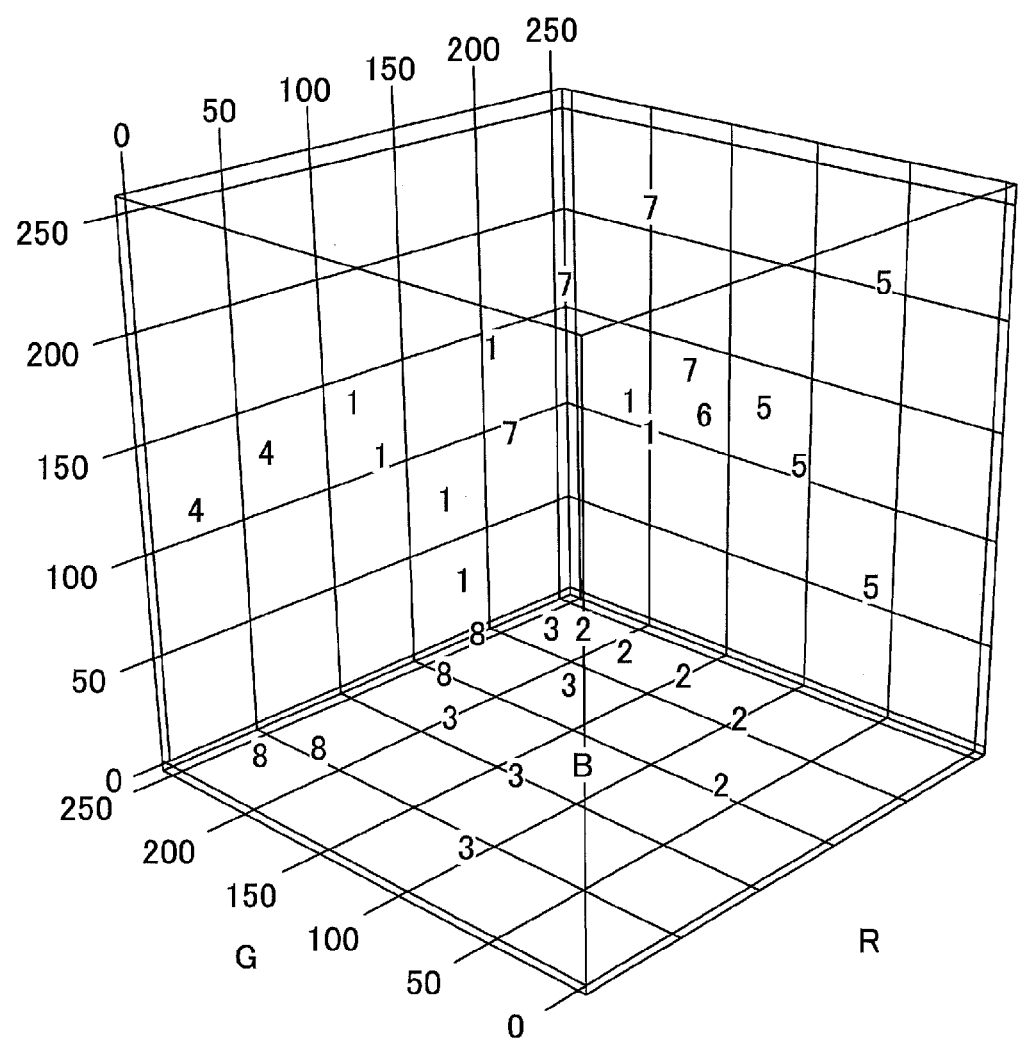

FIGS. 24A and 24B illustrate an example of dividing the pixels of the original image data into eight clusters using the K-means algorithm. FIG. 24A illustrates pixels in a two-dimensional space including the G-axis and the R-axis and pixels in a two-dimensional space including the B-axis and the R-axis. FIG. 24B illustrates pixels in a three-dimensional space including the R-axis, the G-axis, and the B-axis. Note that the graphs of FIGS. 24A and 24B are based on the same data. Also, note that the numbers indicated in the graphs of FIGS. 24A and 24B represent cluster numbers (1-8).

Note that steps S702 and S703 that are performed after step S701 may be substantially identical to steps S101 and S102 of FIG. 7, respectively. Accordingly, descriptions of these steps are omitted.

Next, in step S704, for each partial color space obtained in step S701, the pixel value mapping unit 303 determines a correspondence between a pixel value of the original image data and a pixel value of the reference image data with respect to each set of color components. That is, after the positions of the original image data and the reference image data are aligned, the pixel value mapping unit 303 generates pixel value mapping data for each partial color space by obtaining the pixel values of pixels at corresponding positions in the original image data and the reference image data, and identifying the correspondence between the pixel values with respect to each set of color components. Note that in the case where alignment of the image data is performed by applying geometric transformation to the image data, "corresponding pixels" may be regarded as "pixels at the same position". On the other hand, if geometric transformation is not applied to the image data, positions having the same coordinates after applying coordinate transformation to the image data may be regarded as the "same position", and pixels at such positions may be regarded as "corresponding pixels".

The pixel value mapping data for each partial color space may be recorded in several ways including, for example, recording the pixel value mapping data for each partial color space in list format. In the following, it is assumed that both the original image data and the reference image data correspond to RGB image data including a 256-level value for each color component. For example, pixel values may be recorded in list format in the following manner.

1) Prepare a list for each partial color space.

2) Select a set of coordinates specifying a pixel in the original image data.

3) Bundle together pixel values of the original image data and the reference image data including an R component value ($R_{in}$), a G component value ($G_{in}$), and a B component value ($B_{in}$) of the pixel of the original image data selected in the above step 2), and an R component value ($R_{out1}$), a G component value ($G_{out1}$), and a B component value ($B_{out1}$) of a corresponding pixel of the reference image data, and add the bundled pixel values to the list for the corresponding partial color space.

4) Repeat the above steps 1) to 3) with respect to all coordinates (pixels) of the original image data.

Note that the pixel values recorded in the lists for the partial color spaces may be rearranged in ascending order or descending order as is necessary, for example. Also, instead of repeating the above steps 1) to 3) with respect to all the coordinates of the original image data, in some embodiments, the steps may be performed with respect to a specified range of the original image data, or the coordinates may be selected at certain intervals in order to simplify the process of recording the pixel values, for example.

FIG. 25 illustrates an exemplary configuration of pixel value mapping data for each partial color space stored in list format. In FIG. 25, a list is prepared for each of m partial color spaces, including partial color space (1) to partial color space (m), and in each list, the color component values of pixels of the original image data are recorded at the left side, and the color component values of the corresponding pixels of the reference image data are recorded at the right side.

As described above in connection with the first embodiment, when generating the pixel value mapping data, contours of the image data (including the original image data and the reference image data) are preferably removed.

Next, in step S705, the color reproduction characteristics estimation unit 304 selects the partial color space for which reference color reproduction characteristics are to be estimated. That is, the color reproduction characteristics estimation unit 304 selects one partial color space from the plurality of partial color spaces obtained in step S701 as the partial color space subject to the reference color reproduction characteristics estimation process. Note that in the following descriptions, it may be assumed that the original image data and the reference image data that are within the selected partial color space are subject to processing unless specified otherwise.

Next, in step S706, the color reproduction characteristics estimation unit 304 estimates the reference color reproduction characteristics. That is, the color reproduction characteristics estimation unit 304 uses the pixel value mapping data generated in step S704 to determine the correspondence between a pixel value of the original image data and a pixel value of the reference image data. Note that step S706 may be performed in a manner similar to step S104 of FIG. 7, which is described above in connection with the first embodiment. Accordingly, detailed descriptions of this step are omitted. Also, as with the first embodiment, in the case where the pixel value mapping data for the relevant partial color space generated in step S704 includes the correspondence between pixel values of the original image data and the reference image data for all coordinates of the original image data within the relevant partial color space, the generated pixel value mapping data for the relevant partial color space may be directly used as the reference color reproduction characteristics.

The color reproduction characteristics estimation unit 304 repeats the above steps S705 and S706 until reference color reproduction characteristics for all the partial color spaces obtained in step S701 have been estimated (step S707). After the reference color reproduction characteristics have been estimated for all the partial color spaces of the original image data (step S707, YES), the reference color reproduction characteristics estimation process is ended.

<<User Color Reproduction Characteristics Estimation Process>>

Figure 26:
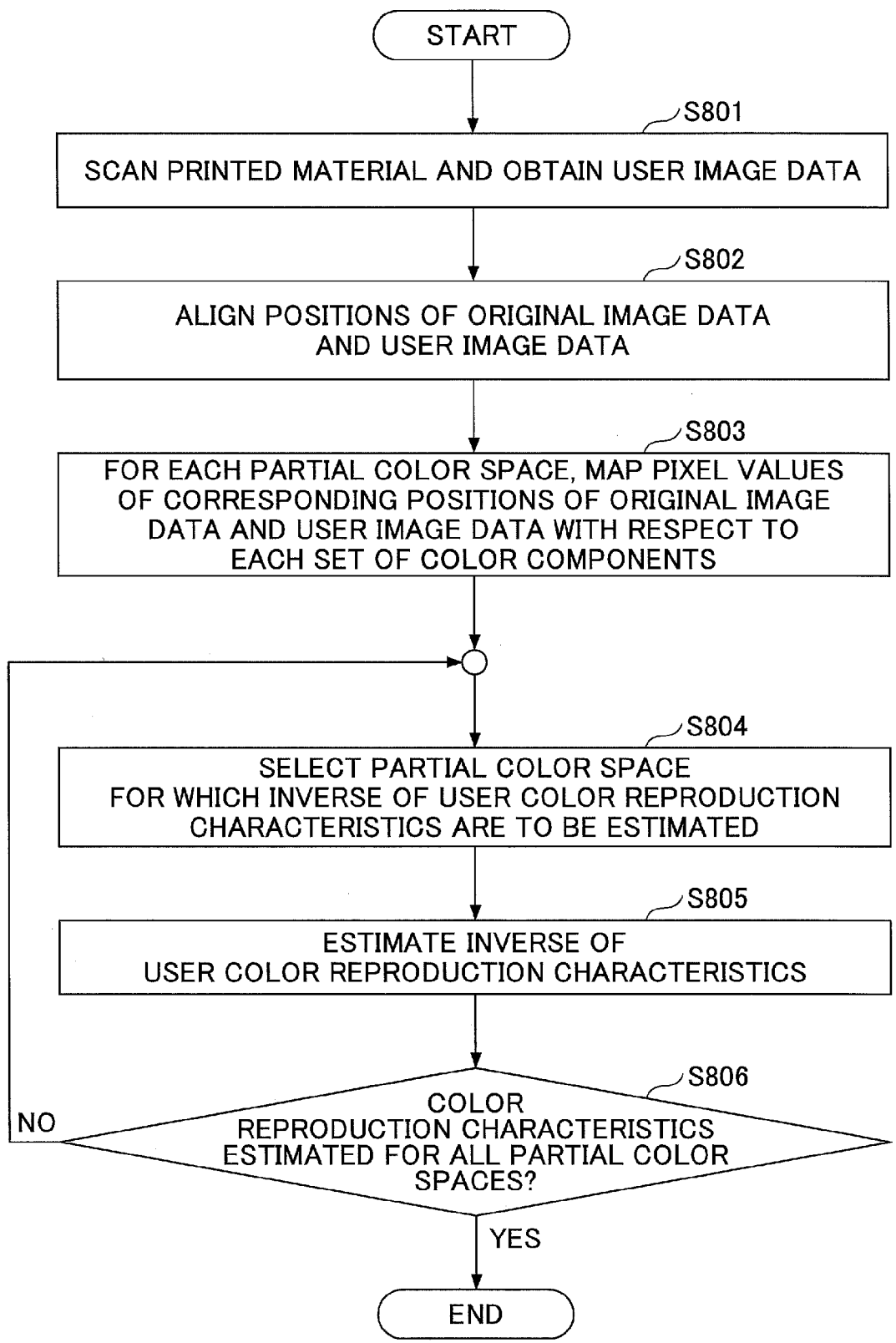
FIG. 26 is a flowchart illustrating an exemplary process of estimating user color reproduction characteristics according to the fourth embodiment.

FIG. 26 is a flowchart illustrating an exemplary process of estimating the user color reproduction characteristics according to the present embodiment. FIG. 26 illustrates a process starting from when the image scanning unit 301 scans the user printed material until the color reproduction characteristics estimation unit 304 estimates the inverse of the user color reproduction characteristics for all the partial color spaces.

Note that steps S801 and S802 of FIG. 26 may be substantially identical to steps S201 and S202 of FIG. 9, and therefore, descriptions of these steps are omitted.

In step S803, the pixel value mapping unit 303 generates pixel value mapping data for each of the partial color spaces obtained in steps S701 by determining a correspondence between a pixel value of a pixel in the original image data and a pixel value of a pixel at the corresponding position in the user image data with respect to each set of color components. That is, after the positions of the original image data and the user image data are aligned, the pixel value mapping unit 303 generates the pixel value mapping data for each partial color space by obtaining the pixel values of corresponding pixels of the original image data and the user image data and associating the pixel values of the original image data and the user image data with respect to each set of color components. Note that the pixel value mapping data generated in step S803 may be generated in a manner similar to step S703 of FIG. 18. FIG. 27 illustrates an exemplary configuration of pixel value mapping data recorded in list format. In FIG. 27, a list is prepared for each of m partial color spaces, including partial color space (1) to partial color space (m), and in each list, the color component values of pixels of the original image data are recorded at the left side, and the color component values of the corresponding pixels of the user image data are recorded at the right side.

Next, in step S804, the color reproduction characteristics estimation unit 304 selects the partial color space for which the inverse of the user color reproduction characteristics are to be estimated. That is, the color reproduction characteristics estimation unit 304 selects one partial color space from the plurality of partial color spaces obtained in step S701 as the partial color space subject to the user color reproduction characteristics estimation process. Note that in the following descriptions, it may be assumed that the original image data and the user image data that are within the selected partial color space are subject to processing unless specified otherwise.

Next, in step S805, the color reproduction characteristics estimation unit 304 estimates the inverse of the user color reproduction characteristics for the relevant partial color space. That is, the color reproduction characteristics estimation unit 304 uses the pixel value mapping data for the relevant partial color space generated in step S803 to determine the correspondence between a pixel value of the original image data and a pixel value of the user image data. Note that step S805 may be performed in a manner similar to step S204 of FIG. 9, which is described above in connection with the first embodiment. As in the first embodiment, the pixel value mapping data for the relevant partial color space generated in step S803 may not be directly used as the inverse of the user color reproduction characteristics. This is because a set of color components of a pixel value of the reference image data may not necessarily be included in the user image data. Thus, the inverse of the user color reproduction characteristics may have to be estimated with respect to such a set of color components of a pixel value that is not included in the pixel value mapping data generated in step S803.

The color reproduction characteristics estimation unit 304 repeats the above steps S804 and S805 until the inverse of the user color reproduction characteristics have been estimated for all the partial color spaces obtained in step S701 (step S806).

<<Color Conversion Process>>

Figure 28:
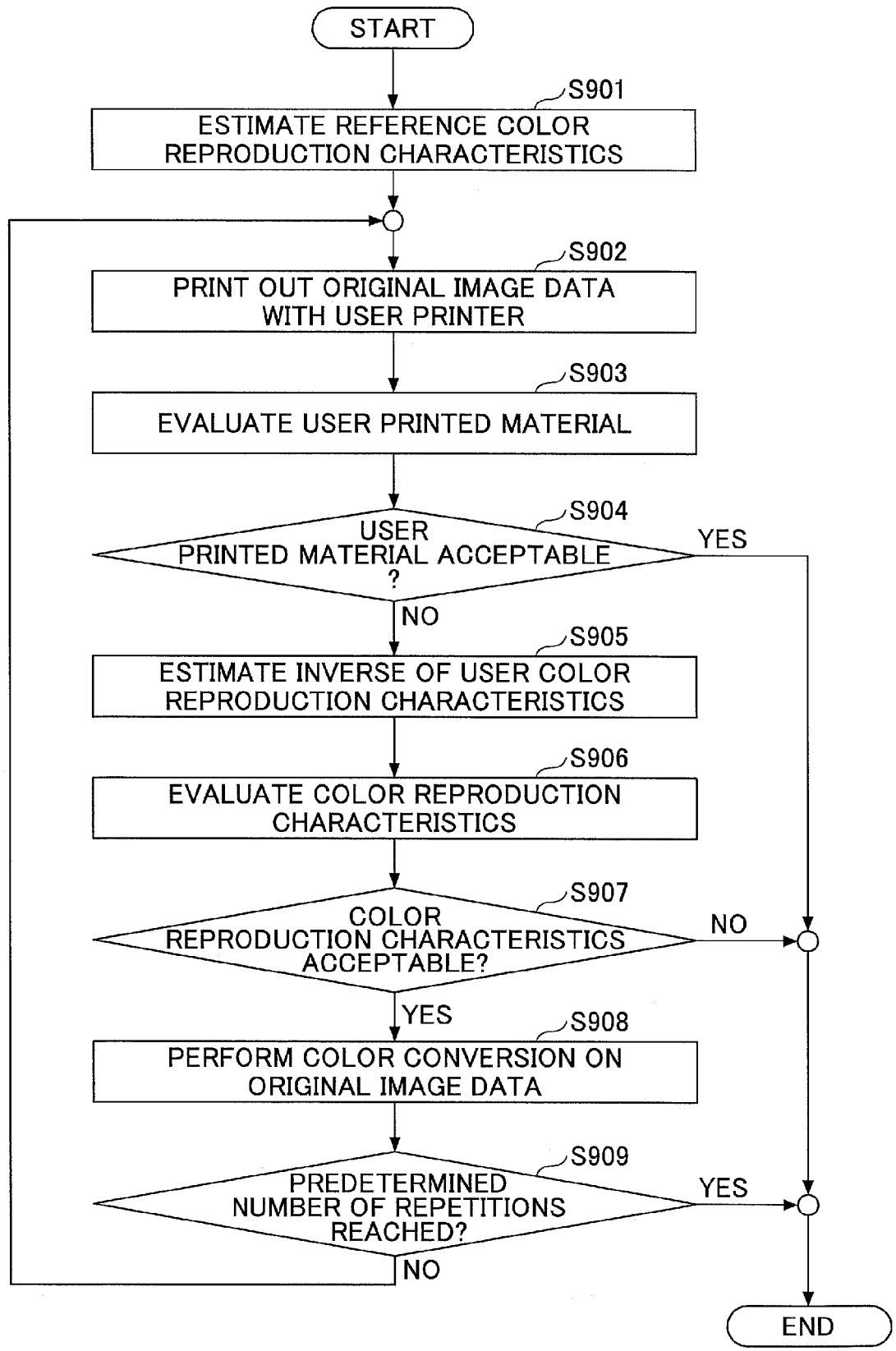
FIG. 28 is a flowchart illustrating an exemplary color conversion process according to the fourth embodiment.

In the following, an exemplary color conversion process according to the present embodiment is described. FIG. 28 is a flowchart illustrating an exemplary color conversion process according to the present embodiment.

First, in step S901, the color reproduction characteristics estimation unit 304 estimates the reference color reproduction characteristics for each partial color space based on the reference image data and the original image data. That is, the reference color reproduction characteristics estimation process described above with reference to FIG. 18 may be executed in this step, for example. Note that when the same partial color spaces are to be used in the color conversion process, step S901 may only need to be executed once. On the other hand, in a case where the division scheme of the partial color spaces is changed during the color conversion process, step S901 may have to be executed in response to such change, for example. Note that in the case where step S901 is executed multiple times, precaution needs to be taken to ensure that the initial version of the original image data is being used in this step rather than a color-converted version of the original image data.

Note that steps S902-S904 that are performed after step S901 may be respectively identical to the above-described steps S302-S304 of FIG. 11, and therefore, descriptions of these steps are omitted.

Next, in step S905, the color reproduction characteristics estimation unit 304 estimates the inverse of the user color reproduction characteristics for each partial color space based on the user image data and the original image data. That is, the user color reproduction characteristics estimation process described above with reference to FIG. 26 may be executed in step S905, for example.

Next, in step S906, the color conversion unit 305 evaluates the estimated color reproduction characteristics including the reference color reproduction characteristics and the inverse of the user color reproduction characteristics for each partial color space. If the estimated color reproduction characteristics are deemed to be acceptable (step S907, YES), the process proceeds to step S908. If the estimated color reproduction characteristics are not acceptable (step S907, NO), the process is ended.

Note that the determination of the acceptability of the color reproduction characteristics may be made in a manner similar to step S306 of FIG. 11 described above in connection with the first embodiment. Note that in the present embodiment, the acceptability of the color reproduction characteristics is determined with respect to each partial color space. In some embodiments, the color conversion process may be terminated once the color reproduction characteristics for one partial color space are deemed to be unacceptable. In other embodiments, the color reproduction characteristics for such partial color space may be interpolated based on the color reproduction characteristics of neighboring partial color spaces, for example. Exemplary interpolation methods that may be used include a method that involves averaging values estimated based on color reproduction characteristics of neighboring partial color spaces and a method that involves replacing the color reproduction characteristics for the corresponding partial color space with the color reproduction characteristics for another partial color space that is deemed acceptable. Note, however, that the color conversion process is preferably terminated in a case where color reproduction characteristics for a certain number of the partial color spaces are deemed to be unacceptable. Whether the color conversion process should be terminated may be determined based on the number of partial color spaces having color reproduction characteristics that have been deemed unacceptable, or the proportion such partial color spaces with respect to the total number of partial color spaces, for example.

Next, in step S908, the color conversion unit 305 performs color conversion on the original image data. That is, the color conversion unit 305 applies color conversion to the original image data using the estimated color reproduction characteristics including the reference color reproduction characteristics and the inverse of the user color reproduction characteristics for each partial color space, and updates the original image data.

In the following, exemplary process steps are described for applying color conversion to the original image data in a case where the color "a" of the original image data is included in the partial color space (m), the process using the reference color reproduction characteristics $S^m(P_1{}^m(x))$ and the inverse $P_2{}^m(S^m(x)^{-1})^{-1}$ of the user color reproduction characteristics $S^m(P_2{}^m(x))$ estimated for the partial color space (m).

(1) Obtain the color "s" ($s=S^m(P_1{}^m(a))$) of the reference image data corresponding to the color "a" of the original image data based on the reference color reproduction characteristics for the partial color space (m).

(2) Obtain the color "b" ($b=P_2{}^m(S^m(s)^{-1})^{-1}$) of the original image data corresponding to the color "s" of the user image data based on the inverse of the user color reproduction characteristics for the partial color space (m). That is, obtain a set of colors (a, b) that satisfies the condition $S^m(P_1^m(a))=s=S^m(P_2^m(b))$.

(3) Convert the color "a" of the original image data to the color "b".

In this way, a sequence of steps for performing a color conversion process may be completed. Note that when color conversion is applied to the original image data using the color reproduction characteristics that are independently set up for each partial color space, color discontinuity may occur at the boundary portions of the partial color spaces. Accordingly, the color conversion results at the boundary portions are preferably synthesized with color conversion results obtained using the color reproduction characteristics of neighboring partial color spaces. Exemplary synthesis methods that may be used include a method that involves obtaining the arithmetic average of the results of performing color conversion using the color reproduction characteristics of the neighboring partial color spaces, and a method that involves obtaining a weighted average of the color conversion results using the reciprocal of a distance (color difference) between the color of the original image data to be converted and the color of the center of the partial color space.

In the present embodiment, the color conversion process is repeated a predetermined number of times. Thus, after the number of times the color conversion process has been repeated reaches the predetermined number (step S909, YES), the process is ended. Note that although adequate color conversion may be achieved by simply executing the color conversion process once, color matching accuracy may presumably be improved by repeating the color conversion process multiple times.

In the case where the color conversion process is to be repeated (step S909, NO), the color-converted original image data is used as the input for the user printer 200. That is, the user printer 200 prints out the color-converted (updated) original image data in step S902, and the same process steps are performed thereafter. Note that the original image data used in subsequent loops correspond to the color-converted (updated) original image data obtained in a previous loop.

Note that although there are three process termination conditions in FIG. 28, the color conversion process does not necessarily have to include all of these termination conditions. In some embodiments, one or more of these process termination conditions may be omitted, although at least one of these process termination conditions is preferably included in the color conversion process.

As with the first embodiment, in the present embodiment, the color space that is used when the scanner 300 scans an image is used in subsequent steps. However, because such color space is device dependent, the device dependent color space is preferably converted into a device independent color space using the color profile of the scanner 300. Examples of device independent color spaces include the RGB color space and the XYZ color space. Further, the color space may preferably be converted to a uniform color space such as the L*a*b* color space.

Note that the reference image data and the user image data scanned by the scanner 300 have to be in the same color space. However, the original image data and the reference image data, or the original image data and the user image data do not necessarily have to be in the same color space. For example, the original image data may be in the CMYK color space, and the reference image data and the user image data may be in the RGB color space.

Fifth Embodiment

According to a fifth embodiment of the present invention, when subdividing the color space of the original image data into partial color spaces as described above in connection with the fourth embodiment, instead of directly using the color space of the original image data, the color space is converted into a color space that is capable of representing the hue, luminance, and saturation, and the converted color space is divided into partial color spaces. In this way, stable and accurate color matching may be achieved even in a case where color reproduction characteristics of the image output devices vary depending on the hue, luminance, or saturation, for example.

Note that the system configuration and the hardware configuration of an image processing system or an MFP according to the present embodiment may be substantially identical to those of the fourth embodiment, and therefore, descriptions thereof are omitted.

<System Configuration>

Figure 29:
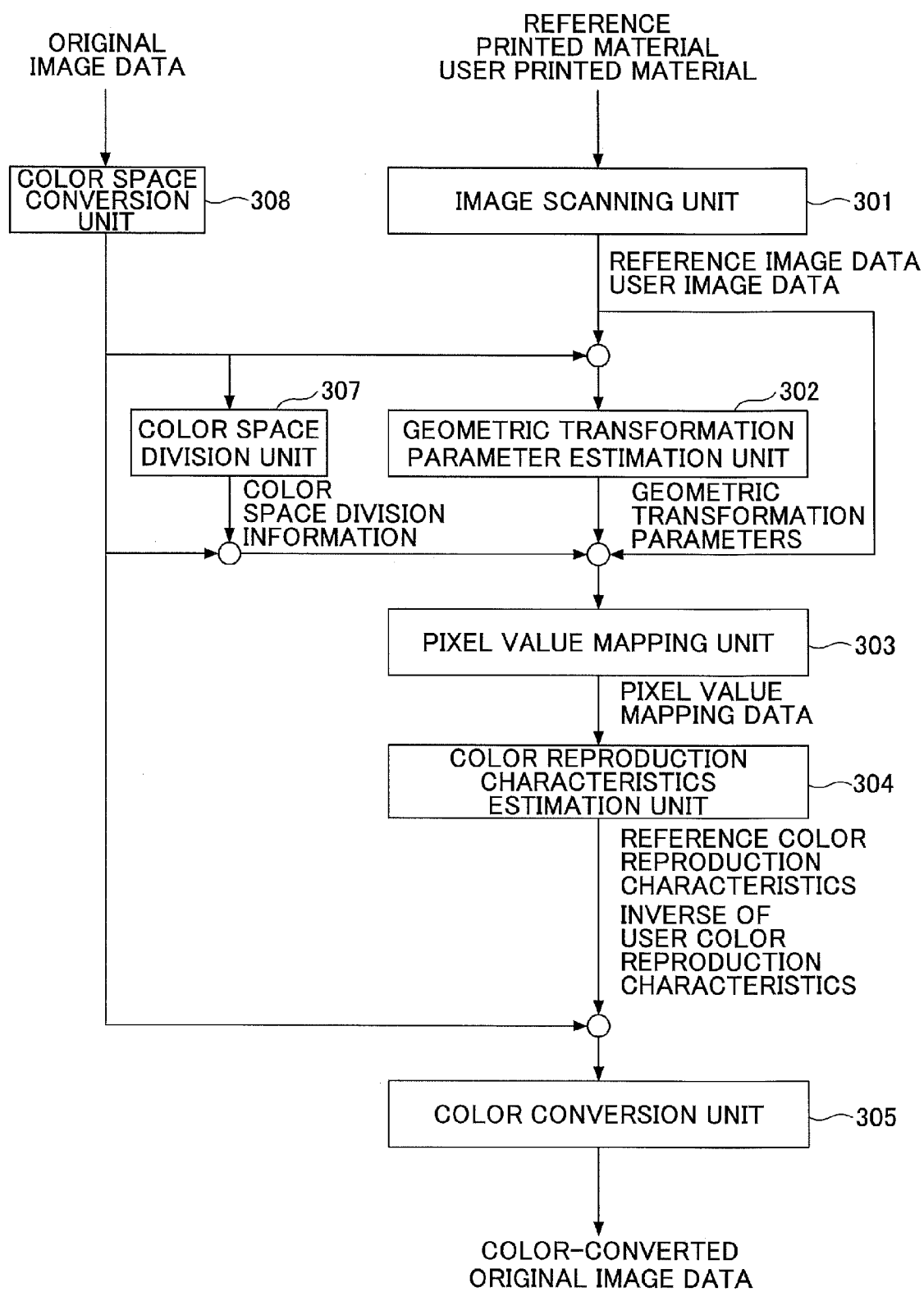
FIG. 29 is a block diagram illustrating an exemplary functional configuration of an image forming system or a multifunction peripheral according to a fifth embodiment of the present invention.

FIG. 29 illustrates an exemplary functional configuration of the image processing system or the MFP according to the present embodiment. In comparing FIG. 29 with FIG. 17, it can be appreciated that FIG. 29 includes a color space conversion unit 308 in addition to the functional features illustrated in FIG. 17. Note that in the following, descriptions of functional features of FIG. 29 that are identical to those of the fourth embodiment are omitted. That is, the following descriptions relate to the color space conversion unit 308 of the present embodiment.

The color space conversion unit 308 converts the color space of the original image data into a color space that is capable of representing the hue, luminance, and saturation.

<Process>

<<Reference Color Reproduction Characteristics Estimation Process>>

Figure 30:
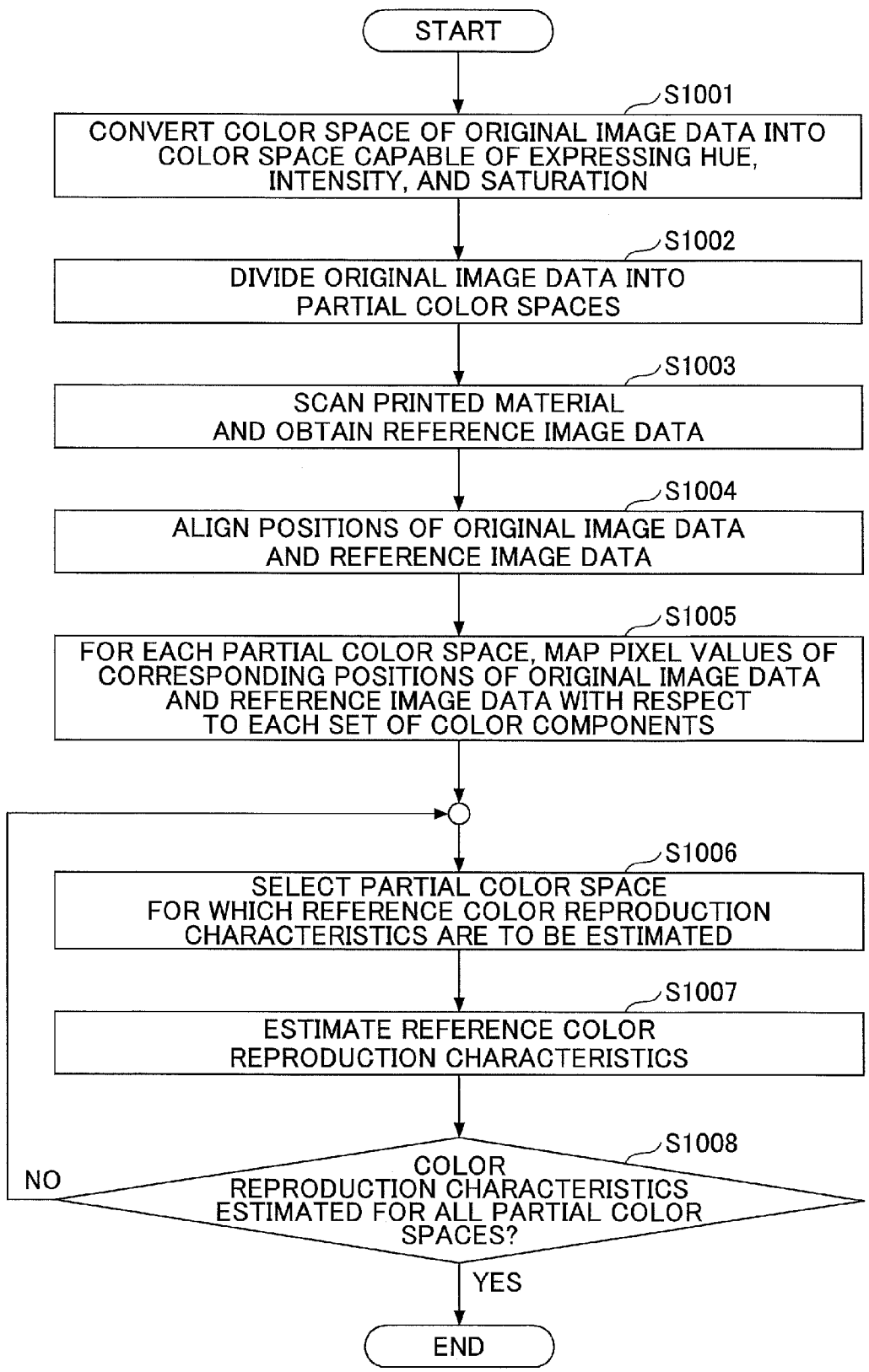
FIG. 30 is a flowchart illustrating an exemplary process of estimating reference color reproduction characteristics according to the fifth embodiment.

FIG. 30 is a flowchart illustrating an exemplary process of estimating the reference color reproduction characteristics according to the present embodiment. In comparing FIG. 30 with FIG. 18, it can be appreciated that FIG. 30 includes a color space conversion step (step S1001) in addition to the process steps illustrated in FIG. 18. Note that step S1002 of FIG. 30 corresponds to step S701 of FIG. 18, but processes executed in these steps may vary. On the other hand, steps S1003-S1008 of FIG. 30 may be substantially identical to steps S702-S707 of FIG. 18 described above in connection with the fourth embodiment. Accordingly, descriptions of steps S1003-S1008 are omitted.

In step S1001, the color space conversion unit 308 converts the color space of the original image data into a color space that is capable of representing the hue, luminance, and saturation. Examples of color spaces capable of representing the hue, luminance, and saturation include the HSV color space, the HLS color space, the YCbCr color space, the L*a*b* color space, and the L*u*v* color space.

Next, in step S1002, the color space division unit 307 divides the converted color space of the original image data obtained in step S1001 into a plurality of partial color spaces according to a predetermined standard. Examples of standards that may be used to divide the color space in the present embodiment are described below. Note that the following descriptions relate to an exemplary case where the color space of the original image data is converted into the L*a*b* color space. The hue h and the saturation C* in the L*a*b* color space may be defined by the following equations.

$$h = \tan^{-1}\left(\frac{b^*}{a^*}\right)$$

$$C^* = \sqrt{(a^*)^2 + (b^*)^2}$$

a) Division by Hue

Figure 31:
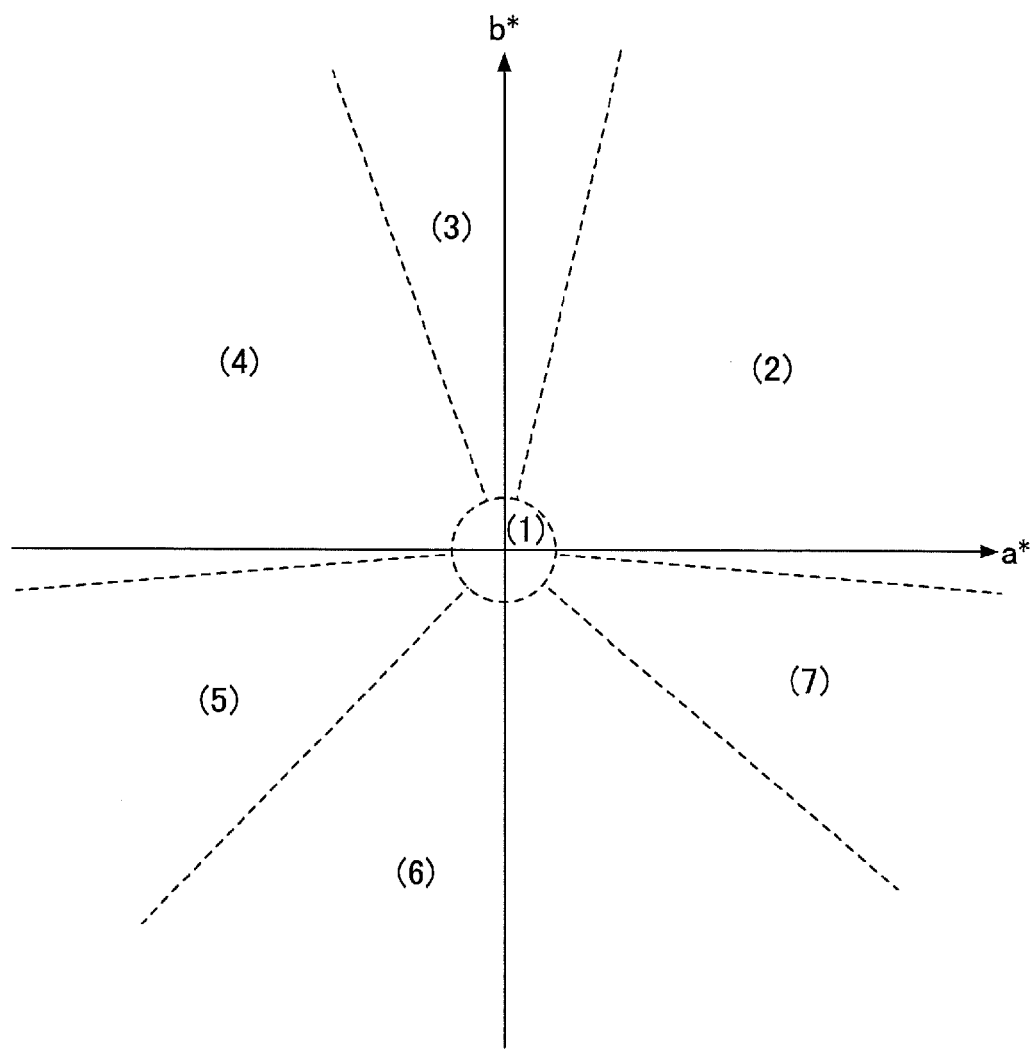
FIG. 31 illustrates an example of dividing a color space by hue.

A division method that may be used in the present embodiment may involve dividing a color space into partial color spaces according to hue using values of the saturation *C and the hue h in the L*a*b* color space. FIG. 31 illustrates an example in which a color space in the L*a*b* color space is divided into partial color spaces according to the hue. In the illustrated example, the color space is divided into regions (1)-(7), where region (1) represents an achromatic color with the saturation *C less than or equal to a threshold value, region (2) represents "red" with the hue h within a certain range, region (3) represents "yellow", region (4) represents "green", region (5) represents "cyan", region (6) represents "blue", and region (7) represents "magenta". Note that the number of divisions (regions), the threshold value for the saturation *C, and the range of the hue h that are used for dividing the color space may be predetermined values that are empirically determined beforehand, or these values may be dynamically determined such that each region may include the same number of colors, for example.

b) Division by Luminance

Figure 32:
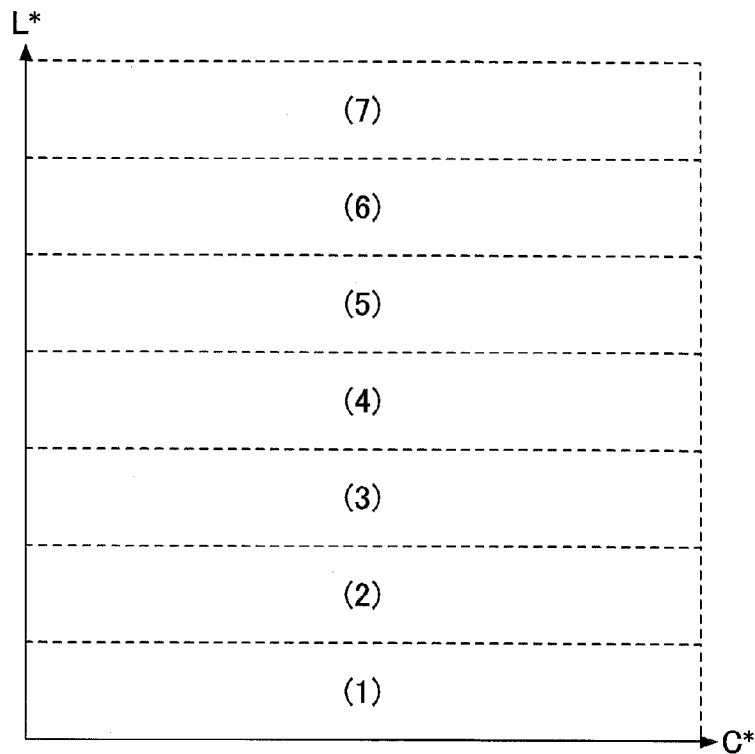
FIG. 32 illustrates an example of dividing a color space by luminance.

Another division method that may be used in the present embodiment may involve dividing a color space into partial color spaces according to luminance using a value of the luminance L* in the L*a*b* color space. FIG. 32 illustrates an example in which a color space in the L*a*b* color space is divided into partial color spaces corresponding to regions (1)-(7) according to the luminance. Note that the number of divisions (regions) and the threshold value for the luminance L* used for dividing the color space may be predetermined values that are empirically determined beforehand, or these values may be dynamically determined such that each region may include the same number of colors, for example.

c) Division by Saturation

Figure 33:
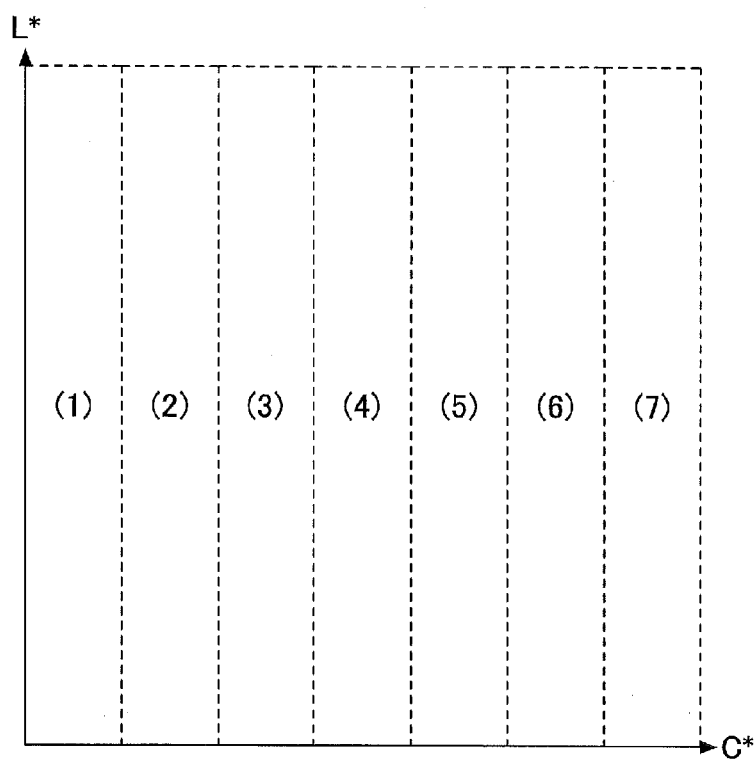
FIG. 33 illustrates an example of dividing a color space by saturation.

Another division method that may be used in the present embodiment may involve dividing a color space into partial color spaces according to saturation using a value of the saturation C* in the L*a*b* color space. FIG. 33 illustrates an example in which a color space in the L*a*b* color space is divided into partial color spaces corresponding to regions (1)-(7) according to the saturation. Note that the number of divisions (regions) and the threshold value for the saturation C* used for dividing the color space may be predetermined values that are empirically determined beforehand, or these values may be dynamically determined such that each region may include the same number of colors, for example.

d) Division Using Cluster Analysis

Another division method that may be used in the present embodiment may involve determining the divided regions by applying cluster analysis to each pixel included in the original image data in the L*a*b* color space. Note that the number of divisions may be a fixed number that is determined beforehand, or the number may be empirically determined according to the number of pixels, for example. An exemplary method of performing a clustering process may include using the K-means algorithm, for example. The K-means algorithm is a clustering technique that involves randomly choosing a predetermined number K of clusters and cluster centers for the K clusters, calculating the distance between the K cluster centers and a sample point, and assigning the sample point to the nearest cluster. The clustering process involves iteratively calculating the center of sample points belonging to the same cluster and updating the cluster center until the cluster center updating processes converge. Note that the division number for the color space (the number of clusters K) may be predetermined or empirically determined based on the number of pixels, for example.

Figure 34:
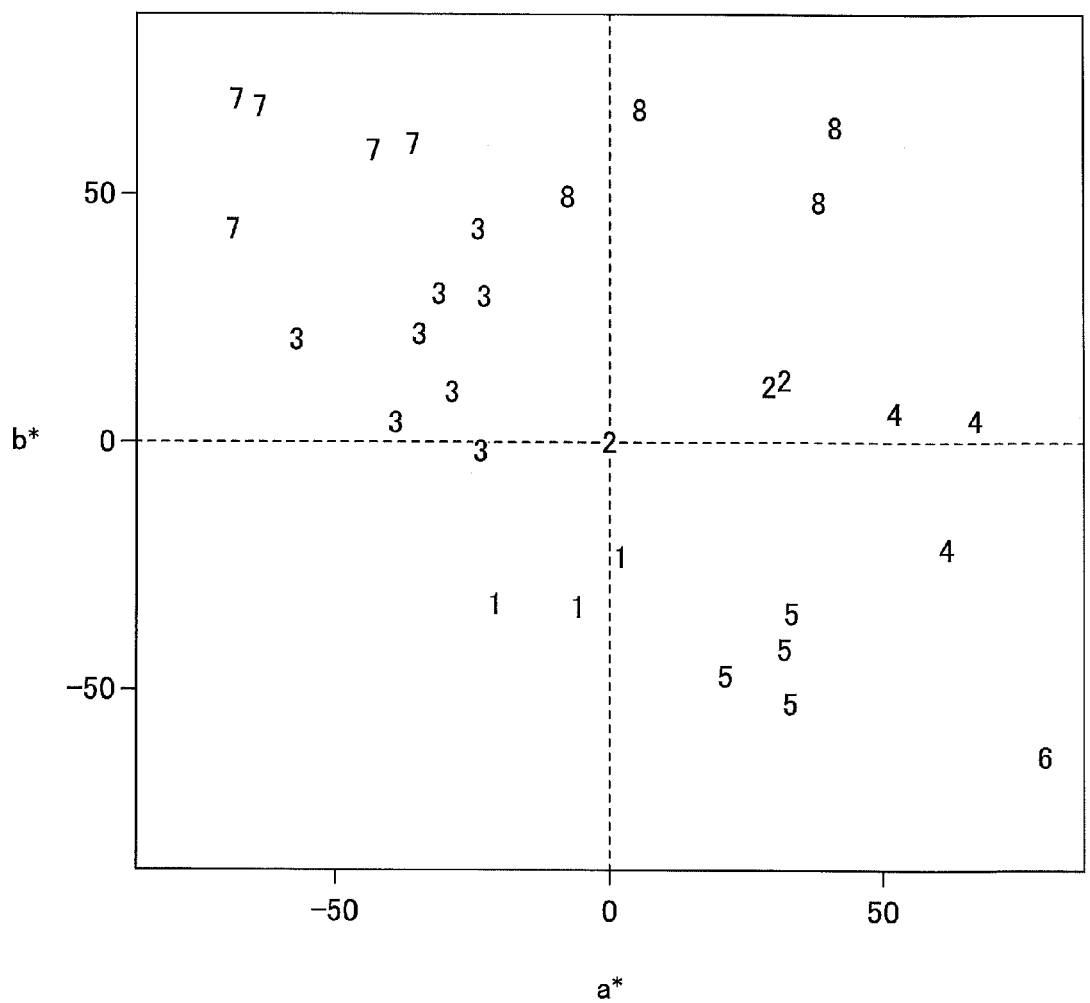
FIG. 34 illustrates an example of dividing a color space using cluster analysis according to the fifth embodiment.

FIG. 34 illustrates an example in which the pixels of the original image data are divided into eight clusters using the K-means algorithm based on the values a* and b* of the pixels. FIG. 34 illustrates pixels in a two-dimensional space including the a*-axis and the b*-axis. Note that the numbers indicated in FIG. 34 represent cluster numbers (1-8).

Note that methods for dividing a color space according to the hue, luminance, and saturation are not limited to the exemplary methods described above. In some embodiments, two or more of the above methods may be combined. For example, after dividing a color space using the above method a), the above method b) or c) may be used to further subdivide each of the partial color spaces divided by hue.

Although the present invention has been described above with reference to certain preferred embodiments, the present invention is not limited to these embodiments, and numerous variations and modifications may be made without departing from the scope of the present invention.

The present application is based on and claims the benefit of priority of Japanese Patent Application No. 2013-232382 filed on Nov. 8, 2013 and Japanese Patent Application No. 2014-023273 filed on Feb. 10, 2014, the entire contents of which are hereby incorporated by reference.

What is claimed is:

1. An image processing apparatus that reproduces a color of a first output result in a second output result, the first output result corresponding to original image data that is output by a first image output unit, and the second output result corresponding to the original image data that is output by a second image output unit, the image processing apparatus comprising:

a memory storing instructions; and
a processor configured to execute the instructions stored in the memory to function as
a geometric transformation parameter estimation unit configured to estimate a first geometric transformation parameter for aligning the original image data with first output image data corresponding to the first output result that is scanned by a scanning device, and estimate a second geometric transformation parameter for aligning the original image data with second output image data corresponding to the second output result that is scanned by the scanning device;
a pixel value mapping unit configured to generate first pixel value mapping data using the
first geometric transformation parameter and generate second pixel value mapping data using the second geometric transformation parameter, the first pixel value mapping data associating a set of color components of a pixel of the first output image data with a set of color components of a corresponding pixel of the original image data, and the second pixel value mapping data associating a set of color components of a pixel of the second output image data with a set of color components of a corresponding pixel of the original image data;
a map estimation unit configured to obtain a first map estimating a color of the first output image data from a color of the original image data based on the first pixel value mapping data, and obtain a second map estimating a color of the original image data from a color of the second output image data based on the second pixel value mapping data;
a conversion unit configured to convert a pixel value of the original image data based on the first map and the second map; and
wherein the geometric transformation parameter estimation unit estimates a third geometric parameter for aligning the converted original image data converted by the conversion unit with third output image data corresponding a third output result that is scanned by the scanning unit, the third output result corresponding to the converted original image data that is output by the second image output unit; the pixel value mapping unit generates third pixel value mapping data associating a set of color components of a pixel of the third output image data with a set of color components of a corresponding pixel of the converted original image data using the third geometric transformation parameter; the map estimation unit obtains a third map estimating a color of the converted original image data from a color of the third output image data based on the third pixel value mapping data; and the conversion unit converts a pixel value of the converted original image data based on the first map and the third map.

2. The image processing apparatus as claimed in claim 1, further comprising:
a color space division unit configured to divide a color space of the original image data into a plurality of partial color spaces; wherein
the pixel value mapping unit generates the first pixel value mapping data and the second pixel value mapping data for each of the plurality of partial color spaces of the original image data obtained by the color division unit;
the map estimation unit obtains the first map and the second map for each of the plurality of partial color spaces of the original image data; and
the conversion unit converts the pixel value of the original image data based on the first map and the second map obtained for each of the plurality of partial color spaces of the original image data.

3. The image processing apparatus as claimed in claim 2, wherein the color space division unit divides the color space of the original image data into the plurality of partial color spaces by dividing the color space of the original image data into equal spaces.

4. The image processing apparatus as claimed in claim 2, wherein the color space division unit divides the color space of the original image data into the plurality of partial color spaces based on at least one of a frequency distribution and a cumulative frequency of pixel values included in the color space of the original image data.

5. The image processing apparatus as claimed in claim 2, wherein the color space division unit divides the color space of the original image data into the plurality of partial color spaces such that each of the partial color spaces includes a same number of pixels.

6. The image processing apparatus as claimed in claim 2, wherein the color space division unit divides the color space of the original image data into the plurality of partial color spaces using cluster analysis.

7. The image processing apparatus as claimed in claim 2, further comprising:
a first color space conversion unit configured to convert the color space of the original image data into a color space capable of representing at least one of a hue, a luminance, and a saturation; wherein
the color space division unit divides the converted color space of the original image data converted by the first color space conversion unit into the plurality of partial color spaces using at least one of the hue, the luminance, and the saturation.

8. The image processing apparatus as claimed in claim 7, wherein the color space division unit divides the converted color space of the original image data converted by the first color space conversion into the plurality of partial color spaces by cluster analysis using at least one of the hue, the luminance, and the saturation.

9. The image processing apparatus as claimed in claim 1, wherein the map estimation unit obtains the first map estimating the color of the first output image data using first multidimensional data based on a plurality of color component values of the original image data, and obtains the second map estimating the color of the original image data using second multidimensional data based on a plurality of color component values of the second output image data.

10. The image processing apparatus as claimed in claim 1, further comprising:
a second color space conversion unit configured to convert image data into a device independent color space; wherein
the second color space conversion unit converts a color space of the first output image data and a color space of the second output image data into the device independent color space; and
the map estimation unit obtains the first map and the second map using the converted first output image data and the converted second output image data that have been converted by the second color space conversion unit.

11. The image processing apparatus as claimed in claim 1, wherein the pixel value mapping unit removes contours from the original image data, the first output image data, and the second output image data before associating a set of color components of a pixel of the first output image data with a set of color components of a corresponding pixel of the original image data and associating a set of color components of a pixel of the second output image data with a set of color components of a corresponding pixel of the original image data.

12. The image processing apparatus as claimed in claim 1, further comprising:
a coincidence degree determination unit configured to determine a degree of coincidence between the first output image data and the second output image data according to a predetermined method; wherein
when the degree of coincidence determined by the coincidence degree determination unit satisfies a predetermined standard, the map estimation unit obtains the second map estimating the color of the original image data from the color of the second output image data based on the second pixel value mapping data.

13. The image processing apparatus as claimed in claim 1, further comprising:
a map evaluation unit configured to evaluate whether the first map and the second map satisfy a predetermined standard; wherein
when the map evaluation unit determines that the first map and the second map satisfy the predetermined standard, the conversion unit converts the pixel value of the original image data based on the first map and the second map.

14. An image processing system comprising:
a first image output unit configured to output original image data as a first output result;
a second image output unit configured to output the original image data as a second output result;
a scanning device configured to scan the first output result and the second output result;
an information processing device configured to obtain a map for approximating a color of the second output result to a color of the first output result;
wherein the information processing device includes
a memory storing instructions; and
a processor configured to execute the instructions stored in the memory to function as a geometric transformation parameter estimation unit configured to estimate a first geometric transformation parameter for aligning the original image data with first output image data corresponding to the first output result that is scanned by the scanning device, and estimate a second geometric transformation parameter for aligning the original image data with second output image data corresponding to the second output result that is scanned by the scanning device;

a pixel value mapping unit configured to generate first pixel value mapping data using the first geometric transformation parameter and generate second pixel value mapping data using the second geometric transformation parameter, the first pixel value mapping data associating a set of color components of a pixel of the first output image data with a set of color components of a corresponding pixel of the original image data, and the second 5 pixel value mapping data associating a set of color components of a pixel of the second output image data with a set of color components of a corresponding pixel of the original image data;

a map estimation unit configured to obtain 10 a first map estimating a color of the first output image data from a color of the original image data based on the first pixel value mapping data, and obtain a second map estimating a color of the original image data from a color of the second output image data based on the second pixel value mapping data;

a conversion unit configured to convert a pixel value of the original image data based on the first map and the second map; and wherein the geometric transformation parameter estimation unit estimates a third geometric parameter for aligning the converted original image data converted by the conversion unit with third output image data corresponding a third output result that is scanned by the scanning unit, the third output result corresponding to the converted original image data that is output by the second image output unit; the pixel value mapping unit generates third pixel value mapping data associating a set of color components of a pixel of the third output image data with a set of color components of a corresponding pixel of the converted original image data using the third geometric transformation parameter; the map estimation unit obtains a third map estimating a color of the converted original image data from a color of the third output image data based on the third pixel value mapping data; and the conversion unit converts a pixel value of the converted original image data based on the first map and the third map.

* * * * *